(12) United States Patent
Sculley et al.

(10) Patent No.: US 10,963,586 B1
(45) Date of Patent: Mar. 30, 2021

(54) DATA COLLECTION, STORAGE AND MANAGEMENT SYSTEM AND METHOD

(71) Applicant: Steelcase Inc., Grand Rapids, MI (US)

(72) Inventors: Darrin Sculley, Byron Center, MI (US); Kurt R. Heidmann, Grand Rapids, MI (US); Louis Everett Rowland, Grand Rapids, MI (US)

(73) Assignee: STEELCASE INC., Grand Rapids, MI (US)

( * ) Notice: Subject to any disclaimer, the term of this patent is extended or adjusted under 35 U.S.C. 154(b) by 374 days.

(21) Appl. No.: 15/840,698

(22) Filed: Dec. 13, 2017

Related U.S. Application Data

(60) Provisional application No. 62/434,732, filed on Dec. 15, 2016.

(51) Int. Cl.
| | |
|---|---|
| *G06F 21/00* | (2013.01) |
| *G06Q 10/00* | (2012.01) |
| *G06Q 10/06* | (2012.01) |
| *G06F 21/62* | (2013.01) |
| *G06Q 10/10* | (2012.01) |
| *G06F 16/23* | (2019.01) |

(52) U.S. Cl.
CPC ...... *G06F 21/6245* (2013.01); *G06F 16/2379* (2019.01); *G06Q 10/105* (2013.01); *G06Q 10/1095* (2013.01)

(58) Field of Classification Search
CPC ............ G06F 21/6245; G06F 16/2379; G06Q 10/105
See application file for complete search history.

(56) References Cited

U.S. PATENT DOCUMENTS

| | | | | |
|---|---|---|---|---|
| 2010/0299180 | A1* | 11/2010 | Tsatalos | G06Q 10/0637 705/7.36 |
| 2013/0246114 | A1* | 9/2013 | Gala | G06Q 10/06 705/7.15 |
| 2014/0058801 | A1* | 2/2014 | Deodhar | G06Q 10/0639 705/7.38 |

(Continued)

OTHER PUBLICATIONS

Bonatti, et al., Data Privacy Vocabularies and Controls: Semantic Web for Transparency and Privacy, CEUR Workshop Proceedings, 2018, 4 pages.

(Continued)

*Primary Examiner* — Noura Zoubair
(74) *Attorney, Agent, or Firm* — Quarles & Brady LLP

(57) ABSTRACT

A method and system of controlling data collection and use, the method for use with at least a first sensor designed to sense at least a first parameter and an interface device, the method comprising the steps of receiving data values from the sensor, storing the received data values in a temporary private database that is inaccessible by at least a first application program, tracking time since collection for collected data values, presenting at least a first redaction option via the interface, upon selection of the first redaction option, rendering the at least a first data subset stored in the temporary database permanently inaccessible to the at least one application program and upon the tracked time since collection of stored data values reaching a threshold period, releasing the stored data values for use by the at least a first application program.

21 Claims, 41 Drawing Sheets

(56) References Cited

U.S. PATENT DOCUMENTS

| | | | |
|---|---|---|---|
| 2014/0249877 A1* | 9/2014 | Hull ............... | G06Q 10/063114 705/7.15 |
| 2016/0125348 A1* | 5/2016 | Dyer ................ | G06Q 10/06398 705/7.42 |
| 2017/0270437 A1* | 9/2017 | Johnstone ........... | G06F 11/3072 |

OTHER PUBLICATIONS

Cavoukian, Privacy by Design, The 7 Foundational Principles, Information and Privacy Commissioner of Ontario, Canada, Originally Published Aug. 2009, Revised Jan. 2011, 2 pages.
Deloitte / Ryerson University, Privacy By Design, Setting a New Standard for Privacy Certification, date unknown, 11 pages.
Online Trust Alliance, an Internet Society Initiative, IoT Security & Privacy Trust Framework v2.5, Oct. 14, 2017, 6 pages.

* cited by examiner

Employee Data Privacy Grants

| Employee ID | Data Grant | Area(s) | Period(s) |
|---|---|---|---|
| 00001 | None | PWS | 12A-1P |
|  | Cat-2 | PWS | 8A-12A; 1P-4P |
|  | Cat-3 | - | - |
| 00002 | Cat-3 | AWS | All |
|  | Cat-5 | - | - |
| 00003 | Cat-2 | - | - |
|  | Cat-5 | Common Areas (CA) | 8A-12A; 1P-4P |
| 00004 | . . . | | |
| XXXXX | . . . | | |

Fig. 9

Commissioning Procedure - View And Change Detailed Data Grant – Your current data grant is detailed below. Select options to open pull down menus to change specific settings.

| ID | |
|---|---|
| Association | Personal ID |
| Location(s) | All |
| Time | All |
| Data Persistence | 2 weeks |
| C/P Persistence | No |

| Services Type | Personal Services | | Employer Services | | Service Provider Services | | 3P Use | |
|---|---|---|---|---|---|---|---|---|
| Location | Details | Desired/None | Details | Desired/None | Details | Desired/None | | Desired/None |
| Health | Details | Desired/None | Details | Desired/None | Details | Desired/None | | Desired/None |
| Space Use | Details | Desired/None | Details | Desired/None | Details | Desired/None | | |
| Software Use | Details | Desired/None | Details | Desired/None | Details | Desired/None | | Desired/None |
| Internet Use | Details | Desired/None | Details | Desired/None | Details | Desired/None | | Desired/None |
| Content Development | Details | Desired/None | Details | Desired/None | Details | Desired/None | | |
| Collaborative Activities | | | | | | | | |
| All | | | | | | | | |

Back     Save

Fig. 15

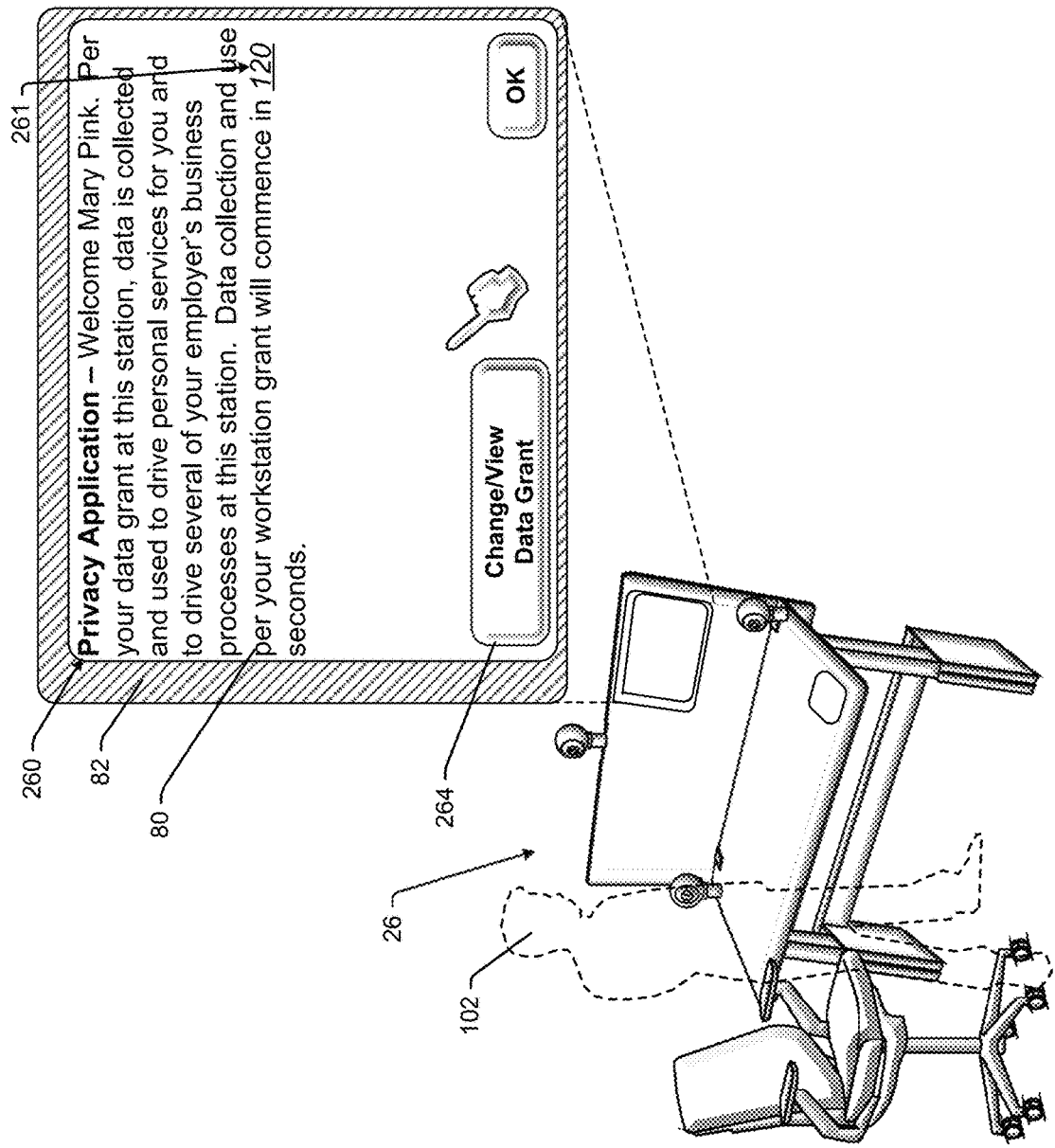

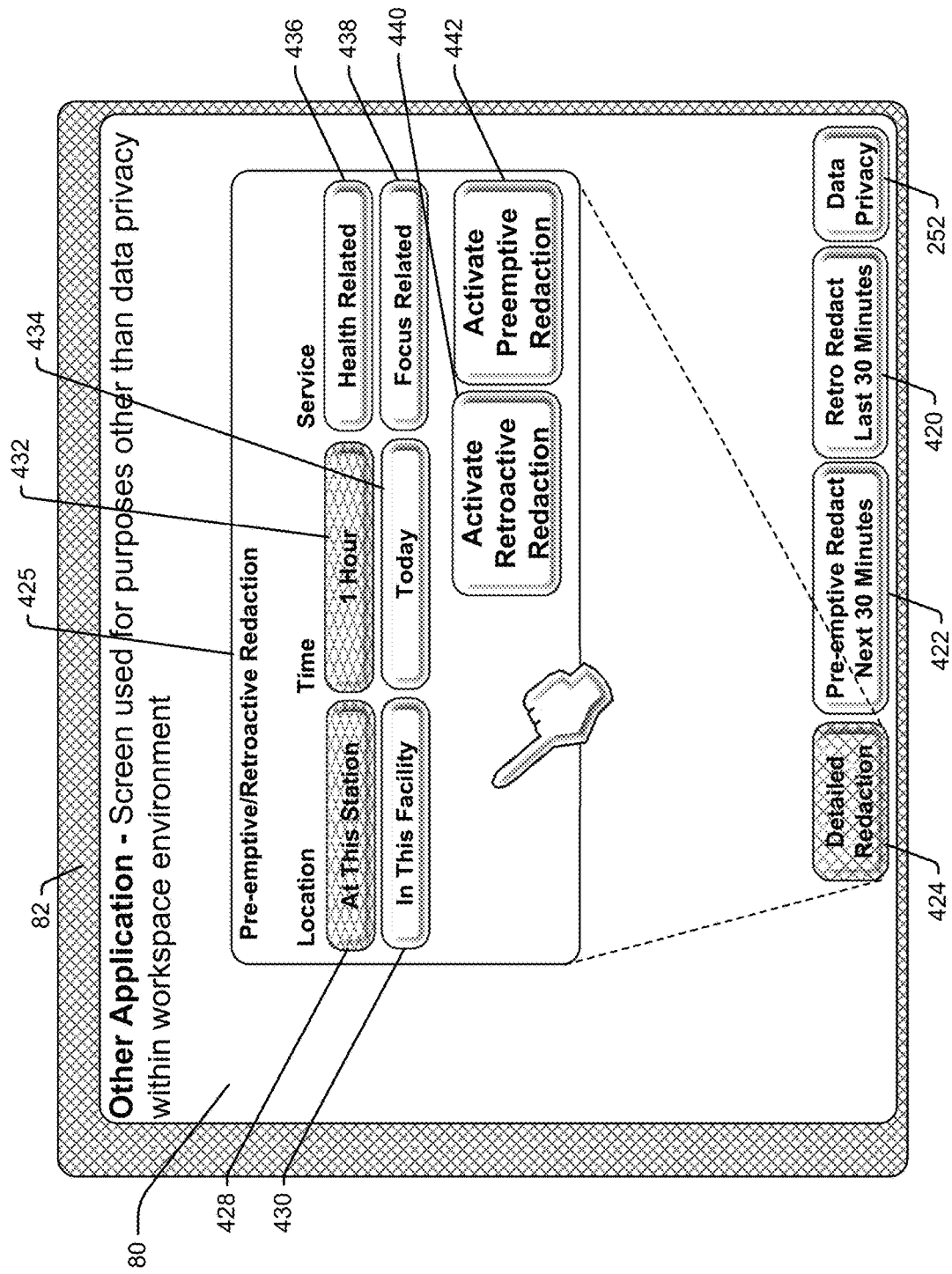

Commissioning Procedure - Exemplary Conclusions And Prescriptions Based On Your Detailed Grant — Your current data grant is summarized below. Select options to see real conclusions and prescriptions related to any of the specific data grants.

| Employer Services – Collaborative Activities | |
|---|---|
| Conclusion | Prescription |
| Employee XX collaborates well in small groups but tends to be shy in larger groups. Employee XX is particularly effective in diadic settings where she listens and shares freely. | Prepare more for meetings to build confidence in your positions. |
| Employee participates in group meetings much more effectively when her immediate boss in not present. | Need to build trust and confidence between employee and her boss to tap into ultimate capabilities of the employee. |

| | Personal Services | Employer Services |
|---|---|---|
| Location | Grant – Cs/Ps | Grant – Cs/Ps |
| Health | Grant – Cs/Ps | No Grant |
| Work Effectiveness | Grant – Cs/Ps | No Grant |
| Space Use | Grant – Cs/Ps | Grant |
| Software Use | No Grant – Cs/Ps | No Grant – Cs/Ps |
| Internet Use | No Grant – Cs/Ps | No Grant – Cs/Ps |
| Content Development | Grant – Cs/Ps | No Grant – Cs/Ps |
| Collaborative Activities | No Grant – Cs/Ps | Grant – Cs/Ps |
| All | | No Grant – Cs/Ps |

| | Personal Services | Employer Services | Service Provider Services | 3P Use |
|---|---|---|---|---|
| Location | Details | Details | Details | Desired/None |
| Health | Details | Desired/None | Desired/None | Desired/None |
| Work Effectiveness | Details | Desired/None | Desired/None | Desired/None |
| Space Use | Details | Desired/None | Desired/None | |
| Software Use | Details | Desired/None | Desired/None | |
| Internet Use | Details | Desired/None | Desired/None | |
| Content Development | Details | Desired/None | | |
| Collaborative Activities | Details | Desired/None | | |
| | All | | | |

Commissioning Procedure – View And Change Data Grant – Based on your personal, employer, service provider and third party service selections, your data grant would include teh following details. Select specific data grant options to access pull down menus to modify specific data grant details.

| ID | Personal ID |
|---|---|
| Association | All |
| Location(s) | All |
| Time | 2 weeks |
| Data Persistence | |
| C/P Persistence | No |

| ID | Anonymous |
|---|---|
| Association | All |
| Location(s) | |
| Time | 9A-12A; 1P-5P |
| Data Persistence | 6 months |
| C/P Persistence | Persistent |

| ID | Personal ID |
|---|---|
| Association | PWS |
| Location(s) | All |
| Time | |
| Data Persistence | Persistent |
| C/P Persistence | Persistent |

Back   Save 80, 82, 350

DATA COLLECTION, STORAGE AND MANAGEMENT SYSTEM AND METHOD

CROSS-REFERENCE TO RELATED APPLICATIONS

This application is related to and claims priority from U.S. provisional patent application Ser. No. 62/434,732 which is titled "Data Collection, Storage And Management System And Method" which was filed on Dec. 15, 2016 and which is incorporated herein in its entirety by reference.

STATEMENT REGARDING FEDERALLY SPONSORED RESEARCH OR DEVELOPMENT

Not applicable.

BACKGROUND OF THE DISCLOSURE

The field of the disclosure is data privacy and more specifically systems, devices and methods for collecting, controlling, managing and storing data related to enterprise employees.

Workplace privacy has historically been important and expected in many workplace environments. In this regard, most employers and employees want and expect at least some level of privacy at personal workstations for various reasons. For instance, often times employees need to attend to personal activities (e.g., schedule a doctor's appointment, field a personal or business related phone call, take a 10 minute nap, etc.) during a workday. Where an employee can complete some personal activities during a lunch or other break while at work in at least a semi-private setting instead of having to leave an employer's facility to complete those activities in private, the employee's time is more efficiently used and the employee benefits. Here, the employer also benefits because the employee's time away from work activities is minimized.

As another instance, many employees adopt an optimal individual working state for effectively and efficiently performing personal work activities when in private that may be different than their cultivated public personas. For example, a first employee may be most comfortable, effective and efficient in shorts and a tee-shirt with an ever changing posture and charged up on 5 cups of coffee when working individually at her workstation but may cultivate a much more polished public persona. The same first employee may also struggle with intermittent drafts on her way to superb final work product in an iterative fashion where her drafting process would have a stifling effect on her creativity if made public. In this case, both the first employee and her employer have clear interests in her sense of personal privacy while located at her workstation.

As yet another instance, employers often want to cultivate a collaborative environment where employees freely exchange ideas and information. Here, in many cases, employers want to create environments where ideas, however different, are always voiced and respected. Knowing that shared ideas in a collaborative effort remain private enables employees to share ideas without fear of public judgement and ultimately, in most cases, generates better work product. Many other employer and employee benefits stem from private or semi-private environments at employer facilities.

In the past, employer and employee privacy was relatively easy to maintain and the level of privacy that could be expected in various environments was easy to discern. For instance, in many cases, at least some employees were afforded private offices that provided both visual and audio barriers where an employee could simply close a door to her personal office space to create a private environment when required. For example, if an HR employee had to field a telephone call from another employee, the HR employee could simply close her office door to create a private space. If the HR employee's door was open, the open door operated as a visual queue to the HR employee and others in the area that conversations with the HR employee may not be private. As another example, conference spaces are routinely fitted out with full floor to ceiling wall structures and doors that close and open to allow entry and exit while also providing privacy when needed.

While privacy has and will continue to be important, employers and employees alike have, in many cases, been willing to sacrifice at least some privacy when the employer, the employee, or both, realize a significant benefit. For instance, employee security often trumps privacy concerns and therefore both employers and employees routinely accept surveillance cameras in common or public employer facility areas. As another instance, enhanced collaboration activities and results often trump privacy concerns when an employer is contemplating locating telepresence systems in conference rooms. As yet one other example, cost and perceived collaboration benefits often trump employee privacy preferences when employers move from completely private office spaces to open floor plan office arrangements that provide only partial visual and audio barriers between employee workstations. As another example, wayfinding systems have been developed that use employee location and target destination to provide guidance to employees for finding conference and other specific locations within employer facilities. In this case, an employee may give up location privacy to take advantage of wayfinding service benefits.

Relatively recent technological advances have appreciably complicated workplace privacy issues. For instance, computer and communication networks that link computing and communication devices within employer facilities, among employer facilitates, with customers, with service providers, and in many cases to the outside world, present conditions where there is no clear and reliable queue when an employee's on line activities are private. For example, when an employee creates a document at work, often times that document is stored in the "cloud" on some remote server where the document could or may be accessed by someone else. As another example, where a telepresence camera generates video of an employee during a telepresence meeting, the video of the employee may be stored on a remote server, again, accessible in at least some cases by others.

As another instance, the Internet and other networks that enable employees to access third party websites and services has given rise to another whole set of privacy concerns. For example, which websites employees access while at work or while remotely using an employer's computing devices, what employees do at the websites, what employees buy via the Internet, etc., all raise various types of privacy concerns. While shopping sites like Amazon or E-bay routinely track links, purchases, customer reviews, etc., what rights if any should an employer have to that or similar types of information related to their employees?

As yet one other instance, the electronics industry, fitness industry and healthcare industry are quickly developing many different sensor types to be installed or employed in many different locations to gather various types of information through computer and communication networks. For example, some of the first sensors developed for commercial use have been in wearable devices like health monitoring watches that can sense user temperature, heart rate, blood pressure, physical activities like walking, running, swimming, posture (e.g., standing or sitting, etc.), etc. Other sensors have been developed for placement within a user's environment like, for instance, presence sensors, sound sensors, ambient temperature sensors, airflow sensors, humidity sensors, light sensors, position sensors (e.g., is a tabletop in a high or a low position), weight sensors, employee posture sensors, biometric sensors, location sensors, camera sensors, etc.

Another sensor type is one that can sense and track various computing activities such as, for instance, employee time interacting with specific software applications, amount of work product in sheer volume generated by an employee in various software applications, amount of time an employee uses one or more computing resources, etc.

While some companies are installing and/or activating various types of sensor devices in facilities and starting to think about what can be done with the sensed information, what is currently seen in the market is only the tip of the iceberg when it comes to the value proposition associated with the types of data being generated and collected. As background for the present disclosure it is helpful to acknowledge several general truths. First, the types of sensors located in workspaces and throughout spaces occupied by employees and the types of collected data are currently and will continue to grow exponentially in the next few years.

Second, the uses of collected data will grow exponentially into the foreseeable future. For instance, as more data and different data types are generated, data will be analyzed and combined in different ways to draw conclusions or generate diagnosis and, ultimately, to generate suggestions or prescriptive actions (hereinafter "prescriptions") or advice for employers and employees and to be used by employer and employee service providers (e.g., other parties that use data to drive services for the employees and/or employers) or by third parties that mine the data for general purposes not directly related to employer or employee services (e.g., an on-line retailer looking for employee trends to sell non-work related products to employees). For example, some conclusions may be as simple as suggestions that employees need to get up and move more during their work days for fitness purposes or that employees should leave workstations for meetings 5 minutes earlier so that meetings can commence on time. More complex conclusions and prescriptions may be grounded on employee activities within specific software applications, an analysis of intermittent employee work product when developing final documents, more comprehensive diet or exercise guidance, guidance on work habits designed to help an employee achieve a flow state more quickly and to prolong flow states, etc. Many other conclusions and prescriptions are contemplated by this disclosure.

Third, the value of many of the data supported conclusions and prescriptions to individual employees will increase substantially. As conclusions and prescriptions become more varied, reliable and accurate, employees will be personally motivated to base work and personal decisions on those conclusions and prescriptions and will start to rely thereon to improve work and personal circumstances. For example, an employee that recognizes a health benefit from following a sit-stand regimen at a height adjustable workstation suggested by an interface device at her workstation based on sensed sitting and standing activities may be more open to other automated health advice such as encouragement to walk for 30 minutes during a lunch break. As another example, a conclusion that an employee should not eat a specific food (e.g., ice cream) during lunch based on flow sensing at her workstation in the afternoon during a prior month may be relied upon by the employee to change her diet and increase her focus and ultimate work performance appreciably. As yet another example a prescription that an employee should depart for meetings 5 minutes earlier than her tendency so her on-time record improves should result in better meeting initiations and therefore result in more deference and value ascribed to the sensing and assisting system.

Fourth, in many cases the value of conclusions and prescriptions for employees will be inversely related to the level of privacy preferred by the employee. For instance, a conclusion that an employee is not healthy or is not eating well or has difficulty attaining a flow state in the afternoon or needs to arrive earlier at meetings with other employees which may have a great motivating benefit to the employee, could also be embarrassing and therefore most employees would like to maintain those types of conclusions private.

Fifth, employee privacy preferences depend, at least in part, on data types and related types of conclusions and prescriptions, on who is considering the data types, conclusions and prescriptions, for how long parties have access to specific data types, conclusions and prescriptions and how closely collected data is tied to the identities of specific employees. For instance, in most cases an employee feels differently about a conclusion that an employer's general workforce should improve their diets than a conclusion that the specific employee should consume less calories during lunch. As another instance, while an employee may have no problem with her employer knowing that she likes to eat salads at lunch, she may not want local restaurants to possess that same information which could lead to unwanted electronic or other solicitations.

Sixth, employee privacy preferences are often situational or contextual. For instance, in general, employees may not care if an employer tracks their location but many employees may care if an employer knows when and for how long they are in a restroom, if the employee is located in a human resources department for an extended period of time, if the employee spends extra time in a facility workout room one day, etc. As another instance, while an employee may generally have no problem with an employer tracking some health related parameter like flow state, on specific days (e.g., the day after a party) or at specific times (e.g. hours after a large lunch meal with friends), the employee may not want her flow state tracked as collected data may be anomalistic or may fuel a conclusion that the employee is having more general focus issues. As still one other example, while an employee may generally have no issue with an employer maintaining a log of work product development including work in progress documents for historical reference (e.g., to see how a product design was developed over time) by a project team, the employee may not want that log available generally to anyone for any purpose such as drawing conclusions about employee efficiency during project activities. As still another example, an employee may not want an employer to track her location generally but may want to authorize tracking while she is travelling to a specific conference room at a large and unfamiliar employer campus so that she can be fed wayfinding information along her way to the destination room.

Seventh, different employees will have different data privacy preferences and expectations. For instance, a first employee may not care at all how data collected in an employer's facility is used by anyone including the employer or third party service/product providers, a second employee may only want data used anonymously by the employer for a subset of possible applications, and a third employee may object to collection or any use of data by any entity for any purpose other than those considered essential to an employer (e.g., security, access to facilities, telepresence participation, etc.).

Eighth, in many cases employers and third party service and product providers do not need unfettered access to all data of a specific type to generate reliable conclusions and therefore, if a subset of employees prohibit collection or restrict access to data of a specific type, useful conclusions and prescriptions may nevertheless be generated using data of that type related to other employees.

Ninth, as conclusions and prescriptions based on collected data become more varied, reliable and accurate, employers and third parties will push harder for access to employee data to drive those conclusions and prescriptions and will ascribe greater credence to each conclusion and prescription, ultimately grounding business decisions more squarely thereon. For instance, an employer may adopt some type of incentive program for employees to increase overall employee health based on data supported conclusions and prescriptions. As another instance, an employer may decide to promote or demote an employee based on data supported conclusions and/or prescriptions. A third party like an office furniture company may use space-use data to recommend a redesign of an employer's conference rooms to increase collaboration and overall space use efficiency, to suggest more natural light in specific facility locations, to suggest more walls or screens in some areas to increase a personal sense of privacy, etc. Many other conclusions and prescriptions will result and are contemplated.

Tenth, employees are generally against or uncomfortable with workspace data collection in great part because the extent of data collection and limitations on data use are not clearly defined. For instance, even in the case of a security camera in a public space, how many employees clearly understand how long video is stored for, who views the video, if third parties have access to the video, if the video is used for some other purpose like tracking how long employees are away from workstations, how the employees interact with other employees, etc.? In the case of security cameras, employees accept the camera because of the security benefit but clearly would prefer to have no public cameras because of uncertainty regarding how data (e.g., video) collected thereby is used.

Similarly, an employee may be fine with her weight being measured by a chair seat sensor if she was absolutely clear that the weight data would never to be used in any way that associates the weight value with the specific employee or if she knew the weight value is only used instantaneously to generate some group health statistic and is then discarded. It is believed that if employees had a more clear understanding of data collection and use limitations, conclusions drawn and prescriptions generated, employees would be far more open to allowing employers, service providers and third party's data access and use.

Eleventh, personal privacy is on a slippery slope as people in general become more and more comfortable with less privacy over time, even in the face of confusion over how data is being used. To this end, when balancing the value of services with erosion of personal privacy, most people opt for the services. For instance, most people routinely accept that when they are in public spaces, video cameras will record their presence for security purposes. As another example, most people have accepted that shopping web site operators will track and memorialize every click and purchase a visitor makes at their websites and that that information will be used by the shopping site operators or some other third party entity to identify likes and dislikes and to offer other purchase options to a shopper. Here, the shopper gives up privacy regarding what they are buying and looking at for the convenience of using the web site to shop and purchase. Every day, more and more personal information is given up and that trend will continue and accelerate as the value-privacy balance becomes more heavily weighted to the value side of the equation.

Twelfth, while many different types of sensor data are now available and data types and related conclusions and prescriptions are and will continue to increase exponentially, employers and third parties are struggling with how to access data they need to drive their business decisions without running afoul of legal requirements and societal and employee privacy expectations. In many cases, while sensing and computing capabilities are now available, employers are simply foregoing the opportunities associated therewith to avoid privacy issues and any appearance of overreaching. In other cases employers and third parties are only collecting and processing a subset of available data and are foregoing the benefits associated with other data, conclusions and prescriptions, as part of a haphazard and ill-conceived effort to deal with perceived privacy concerns.

In still other cases employers and third parties are requiring authorization from employees to collect and use data to drive conclusions and prescriptions they deem necessary. In these cases, authorization is often sought via a form (e.g., a data collection and use authorization form referred to hereafter as a "data authorization form") endorsed by an employee upon being hired. In many cases, where an employee is presented with a data authorization form, the form is complex, filled with legalese, and difficult to understand. In addition, in many cases, data authorization forms are presented to an employee either as a condition for employment or at a time when the employee is in a rush or attempting to gain some immediate benefit associated with a data collection process (e.g., a browser may ask to track my location via GPS when I search for a specific store). In each of these cases, under the press of time and given form complexity, most employees either do not carefully review forms and therefore are unaware of the authorization grant they give when endorsing the form, review forms but fail to understand what is being authorized, or may have a sense of what is being authorized but fail to recognize that in some situations they would not be comfortable with the grant they are authorizing (e.g., many employees do not want an employer to track bathroom time based on location data when they authorize collection of location data to drive location based services). In addition, where forms are used to obtain data collection and use authorization, because data types and uses are proliferating at a rapid pace, the forms tend to be very general in nature so that the authorization grant covers future data types and uses which makes it impossible for employees to understand what is being given up when endorsing a form.

Thus, a system is needed for giving employees a clear understanding of data collected and uses thereof so that employees can give fully informed consent to data collection and uses. Here, in some embodiments it will be advantageous if the system helps employees understand data collection and uses over time and in different situational cases either prior to or before an authorization grant so that the employee has a more developed understanding of the grant they authorize and has the opportunity to adjust the grant after a better informed understanding. Informed consent will enable employers and other third parties to collect and use data with confidence that those activities will not run afoul of employee or, in some cases, societal expectations or an employee's legal privacy rights. It would also be advantageous if the system could accommodate specific employee data collection and use preferences so that, in cases where at least a subset of employees do not authorize collection of at least some data or some uses of at least some data, employers can still obtain the benefit of data collection, conclusions and prescriptions based on a smaller subset of collected data. It would further be advantageous if the system enabled employees to control data collection and use in real time when an instantaneous preference is different than the employee's standard preference or authorization grant. Here, it would be advantageous if real time control enables an employee to affect future data collection and use or, in some cases, also allow a claw back of prior collected data for at least some period of time.

SUMMARY OF THE DISCLOSURE

It has been recognized that both employers and employees are uncomfortable with data and privacy rights at a time when huge benefits can be offered to all if more certainty about uses and data protection can be provided. Employers have to be comfortable from a legal, employee expectation, and cultural perspective that they have fully informed consent from employees to collect and use data for legitimate business purposes. Here, fully informed consent means that employees are provided the ability to clearly understand data collection and use rights they are authorizing when authorization is given. In some cases, fully informed consent means that consent needs to be obtained temporally proximate or spatially proximate a data collection event.

Once fully informed authorization is obtained, employers will be much more inclined to implement sensing and data use systems that can add significant value to their business enterprises. In effect, tools that give certainty to informed employee authorization or consent will unfetter employers and allow them to ask employees for and receive greater data access and use rights to drive various business conclusions and prescriptions.

From the employee's perspective, if employers can give employees certainty on which data employees are allowing employers to collect and how that data will or is being used, employees will be far more likely to willingly authorize employers to collect additional data types and use collected data to drive many more conclusions and prescriptions. Thus, for instance, if an employee is specifically assured that weight measurements will always be maintained private and that only a processor providing services to the specific employee will use the measurements to provide personal services to the employee, authorization to collect weight data will be more readily given. As another instance, if an employee knows that workstation presence data will only be used anonymously to track overall space use and not to track specific user activities, authorization to track user location will be easier to obtain.

In at least some cases it is contemplated that data collection and use authorization will include a triage process whereby employers obtain data collection and use authorizations or employee grants in several different ways, depending on the types of data collected and data uses. For instance, a first grant type may include a grant to collect and use all data that is absolutely required by an employer to run its business and that all employees have to authorize as part of their employee agreement. Data grants beyond the minimum required grant may be obtained through interaction with system components according to any of several different commissioning processes designed to help an employee fully understand data collection and use grants being authorized.

For instance, in some cases, prior to authorization, an employee may be provided with a simple explanation of data collection and intended use. In other cases, employees may be presented with exemplary conclusions and prescriptions related to various personal, employer and/or service provider and third party services so the employee has a better sense of data use and ultimate results. In still other cases, an employee may be able to participate in a completely confidential commissioning procedure where all or a subset of services generate real conclusions and results based on real data associated with the employee. Here, after considering the real conclusions and results, the employee can make an informed decision regarding data grant authorization for normal use after commissioning is complete.

In some cases a system server may present service options to an employee over time and in context so that the employee can consider grant authorizations in a context or situationally as opposed to in a vacuum out of context. For instance, health and fitness and focus related services may be offered to an employee one at a time at the employee's primary workstation for contextual and service specific consideration. As another instance, a wayfinding service may be presented to an employee when the employee arrives at an unfamiliar facility or when a system server recognizes per a calendar application used by the employee that the employee is scheduled for a meeting at a distant location. Here, the employee could experience the service in a confidential way and could authorize a data grant required to facilitate the service in the future if the employee found value in the service. In the case of an employer or other party service, the employee could get a sense of the value and the results of that service confidentially and could then determine if she is comfortable with a data grant required to drive the service thereafter. Other services would similarly be offered for consideration in context.

In some embodiments an employee may consider and authorize certain data collection and service types, conclusions and prescriptions, and, any time a conclusion or prescription that is substantially different than those previously authorized is generated, the conclusion or result may be presented to the employee for consideration prior to release. Here, the employee may reject and thereby delete the new conclusion or prescription, accept the conclusion or prescription and thereby release it or release the conclusion or prescription with a comment. Where a result is released or deleted, the associated service may be qualified in the future for the employee so that the result is either automatically released or is not generated at all in the future.

In some embodiments a data redaction feature may be implemented. In this regard, in some cases an employee associated with a specifically restricted data grant may, at times, want a much greater restriction. Here, the employee may want to claw back some data previously collected and in other cases, the employee may want to pre-emptively restrict data collection and use for some immediate time period. Simple and intuitive retroactive and pre-emptive redaction tools are contemplated.

In some embodiments a system server may run background personal/employee and employer services to identify interesting events or circumstances and may offer conclusions and prescriptions and related services for consideration. Here the idea is to provide a sort of nosey personal and employer's assistant that can point out interesting conclusions and prescriptions and automatically entice employers to request additional grants and employees to authorize additional grants.

In some cases it is contemplated that different affordance configurations may be associated with different data grant requirements that would have to be accepted by an employee in order to use the configurations. Here the employee would be free to accept the required grant or search for another station associated with a more restrictive grant that is in line with the employee's preferences.

In some embodiments sensors may be provided with spatially associated indicators to indicate any of several different sensor statuses. For instance, an audio or visual indicator (e.g., a light device) may be located proximate a camera lens to indicate sensor activation, data collection, data storage, that collected data is about to be released or transmitted for use by some service, that data is ready to be released by an employee, that data collected by the sensor will be used to drive certain service types (e.g., fitness related, focus related, wayfinding related, space use related, etc.), that data collected by the sensor will be used to drive services for one or more types of data consumers (e.g., the employee, the employer, a service provider, a third party, etc.). In other cases, other indicators may be provided within an employee's field of view at an affordance configuration to indicate states of different sensors or services related to sensors that cannot be viewed in the employee's field of view. In some cases the indicators may also operate as control buttons for manually changing sensor states and service activations. An employee badge with ability to indicate grant and data collection and use states and for controlling those states is also contemplated.

In some embodiments a server may be programmed to handle disparate employee data grants for collocated employees in any of several different ways including, by reverting to a most restrictive grant for any of the collocated employees for all of the collocated employees, use a most restrictive grant possible for all collected employees if the system cannot verify a grant for at least one of the collected employees, and use employee specific grants for employee specific data to drive services related to the specific employees and use data associated with all collected employees to drive services related to collaboration and other multi-employee related services. Many other data grant treatments for dealing with collected employees are contemplated.

BRIEF DESCRIPTION OF THE SEVERAL VIEWS OF THE DRAWINGS

FIG. 9 is a schematic illustrating the employee data privacy grants in FIG. 7 in greater detail;

FIG. 15 is similar to FIG. 10, albeit showing a commissioning procedure screen shot at a different point in the commissioning process;

FIG. 16 is similar to FIG. 10, albeit showing a commissioning procedure screen shot at a different point in the commissioning process;

FIG. 17 is a screenshot showing various types of privacy system tools useful to redact data grants or collected data;

FIG. 19 is similar to FIG. 10, albeit showing a commissioning procedure screen shot at a different point in the commissioning process;

FIG. 25 is similar to FIG. 10, albeit showing a commissioning procedure screen shot at a different point in the commissioning process;

DETAILED DESCRIPTION OF THE DISCLOSURE

Figure 1:
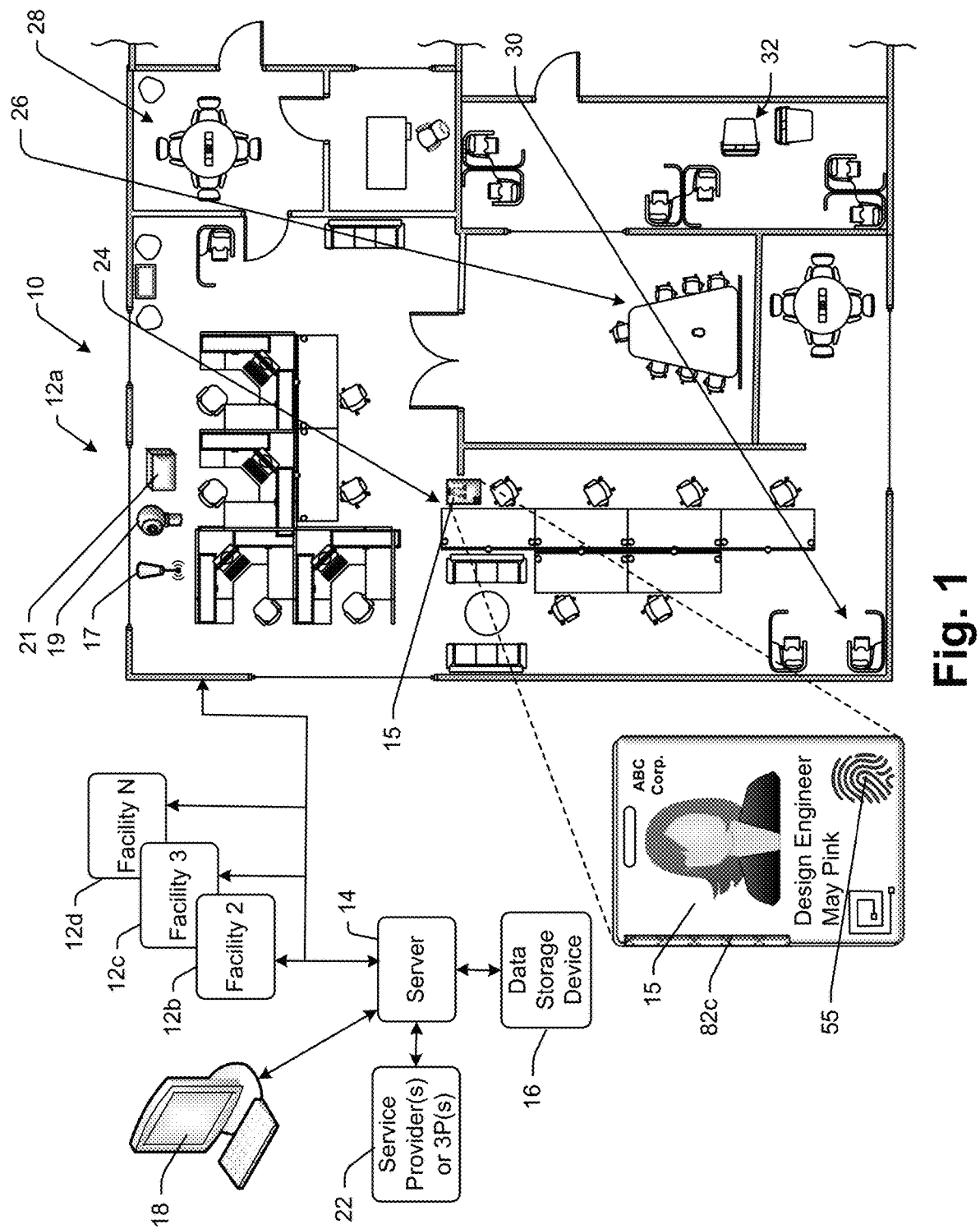
FIG. 1 is a schematic view of a data grant control and management system that is consistent with at least some aspects of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale unless indicated otherwise. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that a signal may represent a bus of signals, wherein the bus may have a variety of bit widths and the disclosure may be implemented on any number of data signals including a single data signal.

The various illustrative logical blocks, modules, circuits, and algorithms described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that some embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

While various aspects of the present disclosure are applicable to many different industries (e.g., education, places of business, hospitals, libraries, etc., where different levels of privacy may be expected or desired), in order to simplify this explanation and unless indicated otherwise, the present invention will be described in the context of a set of real estate facilities that are owned by a single employer and, people that work or operate in any context within the facilities will be referred to generally as "employees". Thus, for instance, the term employee will cover a person that is actually employed by the employer, a contractor within one of the employer's facilities, a facility visitor, maintenance personnel, etc.

The phrase "service provider" will be used to refer to any entity that is engaged by either an employer or an employee to provide a service or services for the employer or employee. For instance, if an employee engages a fitness trainer to monitor various fitness parameters and provide fitness coaching, the trainer would be a service provider to the employee. As another instance, if an employer engages an interior design firm to monitor space use in facilities and to provide advice on improving space design for specific functions, the firm would be a service provider to the employer.

The phrase "third party" will be used to refer to an entity that purchases data to be used for some purpose which is not directly related to an employee or employer service. For instance, a restaurant near an employer's facility may purchase data related to employee eating habits data from an employer in order to generate a more appealing menu and discount options to offer to employees. Many other service provider and third party scenarios are contemplated.

The phrase "sensing device" will be used broadly, unless indicated otherwise, to cover many different types of devices that can generate sensed parameter values.

The term "parameter" is used to refer to an indisputable condition like, for instance, ambient temperature, presence, weight, presence of light, light intensity, humidity level, etc.

The term "conclusion" will be used to refer to any condition that is automatically derived from base parameter values such as, for instance, that an employee is in or out of a flow state, that an employee currently has poor posture, that an employee spent too much time on a specific aspect of a project or on one project when compared to another given the importance of each, that an employee becomes drowsy when it is too warm in her personal space, etc.

The phrase "personal conclusion" will be used to refer to any summary indication provided by an employee. For instance, a personal conclusion may include a positive data entry by an employee indicating that she was in an intense flow state during the last 60 minutes, that the she enjoyed the natural light at a specific workstation, etc., or a negative data entry indicating that she could not enter flow the entire day or that she wants to avoid being located near some other employee in the future given the other employee's chattiness, etc.

The term "prescription" will be used to refer to any suggested activity for modifying behaviors, conditions or any other space or personal characteristics. For instance, if an automatic conclusion is that a specific employee enters a flow state twice as fast when listening to baroque music than not, a prescription may encourage the employee to listen to baroque music more often. As another instance a conclusion that an employee becomes drowsy when her environment is too warm may lead to a prescription for the employee to adjust ambient temperature at her workstation. A prescription that an employer needs to consider additional large conference rooms may be generated based on a conclusion that existing large conference rooms and completely booked and used 90% of the time during normal business hours.

A. System Components

Referring now to the drawings wherein like reference numerals correspond to similar elements throughout the several views and, more specifically, referring to FIG. 1, the present disclosure will be described in the context of an exemplary enterprise 10 owned by the employer, the enterprise including a set of facilities 12a, 12b, 12c . . . 12n, a server 14, one or more system memory/storage components 16 (hereinafter "storage device 16") and one or more computer terminals or other types of I/O devices 18 for use by one or more system administrators. Also shown in FIG. 1 are exemplary service providers or third party entities 22 linked to server 14 to receive data therefrom and, in some cases, to provide services in the form of conclusions and prescriptions to either the employer (e.g., accessible via computer 18) or to employees in the facilities.

Facilities 12a through 12n include affordance configurations in which employees work at least some if not most of the time and, in many cases, will include an employer's real estate properties. In addition, one or more of the facilities, in at least some embodiments, may include a personal workstation or other affordance configuration located at some location remote from an employee's real estate properties.

For instance, an employee may have a complete or partially equipped workstation at home and may work remotely at that station several days a week. Here, the employee's home station may be considered an enterprise facility, at least when used to perform work activities.

As another instance, an employee may work at a hoteling workstation at an airport, at a facility owned by a client or a customer, etc., where the hoteling station is equipped with at least some type of sensor device(s) for sensing various employee activities, conditions, etc. In this case, the hoteling workstation may be considered an enterprise facility when used by an employee of the employer.

As yet one other instance, a group of employees may hold a meeting in a hotel conference room or at some other facility remote from the employer's real estate properties. Here, the hotel conference room, when used by the employees for work activities, may be considered an enterprise facility. Even an employee's laptop used remotely or some other portable personal computing device like a watch or other wearable device may be considered a facility when gathering any type of sensed data associated with an employee. To simplify this explanation, unless indicated otherwise, it will be assumed that the facilities in FIG. 1 include the employer's real estate facilities.

Referring still to FIG. 1, only facility 12a is shown in any detail but each of the facilities may have a similar set of affordance configurations and resources for use by employees. Exemplary facility 12a includes walls, windows, doors and other architectural structure that divides the facility into different spaces and sub-spaces and also includes various support affordances that are typically arranged within an office space for use by employees including tables, task chairs, lounge chairs, sofas, telepresence and content sharing display screens, electronic whiteboards, cameras, speakers, etc. As in most office space facilities, the architectural structures and affordances define different spaces that have different looks and feels for use by employees. Some of the spaces are designed to foster and enhance personal work activities while others may be designed to offer personal rest spaces. Other facility spaces may be designed to foster and enhance small group activities (e.g., diadic activity between two employees or other small groups), large group activities (e.g., presentations, collaborative activities, activities related to team projects, etc.), social interaction, employer information sharing, etc.

Referring still to FIG. 1, server 14 is linked to each facility 12a, 12b, 12c, etc., interface 18, and storage device 16 and may be linked to one or more service providers or third parties 22. Server 14 may be linked via hardware, via a wireless communication system or in any other manner. Server 14 obtains data from the linked facilities and provides control information back to those facilities to control resources and affordances in ways consistent with the present disclosure.

While shown as a single server 14, it should be appreciated that server 14 may include a large number of servers that are linked together where each server performs various functions described herein. It should also be appreciated that in some cases some or a subset of the functions of server 14 may be performed by other computing devices such as, for instance, personal computing devices (e.g., laptops, smart phones, tablet type computing devices, etc.) or local computing devices associated with affordance configurations located at the facilities. For instance, see FIGS. 2 and 3 where a personal workstation is shown to include a processor 110 for performing various functions at the workstation. In some cases, local processor 110 and other local processors similar thereto may perform various functions described herein. While at least some of the server functions described hereafter may be performed by many different computers or processor combinations, unless indicated otherwise, the functions will be described as performed by server 14.

Referring still to FIG. 1, in addition to performing various other functions, consistent with at least some aspects of the present disclosure, server 14 collects data from affordance configurations in facilities 12a-12n, stores that data in storage device 16, analyzes the data to draw various conclusions and generates prescriptions based on at least a subset of the conclusions where the conclusions and prescriptions form the basis for various personal services, employer services, service provider services and other services described hereafter. Storage device 16 will be described in greater detail below.

To drive data based services, many of the affordance configurations in facility 12a are equipped with one or several sensing devices of one or several different types. In this disclosure, each sensor collects at least some data related to various environmental characteristics, employee characteristics, employee conditions, employee activities, group characteristics or group conditions, group activities, or monitors or tracks individual employee work product or group work product. A first general sensor type includes discrete parameter sensor devices designed to sense a single parameter like, for instance, temperature, humidity, weight, vibration, movement, light, sound, etc.

A second general sensor type includes cameras. Historically, cameras have been used in office facilities primarily to generate video for security purposes or to drive telepresence systems so that disparately located employees could observe each other during teleconference sessions. More recently, cameras and software have been developed so that many different parameters can be sensed by analyzing videos and images of spaces and employees in those spaces. For instance, camera images and videos can now be used in many cases to sense discrete parameters like ambient temperature, temperature of an imaged object (e.g., an employee), light presence, light intensity, movement, vibration, presence, etc.

In addition, camera images can now be automatically examined by processors running software applications to identify more complex parameters like number of employees in a space, relative employee juxtapositions in space, employee orientations in space, which employee is currently speaking, individual employee posture, the trajectory of an imaged employee's line of sight, an object along an employee's line of sight in an imaged space, employee gestures, employee movements, as well as many other parameters.

A third general sensor type includes sensors that are capable of monitoring various aspects of an employee's or a team's work product (hereinafter "work product sensors"). For instance, a simple work product sensor may include a software module that counts the number of pages of text an employee generates using a word processor during a given time period. Another simple work product sensor may include a module that tracks the number of document versions an employee generates on her way to a final work product or that tracks the time an employee spends on different projects, the time an employee spends on different parts of a single project, number of grammatical errors in a final document, etc. Many other types of work product sensors are contemplated. Similar work product sensors are contemplated for group or team work product.

Work product sensors may be built or integrated into applications like word processors, spreadsheet applications, CAD or CAM applications, content sharing applications (e.g., for team sharing), electronic whiteboard applications, etc., in some cases. In other cases work product sensors may include software modules that query content generation applications and systems (e.g., a word processor, a spreadsheet application, etc.) to collect work product parameter values.

Figure 2:
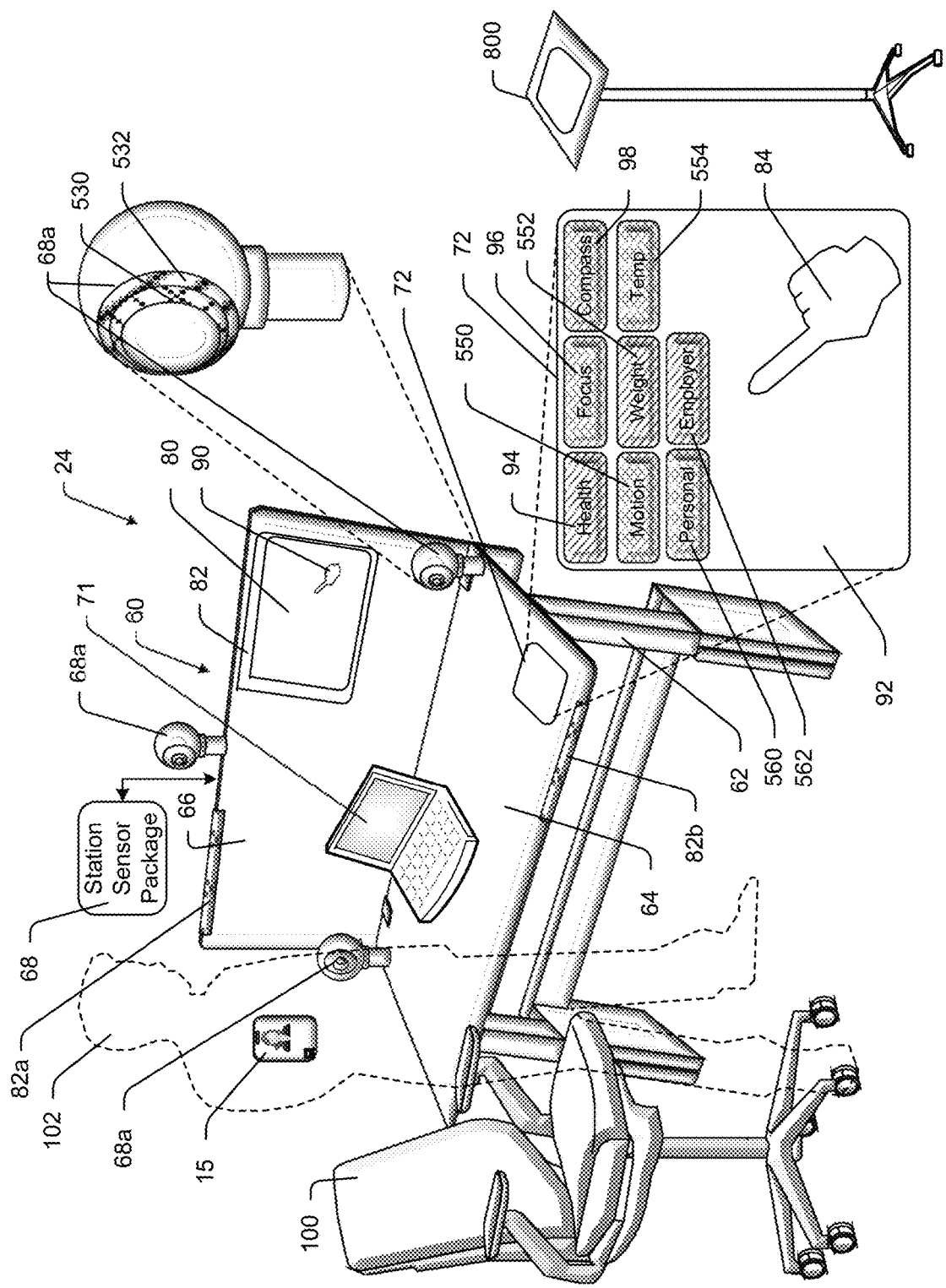
FIG. 2 is a perspective view of one of the personal workstations shown in FIG. 1.
Figure 3:
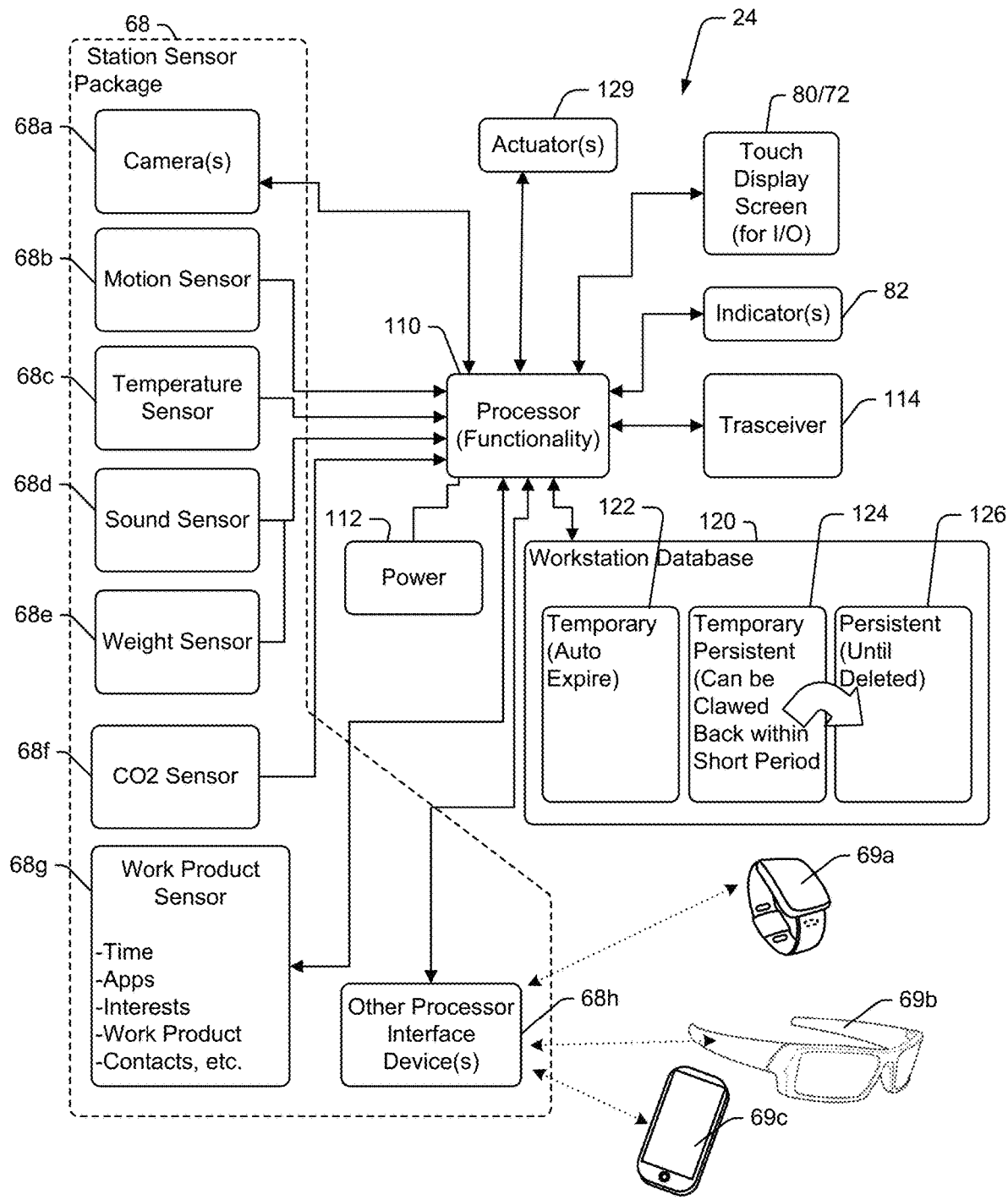
FIG. 3 is a schematic representation of various components that comprise an exemplary workstation as shown in FIG. 2.

Referring still to FIG. 1 and also to FIG. 2, an exemplary personal workstation 24 for supporting an individual employee in facility 12a is illustrated. Workstation 24 is shown in some detail in FIGS. 2 and 3 and includes a table assembly 60 and a task chair 100. Table assembly 60 includes a leg structure 62 that supports a substantially horizontal planar tabletop member 64 and a privacy screen structure 66 that is mounted along a long rear edge of the tabletop member 64 to provide at least some visual privacy for an employee shown in phantom at 102. In at least some cases, the leg structure 62 may be height adjustable so that an employee can set tabletop 64 at a preferred height. As seen in FIG. 3, in some cases the leg structure 62 will include some type of actuator 129 (e.g., a motor) or drive mechanism for driving telescoping sections of the leg to change tabletop height. In other cases the tabletop may only be adjustable via some type of manual user adjustment.

Referring still to FIG. 2 and also to FIG. 3, exemplary station 24 also includes an input/output assembly 80/72, a transceiver 114, a station processor 110, a power supply 112, a set of indicator devices 82, 82a, 82b, a workstation sensor set 68 and a workstation database 120. Processor 110 is linked to each of the sensors 68, actuators 129, the I/O arrangement 80/72, indicators 82, 82a, 82b, transceiver 114, database 120 and power supply 112.

The I/O arrangement may include a flat panel or other type of display screen either spatially associated with table assembly 60 or integrated into one of the mechanical station components. For example, in FIG. 2, an exemplary display screen 80 is shown integrated into privacy screen 66. Screen 80 may be provided adjacent an edge of the privacy screen so that screen 80 can be viewed relatively easily by an employee at station 60 even when the employee has other resources (e.g., a laptop, a large flat panel display screen for content viewing or telepresence, etc.) positioned on tabletop 64. Thus, in FIG. 2, screen 80 is shown located in the upper right hand corner of privacy screen 66. Screen 80 may have a width dimension within a range of 3 to 20 inches and a height dimension within a range of 2 to 20 inches and, in particularly advantageous embodiments, may have a width dimension within a range between 6 and 12 inches and a height dimension within a range between 4 and 12 inches. Screen 80 can be used for many different purposes in addition to providing an output for information related to this disclosure. In addition, in at least some cases, screen 80 will be touch sensitive to operate as an input device for receiving employee input.

While not shown, screen 80 may, instead, be integrated into the top surface of tabletop 64 or into any other generally exposed surface at station 24 including, for instance, a top surface of one of the arm rests on chair 100, into an edge portion of either of screen 66 or tabletop member 64, etc.

Referring still to FIGS. 2 and 3, instead of or in addition to screen 80 being touch sensitive for receiving user input, other input assembly types may be provided at station 24. For instance, in FIG. 2, an input device 72 is integrated into the top surface of tabletop 64. Here, in some embodiments, device 72 may include a touch sensitive emissive surface, mechanical buttons, capacitive buttons integrated into the tabletop 64, etc. In particularly advantageous embodiments the interface 72 may include several buttons and a pad that are integrated into tabletop 64 so that the top surface material is uniform along the entire top surface of tabletop 64. Here, LEDs or other light sources under the tabletop surface may be illuminated to indicate various system states as will be described hereafter so that the selectable options only appear through the tabletop surface when illuminated and where the color of illumination can be changed to indicate different states (e.g., yellow indicating data is being collected at the station but not transmitted to the system server, that data is ready to be transmitted if the employee authorizes, red indicating that no data is being collected, etc.).

In FIG. 2 and throughout this specification, hand representation 84 will indicate a user's actual hand and hand icon 90 on screen 80 or other screens will represent a pointing or selection cursor on that screen that is controlled by an employee touching interface 72 or some other touch sensitive pad in various ways (e.g., dragging, additional pressure or a double tap to select, etc.). While an advantageous I/O arrangement 80/72 is described here, it should be appreciated that many other interfaces are contemplated and the current specification should not be limited by interface type unless indicated otherwise.

It is contemplated that a portable personal computing device 71 like a laptop, a smart phone 69c, a tablet type device or some wearable computing device like a smart watch 69a may wirelessly link to station processor 110 via transceiver 114 or some other interface device 68h and may run one or more applications enabling the personal computing device to operate as an input and output device to processor 110. Here, association of the user's portable device with a specific station or other affordance configuration may be based on proximity or some other association process like activation of an I/O application by an employee or acceptance of an invitation presented via the portable device to associate with a specific station or other affordance configuration.

While portable personal devices may be used as I/O interfaces to a station and more generally to the overall system described herein, it is nevertheless believed that the I/O arrangement should optimally be integrated into or at least persistently associated with station 24. To this end, for at least the foreseeable future, it is likely that many employees will not use personal portable devices that could operate as interface devices or, even where employees have portable devices, in some cases those devices will not be available (e.g., an employee attends a meeting or uses a hoteling space without bringing her portable device). In cases where an employee at a station or other location does not have a portable device suitable to operate as an interface, if station 24 does not have a persistently associated interface, many of the features of the grant and data collection system described here could not be implemented and, in fact, in many cases, data related to employee activities may not be authorized for collection or the authorization may be less informed and therefore data collection foregone to avoid embarrassing overreaching.

In addition, by providing a dedicated system interface at the location of an affordance configuration, the coupled interface can be made far more intuitive and the coupling allows the interface to be simplified appreciably. In this regard, in cases where the system provides an interface via a portable smart phone, tablet or the like, accessing a data collection/use application interface would often require a multi-step process and may in fact require some initiating activity on the part of an employee (e.g., where the portable device is performing some other application). In contrast, coupling a data collection and use control system directly to a workstation makes clear that any otherwise ambiguous signaling is viewed in a context that informs the employee of its meaning. For instance, where the colors green and red are used throughout a system to indicate data collection and use and that no data is being collected, respectively, a visual indicator integrated into a specific station can glanceably indicate data collection or no data collection at that specific station. Similarly, control buttons at a station or other affordance configuration are intuitively associated with that configuration and therefore the control effect associated with a specific button at the station is particularly intuitive. In some cases similar indicating and control devices or buttons may be provided at or near each affordance configuration in the employer's facilities.

Referring again to FIGS. 2 and 3, sensor package 68 includes at least one and in most cases a large number of sensor devices like the sensor devices described above for sensing many different environmental and employee parameters or other events at station 24. Three wide angle cameras 68a, 68b and 68c are shown as exemplary sensor devices in FIG. 2. FIG. 3 lists additional sensors that may be provided at station 24 including a motion sensor 68b, a temperature sensor 68c, a sound sensor 68d, a weight sensor 68e, a carbon dioxide sensor 68f, and a work product sensor 68g. One or more of the sensor devices may be located within chair 100 such as, for instance, weight sensors, pressure sensors, temperature sensors, presence sensors, movement sensors, etc. Moreover, in at least some cases, one or more sensors may be located proximate or in the general vicinity of station 24 and be able to sense parameters at station 24 as well as at other affordance configurations (e.g., other workstations) near station 24. For example, an area camera that captures images of ten workstations 24 in a general area may generate at least some sensed parameter data for each of the 10 stations.

In at least some other cases, sensor package 68 may also include a sensor device 68h for interfacing with other computing devices to obtain other types of sensed parameter data as well as for receiving conclusions and prescriptions generated by other processing devices. For instance, in many cases employees use personal computing devices to sense physiological parameters like heartrate, blood pressure, temperature, exercise habits or statistics, travel statistics (e.g., number of steps in a day, travel speed while walking, etc.), etc. For example, some employees may wear sensing and processing devices on their wrists or as glasses (see 69a and 69b in FIG. 3) or may carry portable personal computing devices (see 69c) that track various interesting parameters. Interface device 68h may be wireless or may require a hardwire connection to obtain information from other processor devices.

Figure 4:
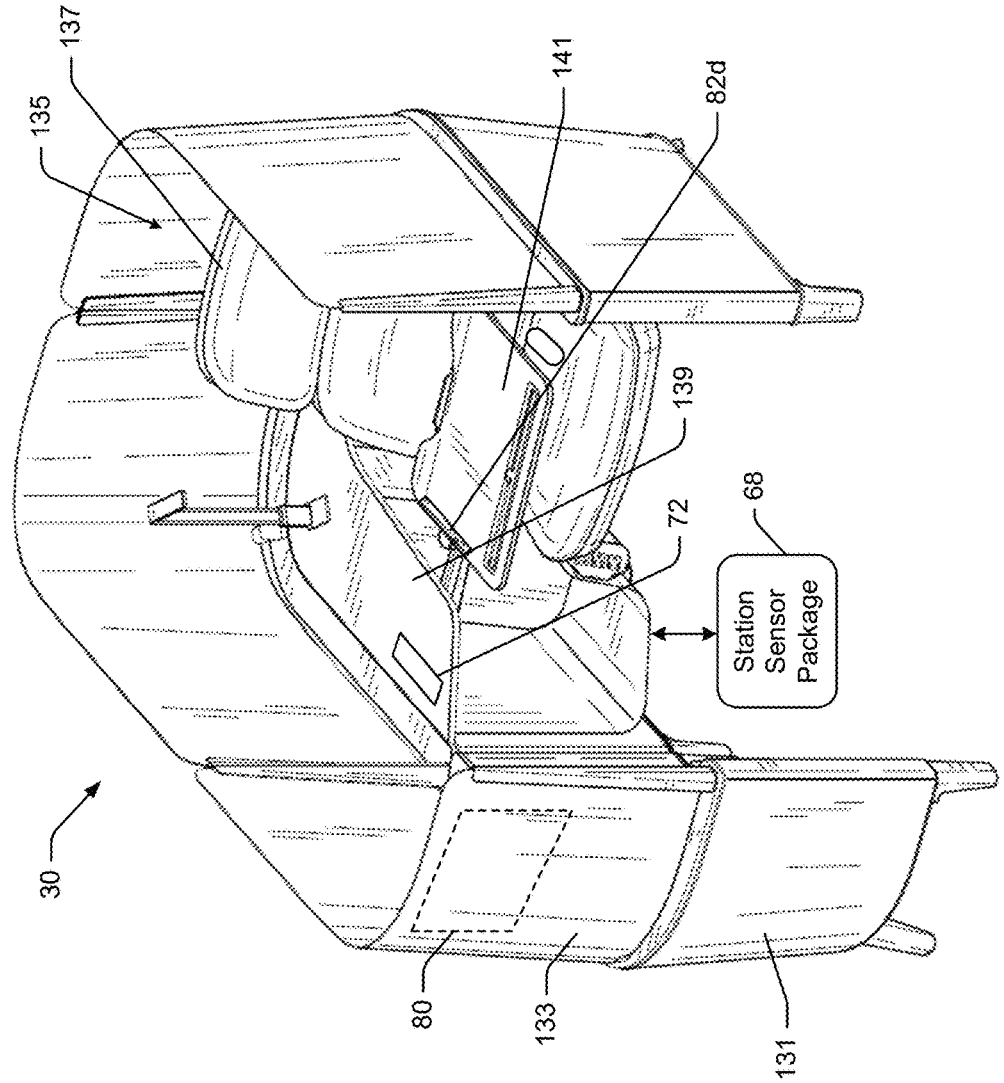
FIG. 4 is a perspective view of a lounge station that is consistent with at least some aspects of the present disclosure.

Referring to FIGS. 1 and 4, another affordance configuration includes a personal lounge station 30 that includes a partial wall structure 131/133 that forms a semi-private lounge space 135. A lounge chair 137 and side table 139 are secured to the wall structure 131/133 and a tablet assembly 141 is mounted to a pivoting support arm to be moveable between use and stored positions by an employee. Station 30, like workstation 24, is equipped with a sensor package 68 for sensing various parameter values at the station 30. In addition, while not shown, it is contemplated that station 30 would include most if not all of the components described above with respect to FIG. 3. In FIG. 4, the I/O arrangement includes a touch pad 72' akin to the pad described above with respect to FIG. 2 and a flat panel display screen 80' akin to screen 80 in FIG. 2.

Figure 5:
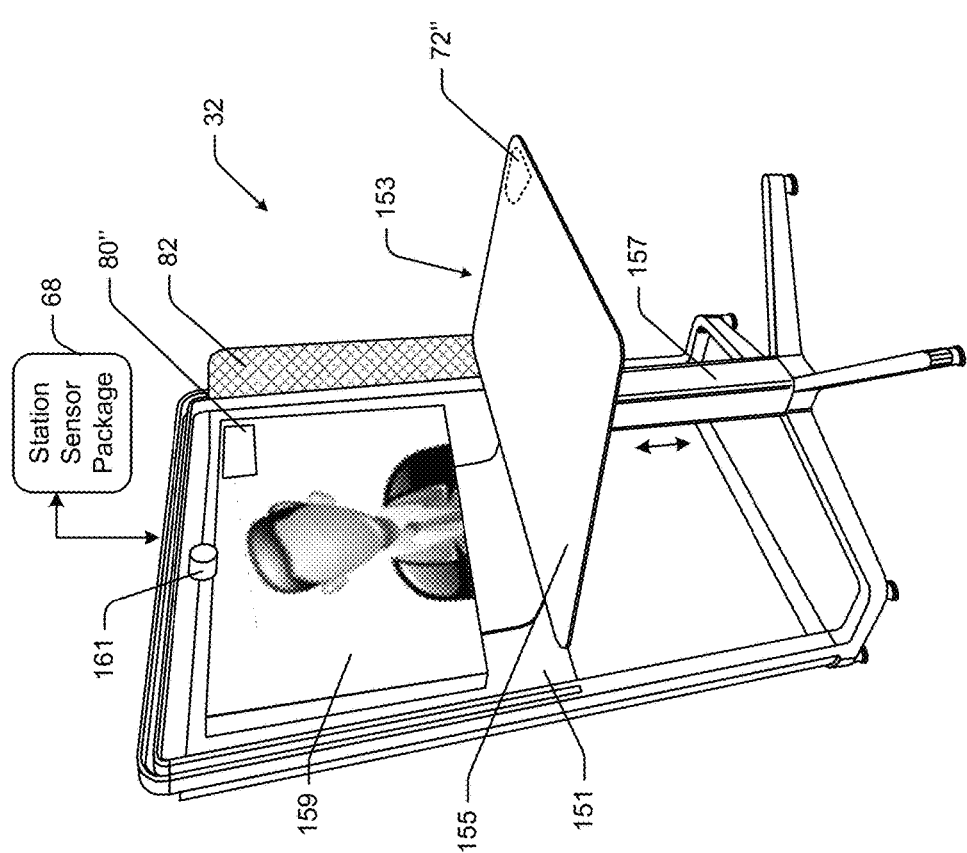
FIG. 5 is a perspective view of a telepresence station that is consistent with at least some aspects of the present disclosure.

Referring to FIGS. 1 and 5, another affordance configuration includes a telepresence station 32 that includes a screen structure 151 integrally attached along a rear edge of a table assembly 153 that includes a tabletop 155 and a height adjustable leg structure 157. A telepresence display screen 159 is mounted to a surface of the screen structure 151 to face the space above tabletop 155 and a camera device 161 is mounted above the display 159 for capturing video or images of the space including station 32. An I/O arrangement in this case includes a touchpad or input device integrated into the tabletop 155 at 72" and a section 165 of display 159 that can be used to indicate system status and present virtual buttons selectable via pad 72". Station 32, like stations 24 and 30 described above, would include a full sensor package 68 for sensing various parameter values at the station 30. In addition, while not shown, it is contemplated that station 32 would include most if not all of the components described above with respect to FIG. 3.

Figure 6:
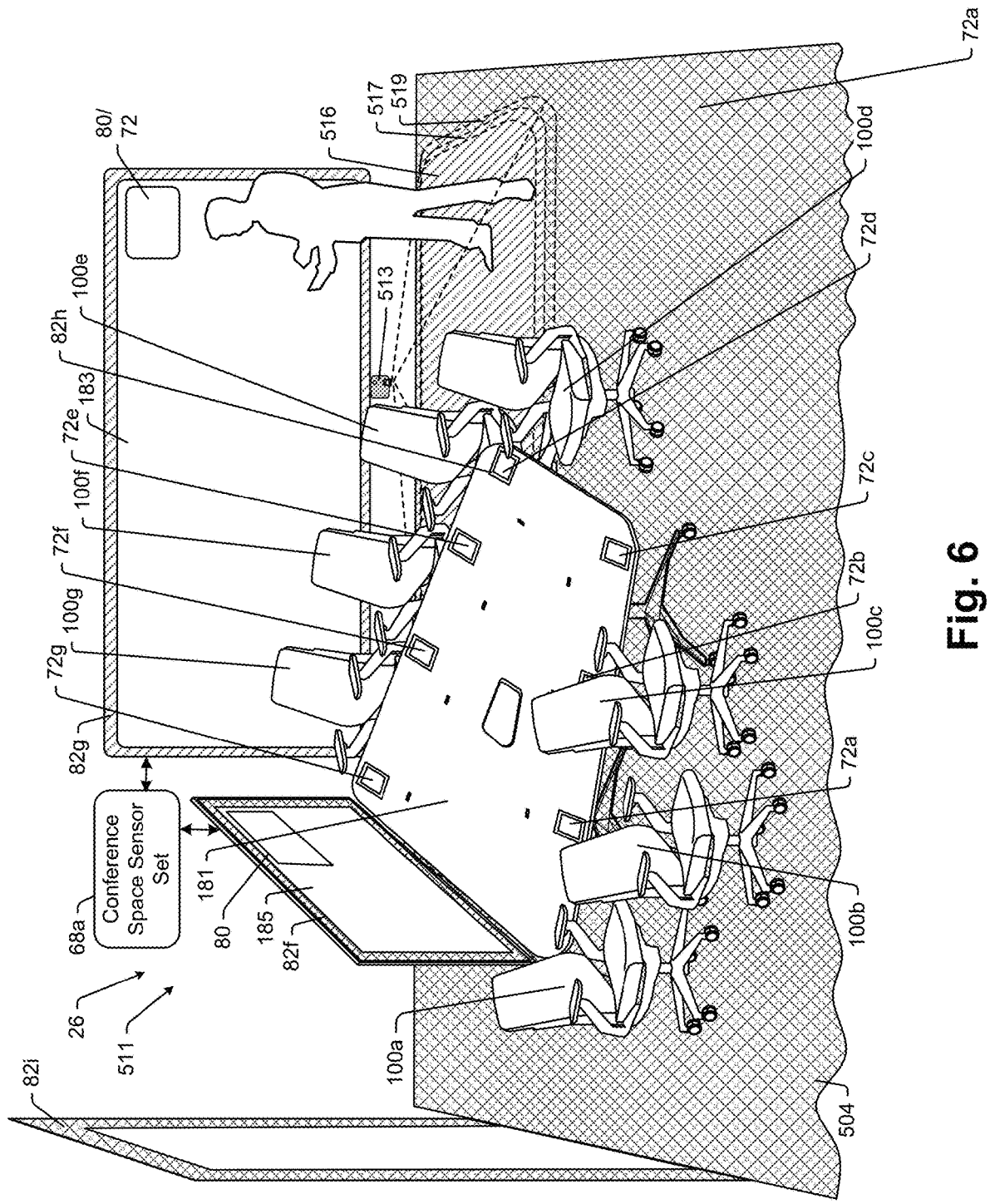
FIG. 6 is a perspective view of a conferencing configuration that is consistent with at least some aspects of the present disclosure.

Referring to FIGS. 1 and 6, another affordance configuration includes a team space arrangement 26 that includes a table assembly 181, a plurality of task chairs 100a through 100g and a wall mounted electronic whiteboard 183. Table assembly 181 includes a tabletop member supported by a leg structure where a large flat panel display screen 185 is mounted along a rear edge of the tabletop. Chairs 100a through 100g are arranged around the unencumbered edges of the tabletop so that all employees using the chairs have a good view of display 185.

A conference space sensor set 68a is provided along with most if not all of the components described above with respect to FIG. 3 so that various data types can be obtained while arrangement 26 is in use. In the illustrated embodiment, an I/O arrangement includes a window 80 opened up on display 185 and an input interfaces at 72a through 72g integrated into the top surface of the tabletop. Here, each employee may be able to adjust her/his own data grants to at least some degree even when in a team session where other employees prefer different data grants. The I/O 80/72 is presented as a window opened up on screen 185 to be used to control or change instantaneous grants associated with screen 185 in ways described hereafter.

B. Exemplary Database and Data Grants

Figure 7:
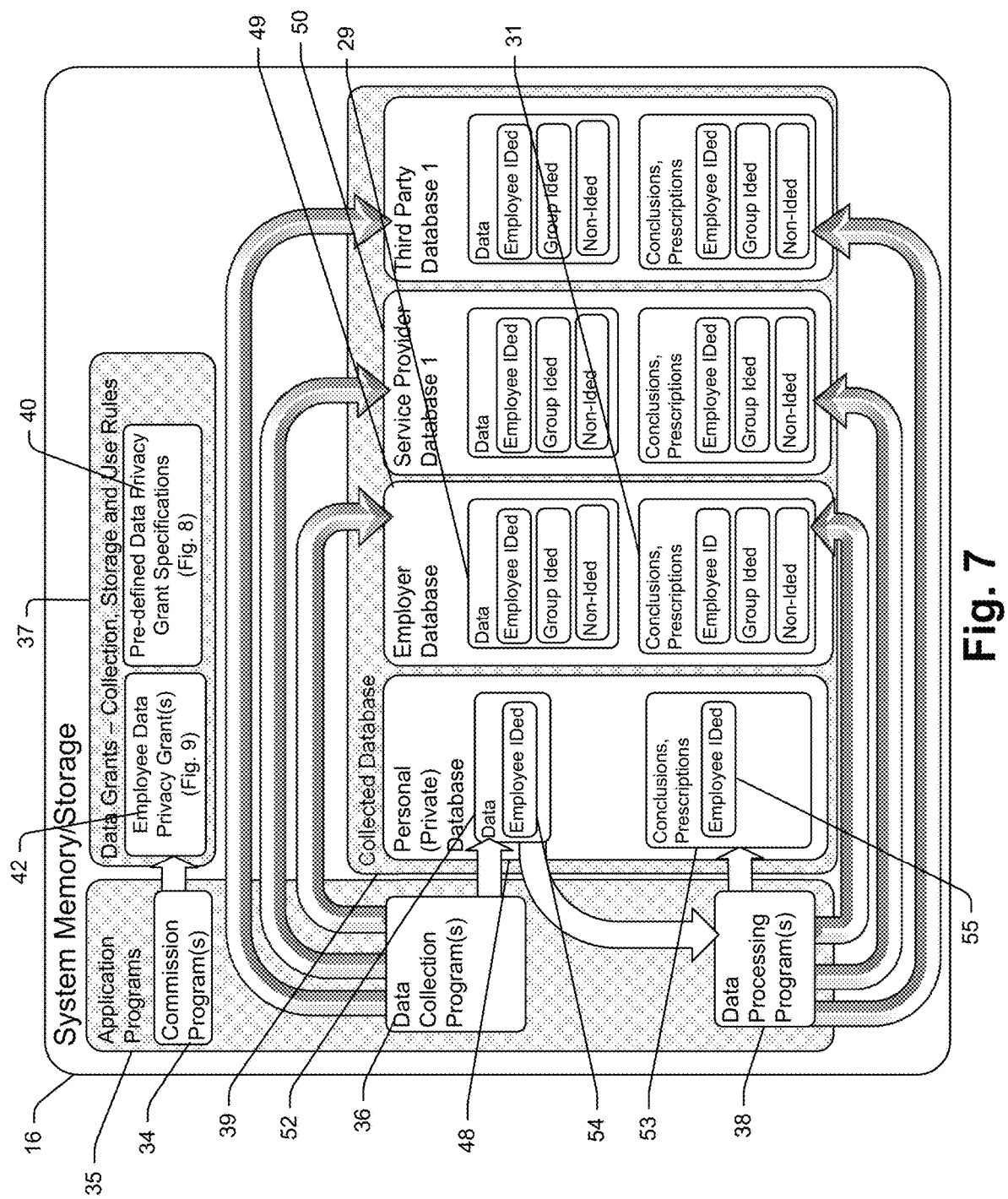
FIG. 7 is a schematic of the storage system shown in FIG. 1.

Referring again to FIG. 1 and now also to FIG. 7, exemplary system storage device 16 includes, among other things, software application programs 35 run by server 14 and/or other system processors (e.g., workstation processor 110), data grants 37 and a collected database 39. Programs 35 include at least one commissioning program 34, at least one data collection program 36 and at least one data processing program 38, in at least some embodiments.

Commissioning program 34 enables an employee to specify various personal or customized data grants 37 (e.g., authorized data collection, storage and use rules) and to select various personal and other services that are driven by data collected in the employer's facilities. The data grants 37 are used to limit data collection programs 36 so that only data authorized by specific employees for collection and use is collected and stored in the collected database 39. The data grants are also used to limit data processing programs 38 so that only programs and services authorized by specific employees are performed and so that only data authorized by specific employees to drive the programs and services are used. Data processing programs 38 generate conclusions and prescriptions which are stored in different parts of the collected database and that are used to drive services for different authorized entities.

During the commissioning process to specify grants, a set of pre-defined data grant specifications 40 may be used to help an employee streamline the grant specifying process. Here, the pre-defined grants are typical fully specified grants based on some small subset of particularly important employee considerations. For instance, one set may specify the minimal grant required to drive only personal services for an employee and no other services, a second pre-defined set may specify minimal grant requirements to drive personal and anonymous employer services and no other services, etc. While many different predefined grants may be supported, in the interest of simplifying this explanation it will be assumed that the system only supports five pre-defined grants referred to hereinafter as Cat-1, Cat-2 Cat-3 Cat-4 and Cat-5 grants. The Cat-1 through Cat-5 grants will be described with respect to FIG. 8.

Figure 8:
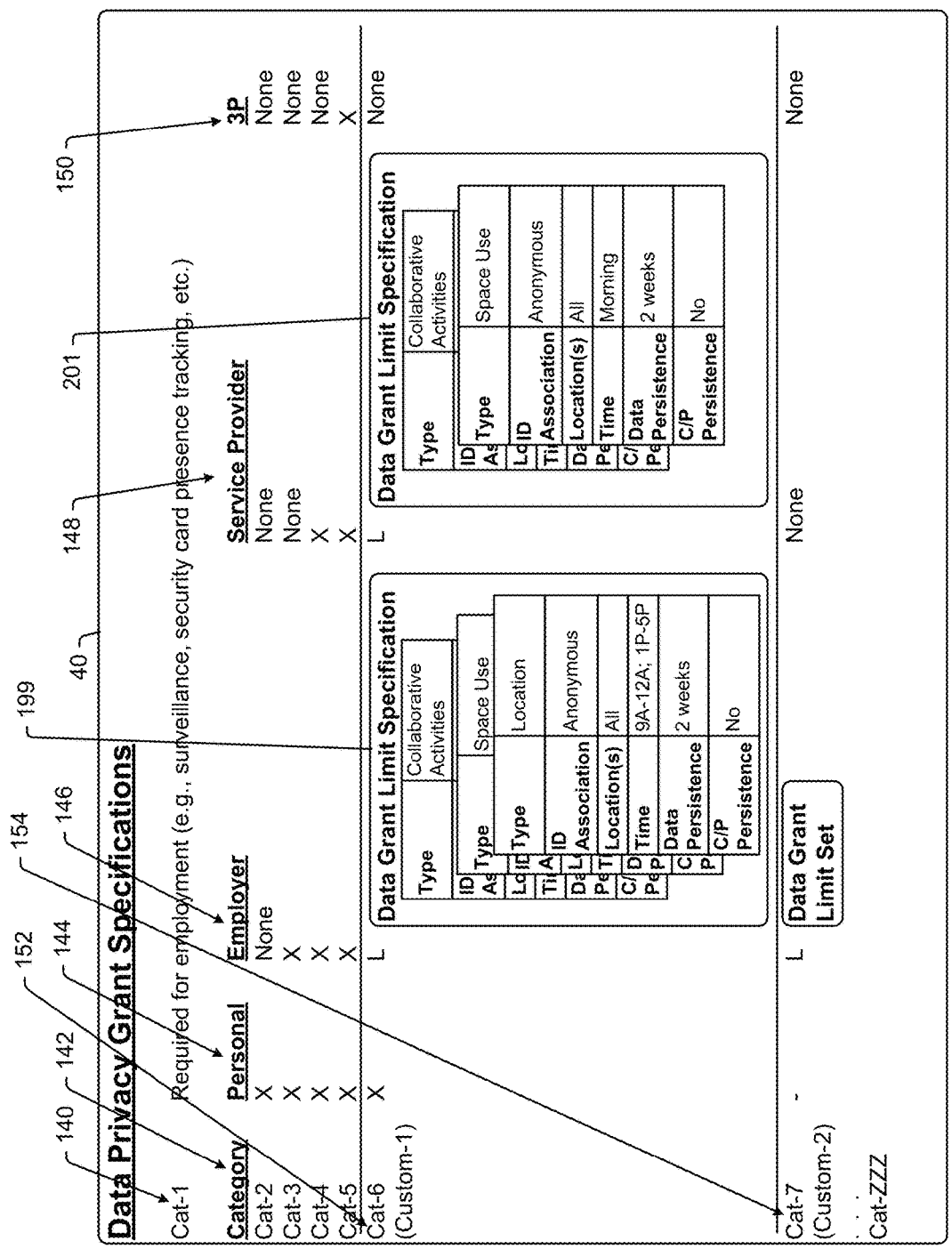
FIG. 8 is a schematic illustrating an example of the grant specification shown in FIG. 7.

Most employers already require at least some authority to collect data within their facilities to drive at least some indispensable employer services. For instance, most employers require the right to use cameras to collect surveillance video of their properties for security purposes. As another instance, many employers require the right to use employee security badge reader devices in order to track employee entry and exit from different areas of their facilities. In these cases, a prerequisite of employment is agreement to at least a minimal, dispensable, data grant. In this specification, the Cat-1 grant includes the minimal required data grant that constitutes a prerequisite for employment. In most cases the Cat-1 grant is either assumed and there is no need to acquire the grant or the grant will be acquired as part of a written employment agreement and there will be no ability for any employee to change the grant rights. FIG. 8 shows the Cat-1 grant as required at 140.

Referring still to FIG. 8, the Cat-2 through Cat-5 grants are shown in a table format that includes a category column 142 and personal, employer, service provider and third party columns 144, 146, 148 and 150, respectively. Column 142 lists the Cat-2 through Cat-5 categories and also includes customized categories Cat-6 through Cat-ZZZ. For each category in column 142, each of columns 144, 146, 148 and 150 includes an "X" designation, a "None" designation, or an "L" designation indicating that the grant for the entity associated with the column is an unrestricted grant, that no data grant is authorized, or that a limited grant is authorized, respectively. Here, an unrestricted grant means that all data associated with an employee can be collected and used in non-limited ways to drive services for the entity associated with the column. Thus, for instance, for the Cat-2 grant, the "X" in the personal column 144 indicates that all data collected for an associated employee can be used in unlimited ways to drive personal services for the employee. Here, unlimited means all data types can be collected, all data can be stored in employee associated or not associated ways, all data can be persistently stored and all data can be used to drive whatever applications or services are desired by the entity in the associated column. In FIG. 8, the grants in columns 146, 148 and 150 for the Cat-2 category indicate no grant for the employer, service provider and third parties, respectively.

In at least some cases, while all data can be collected, stored and used when designated "X", the system will be programmed to self-limit based on the services that are active for the entity indicated in an associated column. Thus, for instance, while an X is in personal column 144 for the Cat-2 grant, if an employee only activates one personal service and that personal service only needs a small subset of possible data at a station and only needs anonymous data, the data collection and use will be limited to the minimal collection and use required.

Referring still to FIG. 8, the Cat-3 grant includes "X" designations in the personal and employer columns and "None" designations in the service provider and third party columns indicating that unrestricted data collection and use is authorized for personal and employer services while no grant is authorized for service provider and third party services. The Cat-4 grant includes "X" designations in the personal, employer and service provider columns and a "None" designation in the third party column indicating unrestricted data collection and use is authorized for personal, employer and service provider services while no grant is authorized for third party services. The Cat-5 grant includes "X" designations and therefor unrestricted data grants for each of the personal, employer, service provider and third party services.

While the pre-defined Cat-2 through Cat-5 grants in FIG. 8 only limit data collection and use based on which entity types are associated with services, other limitations may be applied to certain category grants in at least some embodiments. For instance, see FIG. 9 where at least some data grants in column 162 of a database 42 are further limited by area and/or periods during which data can be collected and used. Thus, for instance, the Cat-2 grant associated with a first employee 00001 is limited to a personal work station (PWS) and to periods between 8 and 12 AM and 1 and 4 PM. Many other limitations may be applied to predefined grants in a similar manner. Limiting predefined grants in this manner is a form of customization.

Other more detailed customization can be facilitated in other ways. In FIG. 7, the Cat-6 grant is a customized grant that results from a more complicated commissioning procedure. At this point it should suffice to say that the Cat-6 grant includes unlimited use of data to drive personal services, no grant to drive third party services and only limited grants to drive employer and service provider services as indicated by the "L" designations in columns 146 and 148. The limited grants are further characterized by separate data grant limit specifications 199 and 201 (hereinafter "limit specifications"). Each limit specification includes detailed information that specifies limits on collection and use of specific data types like, for instance, location, space use data, collaborative activities, etc. The limits may be based on many different characteristics, some of which include where the data is collected or can be collected, when the data can be collected, for how long the data can be maintained in storage, how long conclusions and prescriptions based on the data can be stored, the degree to which data can be associated with employee ID when stored, etc. Many other limiting characteristics are contemplated in this disclosure and the above list should not be considered exhaustive. For instance, limits related to which services can use specific data types may also be assigned to specific data types.

In addition, combinations of limits may be assigned to specific data collection and uses. For example, while a first employee may authorize collection of her location data all the time while at any of the employer's facilities, she may only authorize persistent storage of conclusions based thereon to be stored for data collected from 1 to 5 PM while conclusions based on location data collected in the morning needs to be discarded one week after being collected.

Referring again to FIG. 7, after an employee specifies data grants during a commissioning process, the data collection programs 36 cause server 14 and/or affordance configuration processor 110 to begin collecting data associated with the associated employee. Here, again, the data collection is limited by the employee data grants 37 and, in at least some cases, will be limited to the minimal data and uses needed to drive services implemented by the various entities that have data grants. As data is collected, server 14 stores the data in collected database 39.

In at least some embodiments data is stored in separate databases for each of the entities associated with a data grant. Thus, for instance, any data collected for use in driving the personal services is stored in a personal (private) database 48, any data collected for use in driving the employer services is stored in an employer database 49 and any data collected for use in driving service provider and third party services is stored in databases 50 and 51, respectively. By dividing data out into parallel and separate databases for the different services, grant rights can be more easily protected and managed. While separate entity databases are contemplated and will be optimal in at least some cases, in other cases where grant limitations can be ensured in a single database, all entity data may be stored together with limitations on access, use, etc. Thus, for instance, while flow attainment (e.g. the speed with which flow state can be entered) data may be stored with specific employee identification information (e.g., name, employee number, social security number, etc.) in a system database, different personal service and employer service grants may allow personal services to use the flow attainment data in a way that associates that data with a specific employee while employer services can only access the flow attainment data in an anonymous way.

Referring still to FIG. 7, in some cases each sub-database 48, 49, 50 and 51 stores raw data independent of conclusions and prescriptions associated with that raw data. For instance, the personal database 48 includes a raw data store 52 and a conclusions and prescriptions database 53, employer database 49 includes a raw data store 29 and a separate conclusions and prescriptions database 31, and so on. By separating raw data and conclusions and prescriptions, better and more robust control of that data may be enabled in at least some embodiments. For instance, an employee that wants to delete prior collected raw data while allowing an employer to maintain prior conclusions and prescriptions to avoid a case where the employer uses the raw data in some unforeseen way in the future can easily delete raw data in a bifurcated database 49. Similarly, if an employee wants to delete all prior conclusions and prescriptions without eliminating prior collected raw data, the bifurcated database should enable that task to be performed confidently.

Referring yet again to FIG. 7, data in each of the data stores (e.g., 52, 29, etc.) is divided into different types based on degree of employee association. To this end, some data grants may allow data to be stored in a manner that clearly links the data to the identity of a specific employee. Data associated with specific employee ID is referred to herein as "employee IDed data". Some data grants may only allow data to be associated with a specific group or team ID as opposed to with the identity of a specific employee and that data will be referred to herein as "group IDed data". Data that is stored anonymously will be referred to herein as "non-IDed data". In the case of the personal database (e.g., 48 in FIG. 7) for a specific employee, all data in that database is employee IDed data as the entire database is employee IDed.

Each of the employer, service provider and third party provider databases 49, 50 and 51 groups collected data into sub-data sets including employee IDed, group IDed and non-IDed. A separate employee IDed data set is stored for each employee that has granted the right to obtain and access that type of data and a separate group IDed data set is stored for each team or employee group that has granted the right to obtain and access that type of data. The non-IDed data may include a single dataset for all employees as the collected data is not specifically employee associated.

Referring still to FIG. 7, the conclusions and prescriptions, like the raw data, is divided into employee IDed, group IDed and non-IDed, in each of the employer, service provider and third party databased 49, 50 and 51, respectively.

Other employee associations with data and conclusions/prescriptions are contemplated and may be reflected in more divisions of the data stored in databases 49, 50 and 51. For instance, employee type IDed data may be stored separately. For instance, at least some data related to managers may be stored in a data store associated with only managers while at least some data related to engineers may be stored in a different data store associated only with engineers.

Referring again to FIG. 1 and also to FIG. 9, an exemplary employee data privacy grant database 42 is illustrated that includes grant specifications in a table format. The table database includes an employee ID column, a data grant column, an area(s) column and a period(s) column 160, 162, 164 and 166, respectively. Employee identifiers are listed in the employee ID column 160 for each employee that operates in an employer's facilities. The data grant column 162, area(s) column 164, and period(s) column 166 include limited predefined data grants for each of the employees in column 160. Thus, for instance, for a first employee 00001, the limited data grant in columns 162, 164 and 166 include a "None" designation for an employee's personal workstation (PWS) during a lunch hour (e.g., from noon until 1 PM), a Cat-2 grant at the first employee's PWS between 8 AM and noon and between 1 PM and 4 PM, and a Cat-3 grant without area and period limitations.

In the present example, when a grant in column 162 is not accompanied by area and period limitations, the grant is a default grant meaning that for any circumstances that are not covered by a different grant for the employee in column 160, the default grant applies. Thus, for instance, consistent with FIG. 9, if employee 00001 is in a conference room and therefore not at her PWS, the "None" and Cat-2 grants or designations do not apply and instead the default Cat-3 grant applies. Therefore, for employee 00001, there is no data grant while the first employee is at her PWS during a lunch hour, per the Cat-2 grant, data can be collected at her PWS and used to drive personal services (see again Cat-2 grant in FIG. 8) during the periods 8 AM to noon and 1 PM to 4 PM and, per the Cat-3 default grant without further limitation, data can be collected and used without limit to drive personal and employer services but not for service provider or third party services at all other times and locations.

Referring once again to FIGS. 7, 8 and 9, while the databases of employee grants are shown in simplified form, it should nevertheless be appreciated that for a system to work optimally, the system needs to be able to accommodate extremely complex and varied data grants. To this end, the quality of conclusions and prescriptions generated for any of the entities is, in many cases, directly related to the amount of data collected and the limitations on use of that data. It is also clear that, in general, when employees are confused about data grants, they tend to shut down and place greater restrictions on grants which ultimately affect quality of services. For these reasons, a grant commissioning procedure needs to be designed such that an employee using the procedure has the impression that she is fully informed and in complete control of data grants being authorized. In addition, the grant commissioning procedure needs to be simple and require a minimal time commitment so that the employee is compelled to complete the commissioning task.

Hereafter, in addition to describing other aspects of this disclosure, various types of grant commissioning procedures and grant control processes or methods are described which are designed to fully inform employees of grant characteristics and to empower employees with a sense of complete control over the grant process authorizing access to and uses their data. With complete information and control of data grants, it is believed that employees will be more willing to grant rights that employers have, in many cases, foregone asking for because of confusion with existing data collection and use systems.

C. Tracking User Location

In order to apply data grants to specific employees at all locations within an employer's facilities, it is necessary for the system (e.g., server 14) to at least track instantaneous employee locations and identities in real time, in at least some cases. Thus, for instance, where first and second employees have authorized first and second different data grants when in common areas, respectively, those grants can only be applied if instantaneous locations and identities of the first and second employees are known. Here, "instantaneous" location and identity means at an instant and does not require persistent storage of employee identities and locations. In at least some embodiments it is contemplated that the Cat-1 required data grant (see again 140 in FIG. 8) which is not optional may include a grant to track instantaneous location and identity without persistent storage of that information. This grant is minimally invasive if the data is not persistently stored and therefore would be easy to obtain from fully informed employees.

While various systems are contemplated for tracking instantaneous employee identity and location, in the interest of simplifying this explanation, referring to FIGS. 1 and 2, it will be assumed that each employee in a facility is issued an ID badge 15 that, among other things, can be used along with various sensor devices located throughout facility 12a to track user location and identity. While badge 12a and the sensor tracking system may take many different forms, unless indicated otherwise, it will be assumed that each badge 15 includes a power supply, a processor, a fingerprint reader or sensor device 55, an indicator 82c, and a transceiver.

To ensure that each badge is only used by an associated employee for identifying that specific employee, badge 15 may have to be activated periodically by reading an employee's fingerprint and confirming identity. If a fingerprint read is unsuccessful, badge 15 may be deactivated until a successful print read occurs and indicator 82c may be illuminated (e.g., red indicating halt") to indicate that the read did not succeed. After a successful read, indicator 82c may light up (e.g., green indicating "proceed") for a brief period to confirm badge activation and badge 15 may be activated for use in location tracking. Badge 15 may remain activated for a predefined period (e.g., a day, a week, etc.). In some cases, badge 15 may include a motion sensor and may become deactivated if no motion is sensed for some time (e.g., 20 minutes), requiring a new successful fingerprint read to activate the badge again. While active, badge 15 periodically (e.g., every second) transmits an employee ID signal received by wireless access points 17 (only one shown in FIG. 2) and the received signals are used to instantaneously triangulate the location of the transmitting badge and therefore to locate the employee associated with the badge.

In another case, the badge 15 may include an RF ID tag or some other near field transmitter that is interrogated at specific locations by badge reading devices 21 (see again FIG. 2) within facility 12a to instantaneously know badge and hence employee location and identity at those locations. In this case, badge 15 may still include a fingerprint reader or other biometric sensing device used to activate the badge and, when not active, badge 15 may not be able to transmit or be interrogated by the reading devices. In this case, the system may also include a set of cameras 19 located throughout the facility and that can image employees at the reading device locations 21 and throughout the facility space (e.g., the cameras would be placed and arranged so that each reader device 21 location is imaged and all other locations in the facility) are also imaged. Cameras 19 may be dual or multi-purpose to be used for surveillance, data grant tacking, etc. Once a badge and employee are located and identified near a reader device, as the employee moves to other locations in facility 12a, the employee appearance in the camera videos may be used to continually track the employee's location in facility 12a and to associate the employee ID with the appearance in the videos. One camera may pass off the employee appearance in video to a next so that server 14 can continue to associate an employee ID with the employee's appearance in the videos and hence the employee's location can be continually tracked.

The badge based fingerprint activation solution described above has three advantages. First, fingerprints are unique to specific employees and therefore activation based on fingerprints ensures that only a specific employee can activate her badge.

Second, badges are now and will likely continue to be ubiquitous in employer facilities. To this end, in most cases employee ID badges include an image of an associated employee to facilitate visual verification (e.g., for security purposes if for no other reason) of employee identity while at employer facilities. There is no better solution on the market or foreseeable for visual ID verification. While personal portable computing devices like smart phones, laptops, tablets, watches, etc., could be used for similar fingerprint reading and activation purposes, those solutions have several shortcomings and may not persist. For instance, not all and in many cases only a small percentage of employees may have portable personal computing devices so using those devices to verify identity would not work in many cases. As another instance, while ID badges are routinely carried by employees all the time, personal computing devices are not and, again, a verification system requiring those devices would simply not work well in many cases.

Third, a badge that can communicate with server 14 automatically and independently can operate as a surrogate to continually re-confirm employee ID while the badge is active so that the employee need not continually manually re-confirm. Thus, for instance, if badge 15 is activated immediately upon entering facility 12a at 8 AM via a successful finger print read and remains active throughout a 9 hour work day, badge 15 may re-confirm user identity every second of the workday so that user identity is always verified without any additional activity on the part of the employee.

In cases where an employee in facility 12a does not have her ID badge for some reason (e.g., forgot the badge at home or at her workstation when traveling in facility 12a to a different location), the system may allow the employee to self-identify via entry of a user name and password at some location within facility 12a and the camera tracking system may track the employee's instantaneous location thereafter and associate the user's identity with the user's appearance in video and hence in the facility 12a. For example, a user may use an interface 80/72 at one of the workstations 24 (see again FIG. 2) to enter a user name and password where at least one system camera picks up the user's appearance at the station and performs the employee-location association process.

In at least some embodiments it is contemplated that, in addition to tracking instantaneous employee location and identity information, server 14 may also be programmed to generate some type of employee ID confidence factor related to employee identity for each tracked employee and may use the confidence factors to enable and/or disable data grants, to modify data grants and/or to store data in protected ways until an ID confidence factor threshold level can again be reestablished. For instance, in a case where cameras are used to track employee locations after initial location determinations via badge reader devices 21, if four employees are closely located in a camera video and then move in different directions, employee ID confidence factors may be low for all or at least a subset of the four employees as the system server 14 attempts to accurately determine identities of the employees in obtained video.

An exemplary ID confidence factor threshold may be set to 95/100 (e.g., 95% confident user ID correct) so that, any time a specific employee ID confidence factor drops below the 95% threshold, at least some or all of the data grants associated therewith are disabled. As an alternative, any time an employee ID confidence factor drops below the threshold level, grants associated with that employee may be modified as server 14 reverts to default data grants to ensure that unauthorized data is not collected and/or data is not used to drive any unauthorized services. Here, the default grants may either be set by an employer or may be set by an employee as part of a commissioning procedure.

In cases where an employee's grants revert to defaults or are disabled when the ID confidence factor drops below the threshold level, once the employee's ID confidence factor again rises above the threshold level (e.g., the badge ID is again read by one of the reader 21 devices, the employee enters a username and password at a location where the user's location can be paired by a camera with the entered credentials and hence the user's ID, etc.), the employee's original data grants may be automatically re-enabled.

In the alternative, where an employee ID confidence factor drops below some threshold level, server 14 may still collect data per the original data grant and simply store that data without release or use to drive personal services until either the confidence factor again reaches the threshold level or server 14 determines that the employee ID is wrong or the associated confidence factor drops below some second lower threshold level (e.g., 60% confidence the user ID correct). In a case where data collection continues without release, once the employee ID confidence factor rises above the first threshold (e.g. 95%), the stored data may be released pursuant to the original data grant to drive services authorized by the original grant.

In cases where employee location does not have to be tracked at all locations in a facility, other employee ID sensor devices that are more localized are contemplated. For instance, once an employee associates in some way with a workstation, a workstation camera may generate video that enables server 14 to monitor employee location at that station and, while the employee remains at that station, server 14 may ID the employee based on the original association. For example, in some cases it may be that only Cat-1 data is collected and used outside a small zone about a specific employee's workstation and, in that case, employee ID may not be required when not in the small station zone. In this case, sensors or a camera at the workstation to establish employee ID would suffice.

D. Data Collection and State Indicators

In some cases the system may require commissioning to occur at a specific affordance configuration type like a personal workstation 24 which is best or optimally suited to facilitate the commissioning process. In other cases, however, any of several different affordance types may be suitable and useable to facilitate a commissioning process. As described below, in some cases the system will require commissioning of at least some data grants via specific affordance configurations (e.g. a personal workstation as opposed to any workstation) or configuration types (e.g., any workstation or any lounge station (see FIG. 4) or any telepresence statin (see FIG. 5) so that an employee considers specific grants in context. Hereinafter, unless indicated otherwise, exemplary commissioning procedures will be described in the context of the personal work station 24 including I/O arrangement 80/72 shown in FIG. 2.

Figure 10:
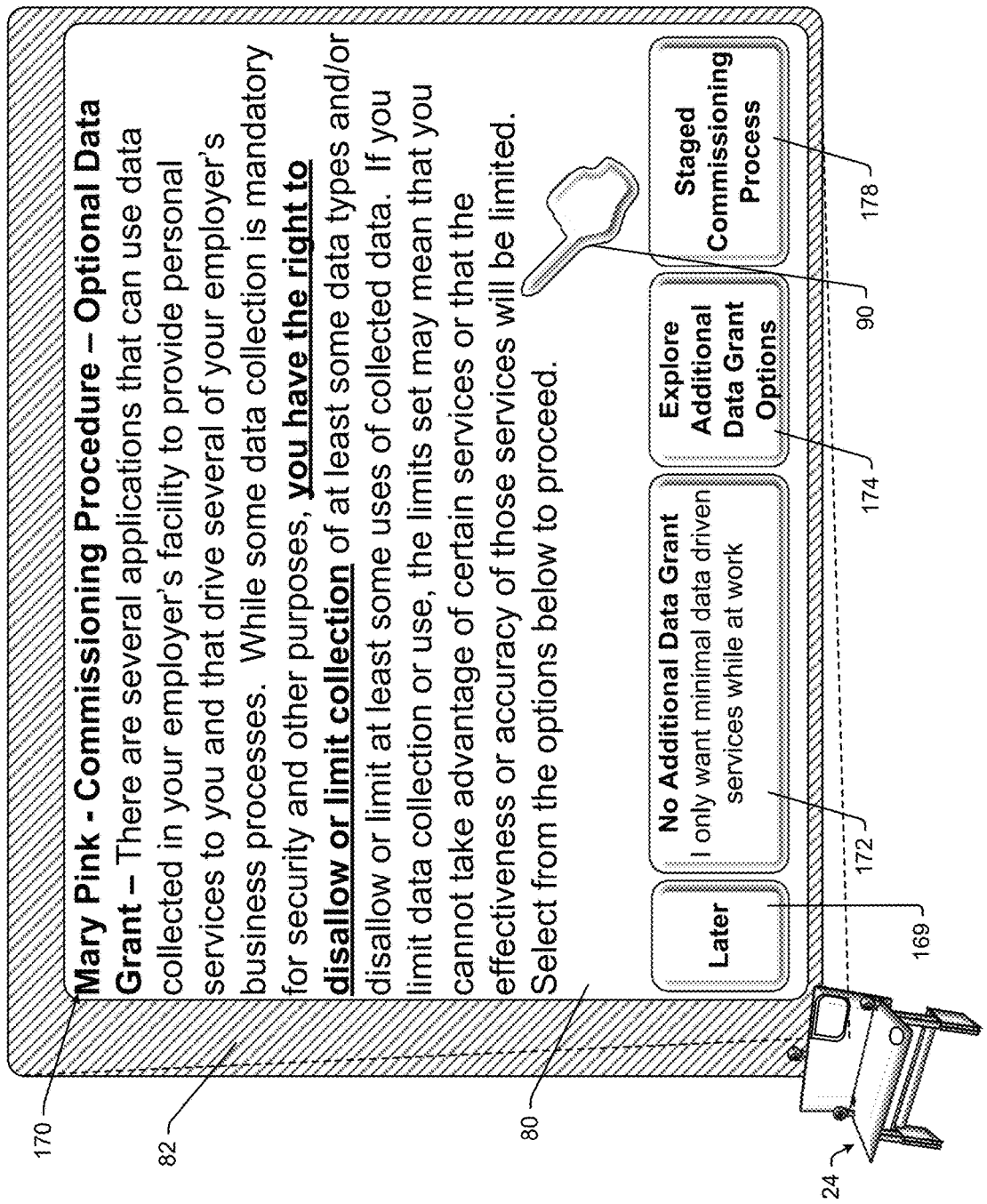
FIG. 10 is a view of a screenshot that may be presented to an employee as part of a commissioning procedure on an I/O display screen at the employee's workstation in at least some disclosed embodiments.

Referring also to FIG. 10, exemplary display 80 includes a flat panel emissive surface on which text and graphics are provided. Referring also to FIG. 3, as indicated above, in at least some embodiments, display 80 may be used to provide output and to receive input associated with various application programs in addition to the data grant applications. Thus, while display 80 may be used at times solely as an I/O device for the data grant applications, at other times display 80 may be solely used as an I/O device for other applications (e.g., as an employee nameplate, to provide various reminders to an employee, as a wayfinding device, etc.). At still other times display 80 may be used as an I/O device simultaneously to support some aspect of the data grant applications as well as some other application program(s).

Referring again to FIG. 2, indicators 82, 82a, 82b, etc., may take many different forms and those illustrated are only exemplary. The idea behind the indicator devices is to present "glanceable" data grant information to an employee either persistently or when some aspect of data collection or use is changing so that the employee is instantaneously informed about grant rights and can make contextual or situational decisions about data collection and use in real time. Here, the term "glanceable" means that the meaning of an indication can be ascertained from a simple glance as opposed to a case where meaning has to be inferred by some more complex mental process like reading text. In short, the meaning of the indication can be gleaned quickly and intuitively upon visually observing the indication. Thus, for instance, in a simple case, a glanceable indicator may be used to indicate if any data is being collected at an employee's workstation 24. In this case, the indicator could be binary to indicate data collection or that no data is currently being collected. Once "indicator parlance" is established and employees use the system for a short time, the system will be able to quickly communicate various aspects of instantaneous data grants to each employee.

One particularly useful way to provide glanceable indicators is by controlling the color of a light device or surface where different colors are associated with different meanings. In some cases one or more indicators 82, 82a, 82b will be controlled to generate different color light to indicate different data collection and use states. To this end, in this disclosure, indicators are shown filled with different hatch effects where each hatch effect is used to indicate a specific color. For instance, throughout this specification, the color red is indicated by left down to right cross hatching (see 82 in FIG. 10), yellow is indicated by left up to right cross hatching (see 82 in FIG. 27), green is indicated by double diagonal cross hatching (see 82 in FIG. 17) and blue is indicated by horizontal and vertical cross hatching (see 456 in FIG. 30).

In at least some embodiments disclosed hereinafter, red (e.g., left down to right hatch) will be used to indicate that no data other than the other than the Cat-1 data (e.g., the minimum data required for employment) is currently being collected related to an employee or group of employees, yellow (e.g., left up to right hatch) will indicate that data is being collected but that the data being collected is not being distributed for use by services other than personal and Cat-1 services, green (e.g., double diagonal hatch) will indicate that data is being collected and distributed for use by services in addition to personal services and blue (e.g., vertical and horizontal hatch) will indicate that collected data that has yet to be distributed to drive non-employee services (e.g., to drive employer, service provider and/or third party services) is ready for distribution.

Figure 30:
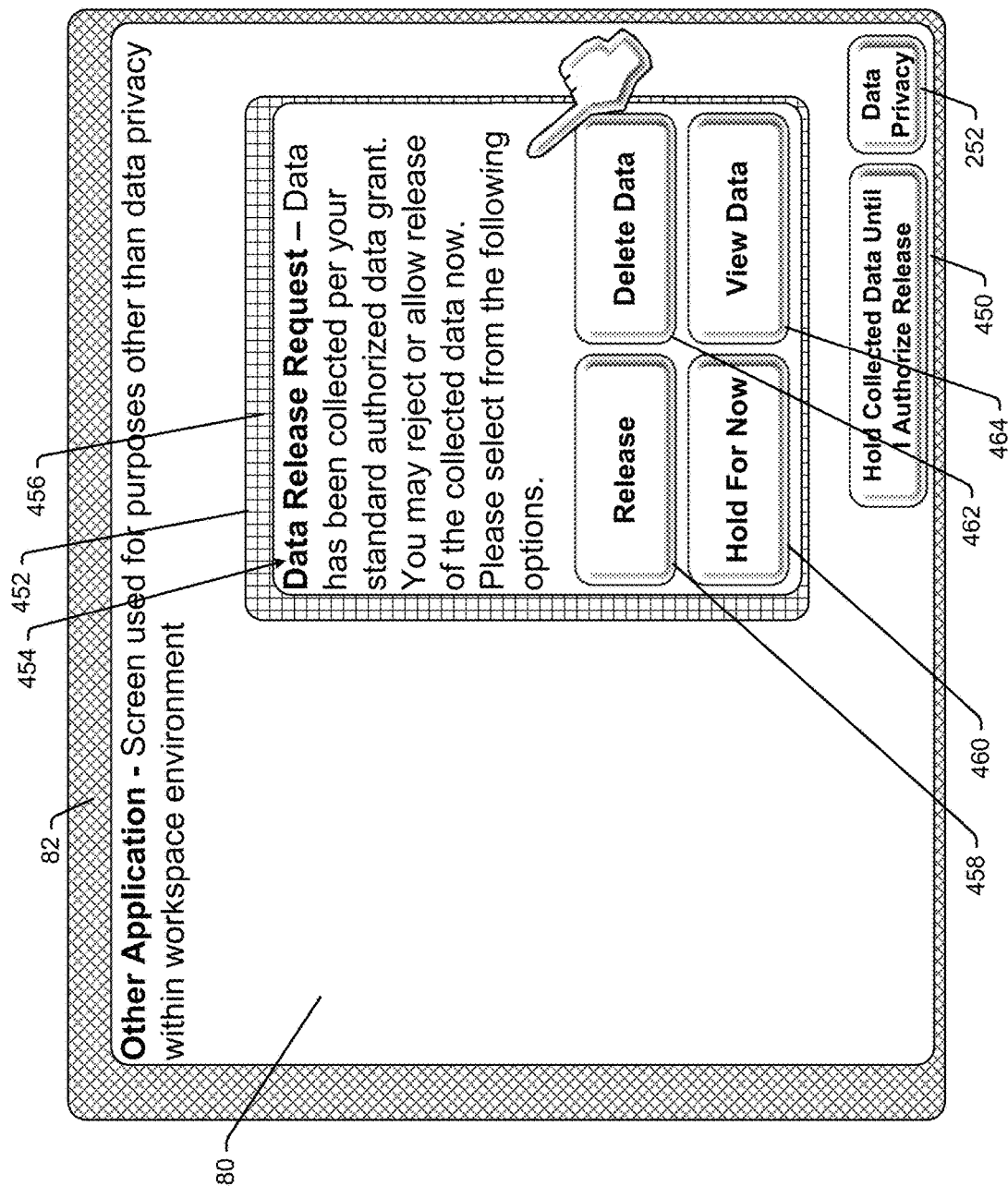
FIG. 30 is a screenshot showing options for an employee to release or delete collected but yet to be released data.

In some embodiments when data is ready for distribution, distribution may require some manual activity by the employee to distribute the collected data. For example, in some cases an employee may be unclear if the employee wants to maintain any record of a meeting that is about to occur and therefore the employee may select an option (e.g., see 450 in FIG. 30) that causes data associated with the employee to be collected but not distributed during a next 30 minute period. In this case, after the data is collected, an option to release the data to drive services may be presented to the user as at 452 in FIG. 30 where, as shown, a frame indicator 456 is colored blue to glanceably indicate that a data release is pending. In the above example, after the meeting the employee may not object to release of the collected data and therefore may opt for release to drive services pursuant to the employee's authorized data grants. FIG. 30 is described in more detail hereafter.

In other cases, a blue indication that data is ready for release may expire and the associated data may be deleted when the indication expires if an employee does not authorize distribution in some period of time (e.g., 30 minutes). In other cases, once data is indicated as ready to distribute, the data may automatically be distributed at the end of some warning period (e.g., 15 minutes) if an employee does not affirmatively cancel distribution. Other dispositions of collected but not distributed data are contemplated.

While various indicator arrangements 82, 82*a*, 82*b*, etc., are contemplated, in the interest of simplifying this explanation, indicator operation and functions will be described in the context of the frame type indicator 82 shown in FIGS. 2 and 10 that constitutes a circumferential frame area about the edge of screen 80. Other station types (see FIGS. 4 and 5) and affordance configurations (see FIG. 6) will include other indicator arrangements suitable given specific affordance arrangements and features. For instance, in FIG. 4, an indicator light device 82*d* may be integrated into an edge of the tablet 141 to be within the field of view of an employee situated at station 30. In FIG. 5, an indicator light panel 82*e* may be integrated into a station facing lateral surface of the screen assembly, again to be located generally in the field of view of an employee at station 32.

In conference spaces or other spaces routinely used by two or more employees at the same time, different data collection and use states may be associated with different sub-spaces, affordances or resources or employees at the same time. For this reason, in at least some cases, multiple glanceable data state indicators may be located within the single space where each indicator indicates an associated instantaneous data collection and use state for an associated employee or specific resource. To this end, see again, for instance, the conference space configuration 26 shown in FIG. 6 that includes several different indicators 82*f*, 82*g*, 82*h*, 82*i*, where each indicator may indicate a different data collection and use state.

Indicator 82*i* is provided about a conference space egress and may be illuminated to indicate the general state of data collection and use within conference space or zone 511. In FIG. 6, indicator 82*i* is shown green to indicate that data is currently being collected and used pursuant to employee or group data grants for the employee or the group in space 511. Thus, if there are first through fifth employees in space 511 and each is instantaneously associated with a different data grant while in space 511, unless further restricted by an employee, all data authorized by a specific employee's grant is collected and used to drive all services authorized by that employee's instantaneous data grant (e.g., different employees may have different grants in the same conference space 511).

Referring still to FIG. 6, frame indicator 82*f* about screen 185 is green indicating that data applied to that screen is collected and used. Thus, different data collection and use states may be associated with space 511 and screen 185 where the egress indicator 82*i* indicates the space 511 state and frame indicator 82*f* indicates the screen 185 state. In this case, if frame indicator 82*f* were red, data presented, generated, accessed, etc., thereon, would not be collected for persistent storage or use even though data is collected and used within space 511 based on the space state indicator 82*i*. Similarly, the frame indicator 82*g* about screen 183 indicates the data collection and use state associated with screen 183 and, in FIG. 6 the red color of indicator 82*g* indicates that data related thereto is not collected for persistent storage or use.

Additional frame type employee place indicators 82*h* (only one labelled) are provided about each one of the interface devices 72*a* though 72*g* in tabletop 181. Here, it is contemplated that each place indicator 82*h* may be controlled to indicate an instantaneous data collection and use state for an employee located at a place along the edge of the tabletop 181 adjacent the indicator 82*h*. Thus, for instance, if first and second employees enter space 511 and the first employee is instantaneously associated with a restrictive Cat-1 grant (e.g., no collection and use beyond the minimum Cat-1 requirement) while the second employee's instantaneous grant allows at least some additional data collection and use associated with the second employee in space 511, if the first employee sits down at the space associated with interface 72*d* at the end of the table while the second employee sits down at the space associated with interface 72*f*, the indicators 82*h* about interfaces 72*d* and 72*f* may be colored red and green, respectively, to indicate the different data collection and use states for data related to the first and second employees.

Figure 40:
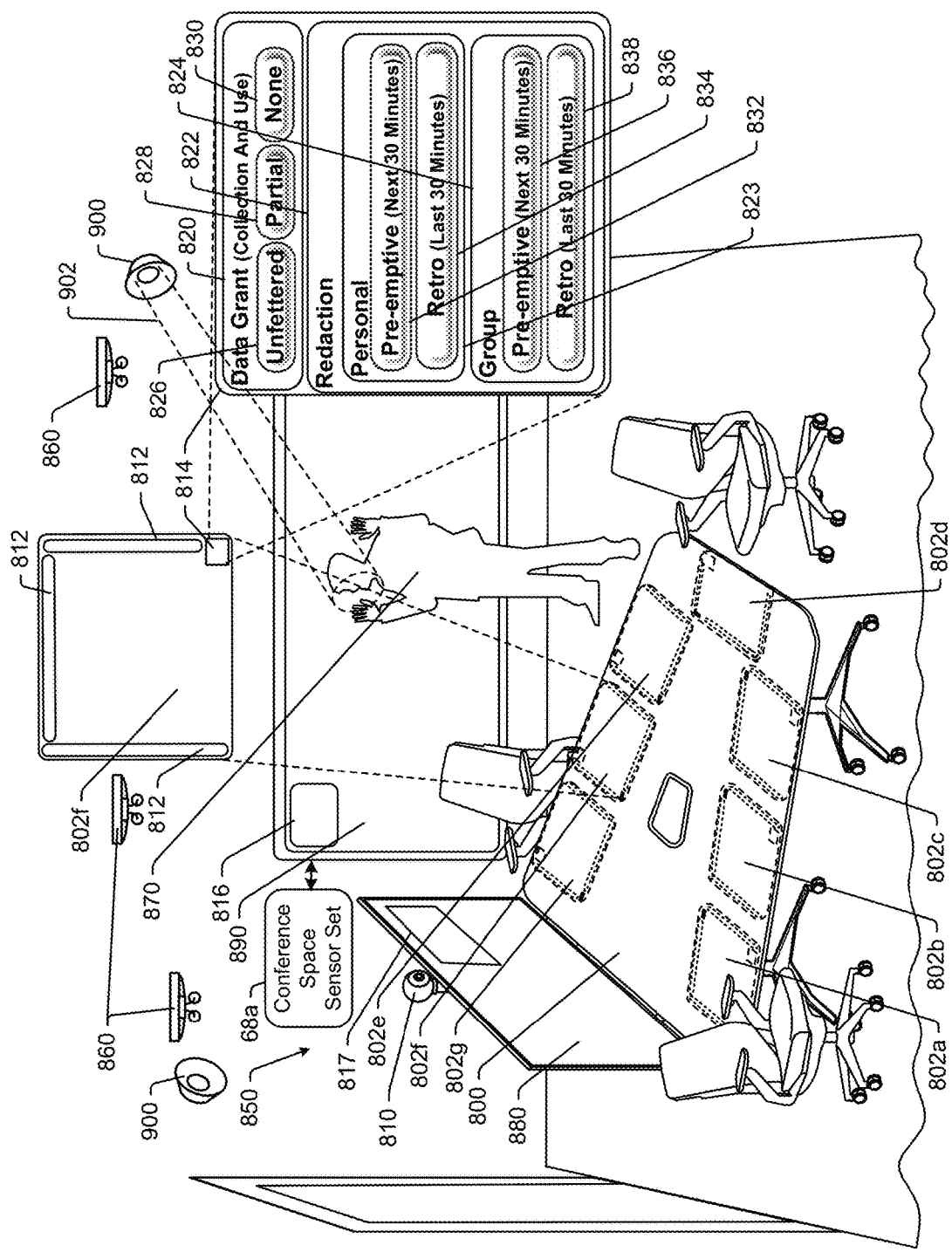
FIG. 40 is a partial perspective view of another conference space that is consistent with at least some aspects of the present disclosure.

Other data grant indicator configurations are contemplated that have different I/O capabilities. To this end, see, for instance, FIG. 40 where another conference room configuration 850 is illustrated where indicator light devices are integrated into a tabletop assembly 800 where the light devices define different user locations or stations 802*a* through 802*g* about a tabletop edge. One exemplary station is shown in enlarged view at 802*f* which includes three integrated elongated indicator light devices 812 that together frame out an associated user station as well as an input/output touch sensitive high definition emissive surface 814 that, among other things, can be used to present various types of privacy and data grant rights within the conference setting. Here, individual and group instantaneous data grants may be indicated via different light intensities or colors or in other visually distinguished ways via the indicators 812.

E. Commissioning Procedures

In at least some cases each employee that uses employer facilities may be required to complete a data grant commissioning procedure at some time (e.g., within the first 2 weeks, the first month, etc., of operating in an employer's facilities or of being hired by the employer). While a personal computing device or an employer owned device may be useable to complete a commissioning procedure remotely from the employer's facilities, in the present disclosure it will be assumed that system server 14 is programmed to facilitate grant commissioning procedures at employer facilities and more specifically through personal work stations like station 24 shown in FIG. 2 that are routinely used by employees.

System server 14 in FIG. 1 tracks instantaneous user locations and identities of all employees in facility 12a, even if an employee has yet to specify authorized data grants. Once a first employee that has not authorized or rejected additional data grants locates at a workstation 24, server 14 may welcome the first employee to the station and perform an additional verification process to ensure employee identity prior to offering a grant commissioning process. Here the additional verification process should ensure that the identity of the employee present at station 24 is confidently known so that any data grant being authorized is clearly associated with the specific employee generating the grant. Consistent with the above employee identifying system, the verification process may include an additional fingerprint read via sensor device 55 while proximate station 24. Here, processor 110 may initiate the additional verification process by providing instructions on screen 80 and, once the employee's fingerprint is successfully read, badge 15 may transmit the user ID and a "verified" signal to processor 110 and on to system server 14.

Once the first employee identity and location at station 24 are verified, server 14 invites the employee to participate in a grant commissioning procedure. If the employee decides not to complete the grant commissioning procedure when invited, server 14 may be programmed to re-invite the employee to complete the procedure each time the employee is located at one of the workstations 24 or periodically (e.g., every fifth business day) until a grant is specified or additional grants are completely rejected.

Referring again to FIG. 10, to initiate the commissioning procedure, server 14 presents an initial commissioning procedure screen including an explanation of data grants and procedure instructions 170 as well as virtual icons that serve as option buttons for responding to the procedure offer. The option buttons include a "Later" button selectable to put off the commissioning procedure, a "No Additional Data Grant" button 172 for simply rejecting authorization of additional grants beyond the Cat-1 grant and an "Explore Additional Data Grant Options" button 174 for initiating the commissioning process. As shown, at least initially, because the first employee has not authorized any data grant in addition to the Cat-1 required grant, frame indicator 82 is illuminated red (e.g., left down to right hatching) to glanceably signal that no data is currently being collected or used.

While the option 172 is offered to allow the employee to simply and quickly reject additional data grants, in other embodiments it is contemplated that an employee would not be able to reject additional grants in such a simple fashion and without additional information or experience with services associated with grants and, in particular, with personal or employee type services that may entire the employee to authorize at least some data grant less restrictive than the Cat-1 grant.

Referring still to FIG. 10, upon button 169 selection, server 14 schedules to represent the commissioning process to the employee at a later time such as the next time the employee associates with one of the workstations 24. Selection of button 172 causes server 14 to store an unqualified "None" designation in column 162 in the grants database shown in FIG. 9 for the first employee indicating that no data grant in addition to the Cat-1 grant has been authorized.

Figure 11:
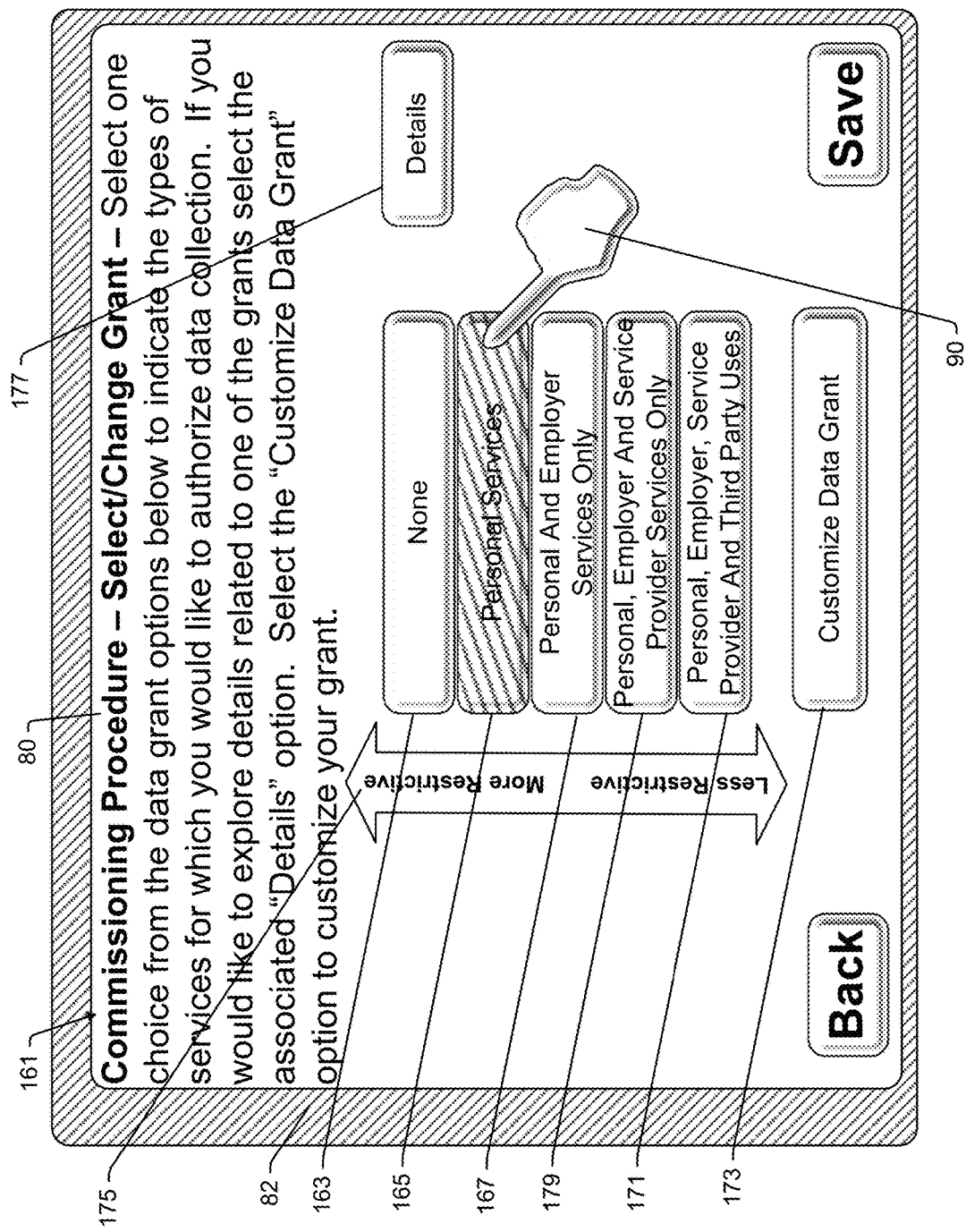
FIG. 11 is similar to FIG. 10, albeit showing a commissioning procedure screen shot at a different point in the commissioning process.

Referring again to FIG. 10, in at least some embodiments, selection of button 174 causes server 14 to present the screen shot shown in FIG. 11 that includes instructions at 161, a legend at 175 and a set of selectable buttons for setting grant parameters. The instructions 161 instruct the first employee to select one data grant option from a list of options, each option represented by a different one of the buttons. The grant options include a "None" option 163, a "Personal Services" option 165, a "Personal and Employer Services Only" option 167, a 'Personal, Employer and Service Provider Services" option 179 and a "Personal, employer, Service Provider and Third Party" option 171. Other control buttons presented include a "Back" button, a "Save" button and a "Details" button 177. The "Back" button in FIG. 11 and other figures that comprise this disclosure, allows an employee to jump back to an immediately prior presented screen shot (e.g., back to the screen shot shown in FIG. 10 when selected in FIG. 11). The "Save" button in FIG. 11 and other figures is selectable to save selections made via one of the option buttons.

Here, if the employee selects the "None" option 163, the selection operates effectively as a rejection of additional grants. If button 165 is selected, server 14 places a Cat-2 designation or grant in column 162 in the FIG. 9 database for the first employee without any qualifiers in columns 164 and 166 so that all data types can be collected and used to drive all and only employee services for the first employee (e.g., no grant is authorized for employer, service provider or third party services, see the Cat-2 grant again as specified in FIG. 8).

Similarly, selection of buttons 167, 179 and 171 in FIG. 11 cause server 14 to place unqualified Cat-3, Cat-4 and Cat-5 grant designations in column 162 in FIG. 9 for the first employee where those grants are consistent with the specification shown in FIG. 8. Thus, simple selection of one of the presented options causes server 14 to assign one of the simple predefined additional grants Cat-2 through Cat-5 for the employee.

Figure 12:
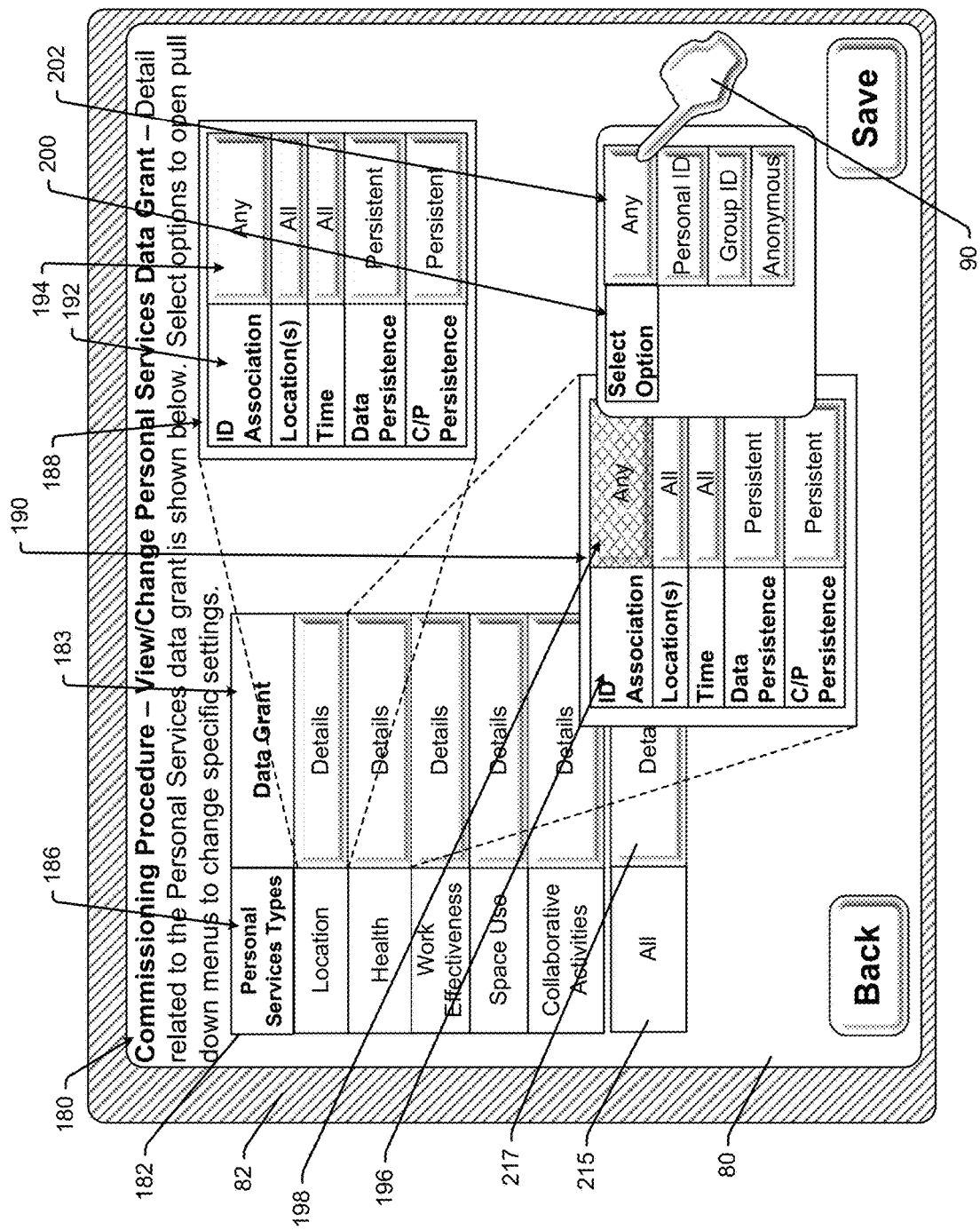
FIG. 12 is similar to FIG. 10, albeit showing a commissioning procedure screen shot at a different point in the commissioning process.

Referring again to FIG. 11, after an employee highlights one of the option buttons (e.g., 163, 165, etc.), "details" button 177 is selectable to access additional detailed information about the highlighted option. When details button 177 is selected while the personal services button 165 is selected, a screen shot akin to the screenshot in FIG. 12 is presented. The FIG. 12 screenshot includes instructions 180 as well as details related to the pre-defined Cat-2 grant specification which indicates effectively unlimited data collection and use rights for supporting personal or employee services for the first employee.

In FIG. 12, the Cat-2 grant details are shown in table form at 182 which includes a personal services type column 186 and a data grant detail column 183. Services type column 186 lists different service types including, for instance, location, health, work effectiveness, space use, collaborative activities, etc. Grant column 183 includes a selectable "Details" button for each service type in column 186 which, when selected, opens up a sub-window and presents more detailed information about the grant for the associated service type in column 186.

As shown, when the details button associated with the location service in column 186 is selected, a grant detail sub-window 188 opens that includes a grant parameter column 192 and a parameter value column 194. The grant parameter column 192 lists grant parameters including "ID Association", "Location(s)", "Time", "Data Persistence" and "Conclusion/Prescription (CP) Persistence" parameters while column 194 lists values of each parameter in column 192. Consistent with the Cat-2 grant in FIG. 8, the parameter values in column 194 are, at least initially, substantially unrestricted for supporting personal services.

In FIG. 12, a second grant detail sub-window 190 is shown that lists grant parameters in column 196 and parameter values in column 198 for the health related personal service in column 186. Again, at least initially, the parameter values in column 198 are substantially unrestricted based on the pre-defined Cat-2 grant.

While FIG. 12 shows the detail sub-windows as being selectable, in other embodiments it is contemplated that the table 182 may include all the sub-window details for each of the service types in column 186.

In at least some embodiments, any grant parameter value that can be modified may be presented as a selectable hyperlink for accessing a dropdown menu to customize that parameter to the first employee's preferences. Thus, for instance, in FIG. 12, see that the "Any" value associated with the ID Association parameter has been selected and that a value selection window 200 has been opened that includes a set of selectable options for that value at 202 including the "Any" option, a "Personal ID" option, a "Group ID" option and an "Anonymous" option. Other parameter specific drop down menus are contemplated. Thus, the first employee may start with a pre-defined grant option like the Cat-2 option, the Cat-3 option, etc., which, based on a small set of criteria (e.g., entities that can access and use data), provides likely default detailed parameter values and then the employee can customize any of the detailed values to align with the specific employee's preferences.

Figure 14:
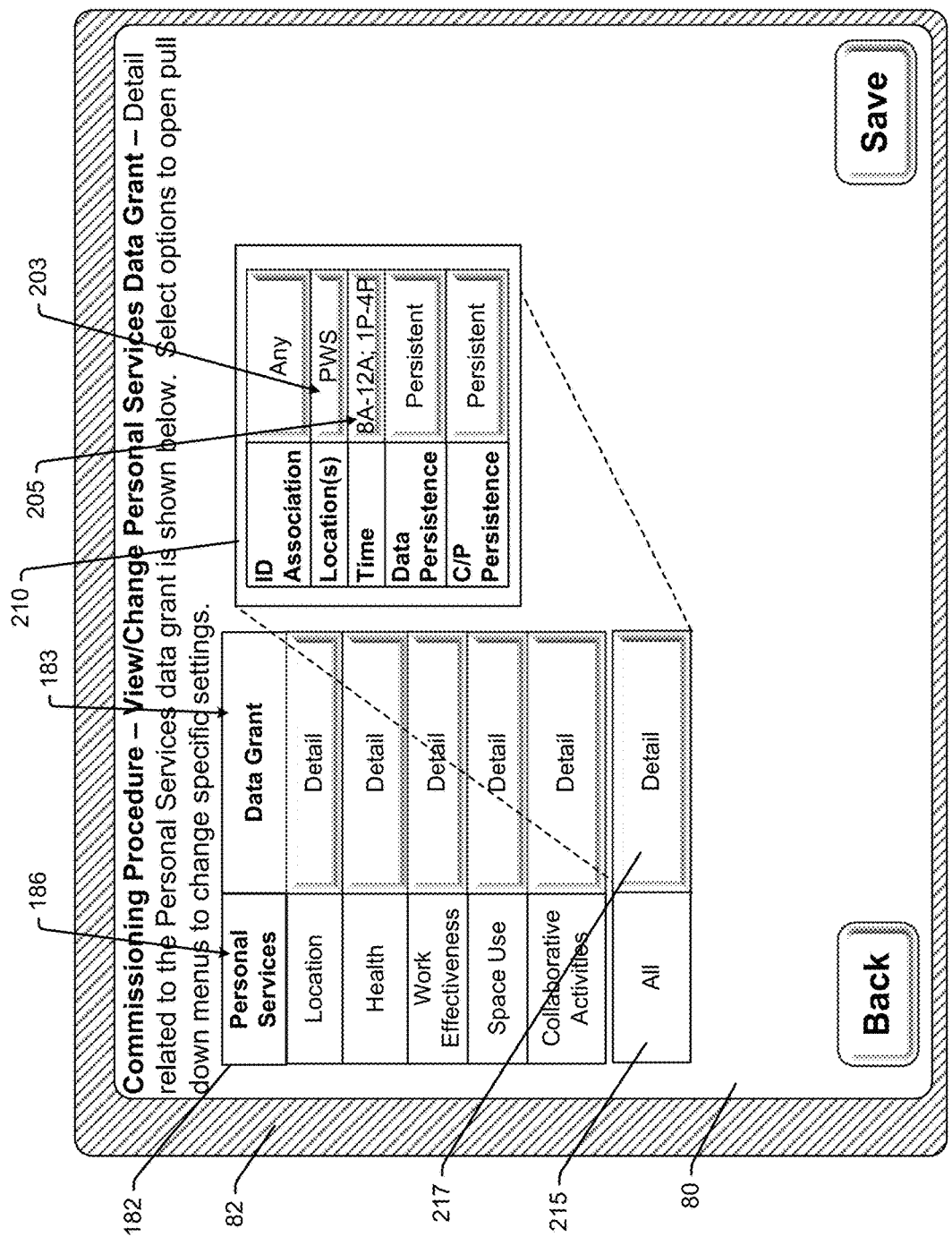
FIG. 14 is similar to FIG. 10, albeit showing a commissioning procedure screen shot at a different point in the commissioning process.

Referring still to FIG. 12, another option in the personal services column 186 includes an "All" option 215 with an associated "Details" button 217. Here, it is contemplated that the first employee may prefer to set some parameter values globally for all personal services. Thus, for instance, the first employee may want to specify that while at her personal workstation, all personal services in column 186 should be fully supported by all data collection and uses between 8 AM and noon and 1 PM and 4 PM. Referring to FIG. 14, a detailed grant parameter sub-widow 210 opens up when Details button 217 is selected where the employee can change parameter values as described above, but where parameter value changes are applied to all services in column 186 as opposed to a single one of the services. Consistent with the example above, the data collection and use option has been limited to 8 A to noon and 1 P to 4 P at 205 and the location value is PWS meaning personal workstation. The FIG. 14 limitations qualify the Cat-2 grant as shown in FIG. 9 at 211. Referring again to FIG. 11, selection of any of the other options 167, 179 or 171 may present a screen shot of information similar to FIG. 12 for the selected option showing service types and details buttons for each of the service types.

Figure 13:
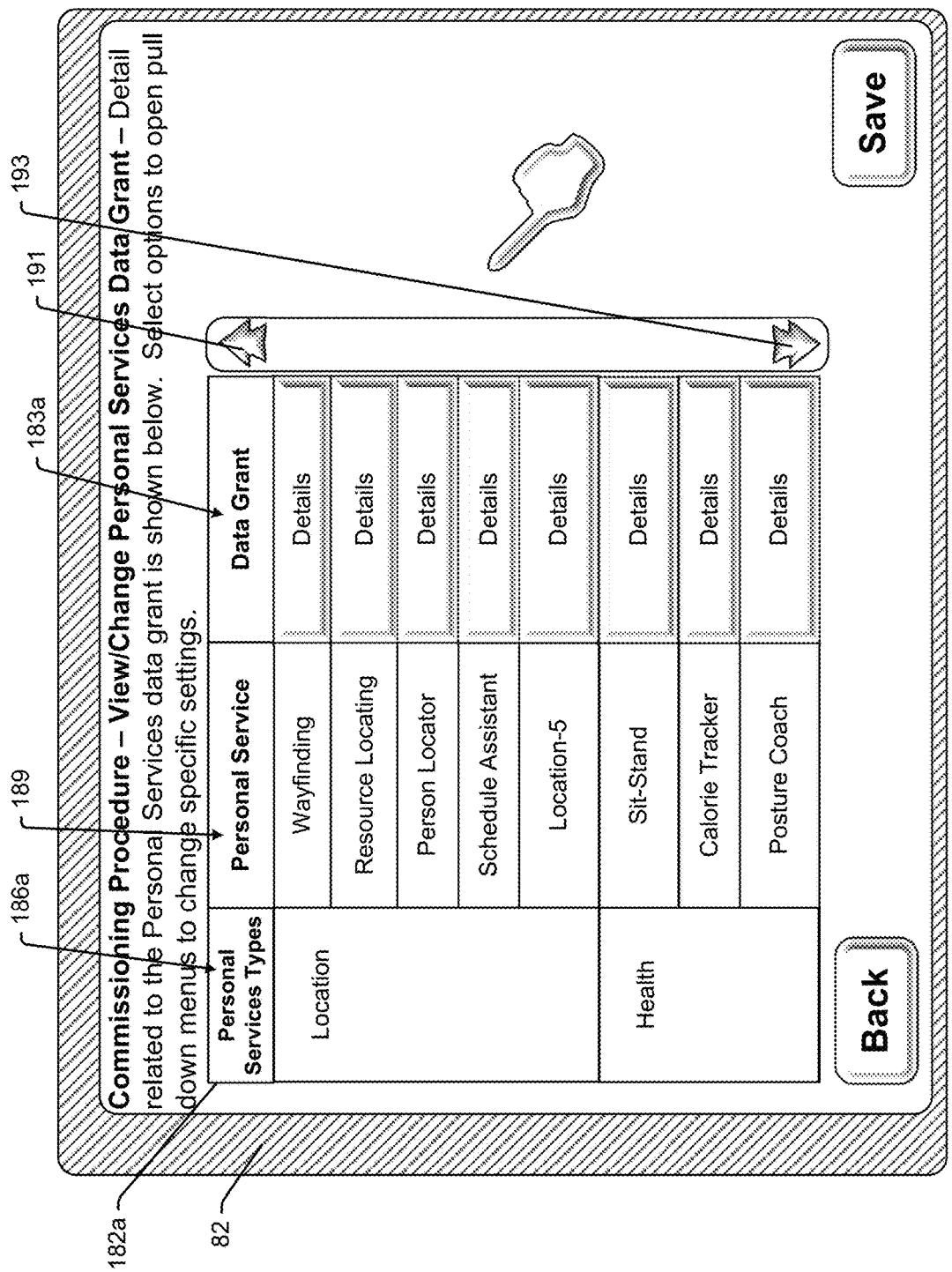
FIG. 13 is similar to FIG. 10, albeit showing a commissioning procedure screen shot at a different point in the commissioning process.

In some cases it is contemplated that there may be several different applications or services for each service type listed in column 186 and, in that case, each of the services of each type may be listed and selectable to access and control or customize details for each service separately. For instance, see FIG. 13 where an another screenshot similar to the screen shot of FIG. 12 is shown, albeit where a grant details table 182a includes a Personal Services column 189 that lists a set of services for each of the service types in column 186a. Here, grant column 183a includes a separate "Details" button for each of the specific services listed in column 189 that is selectable to view and customize service parameter values on a service by service basis. Where separate services are listed, scrolling arrows 191 and 193 may be provided so that an employee can move through the list of personal services in an intuitive manner.

Referring again to FIG. 11, in some cases another option may be a "Customize Data Grant" option 173 which is selectable to customize an employee's data grant. When button 173 is selected in FIG. 11, the screen shot in FIG. 15 may be presented that includes a grant table 182b including a services type column 186b and a personal services column, an employer services column, a service provider services column and a third party services column 230, 232, 234 and 236, respectively. Each column 230, 232, 234 and 236 includes either a "Details" button, a "Desired/None" button or is blank for each of the service types in column 186b. As above, selection of a "Details" button opens up a parameter sub-window that can be used to view and modify various parameter values. Each "Desired/None" button indicates a service type that is supported by the system for an associated data consumer (e.g., the entity in the associated column, e.g., employee, employer, service provider or third party) but for which no authorized data grant currently exists for the employee beyond the Cat-1 grant. Thus, for instance, while "Details" button 238 indicates a current grant exists for personal health services, the "Desired/None" button 240 indicates that while the system supports employer health services, the specific employee has not authorized a data grant for that service. In FIG. 15, each "Desired/None" button is visually distinguished to clearly show grants that could support additional services but that have not been authorized. For instance, in FIG. 15, each Desired/None button is colored red (e.g., left down to right hatched) to indicate a possible grant which has not been authorized.

Referring still to FIG. 15, a blank space in table 182b indicates that currently there is no option for a specific service type for an associated data consuming entity in the associated column. For instance, the blank space at 242 indicates that there is no current third party health service supported by the system.

The FIG. 15 representation is more comprehensive and therefore provides a better and more informed understanding of desired or possible grants, existing grants and other options. To this end, an employee viewing table 182b can clearly see where grants exist and where grants do not exist as well as where services are not supported for data consuming entities. As in the case of FIG. 12 above, in FIG. 15, any of the buttons in table 182b may be selected to access a parameter sub-window (e.g., 250) to see grant details and to change details where possible.

In each of FIGS. 12, 13, 14 and 15, after parameters have been set to employee preferences, the save icon may be selected to save the employee's preferences for use while the employee operates in the employer's facilities. In this regard, as described above, when an employee enters one of the employer's facilities and her badge 15 is initially used to identify the employee, server 14 accesses the employee's data grants and starts collecting data and using that data pursuant to the grant details to drive employee, employer, service provider and third party services authorized by the grants.

Figure 37:
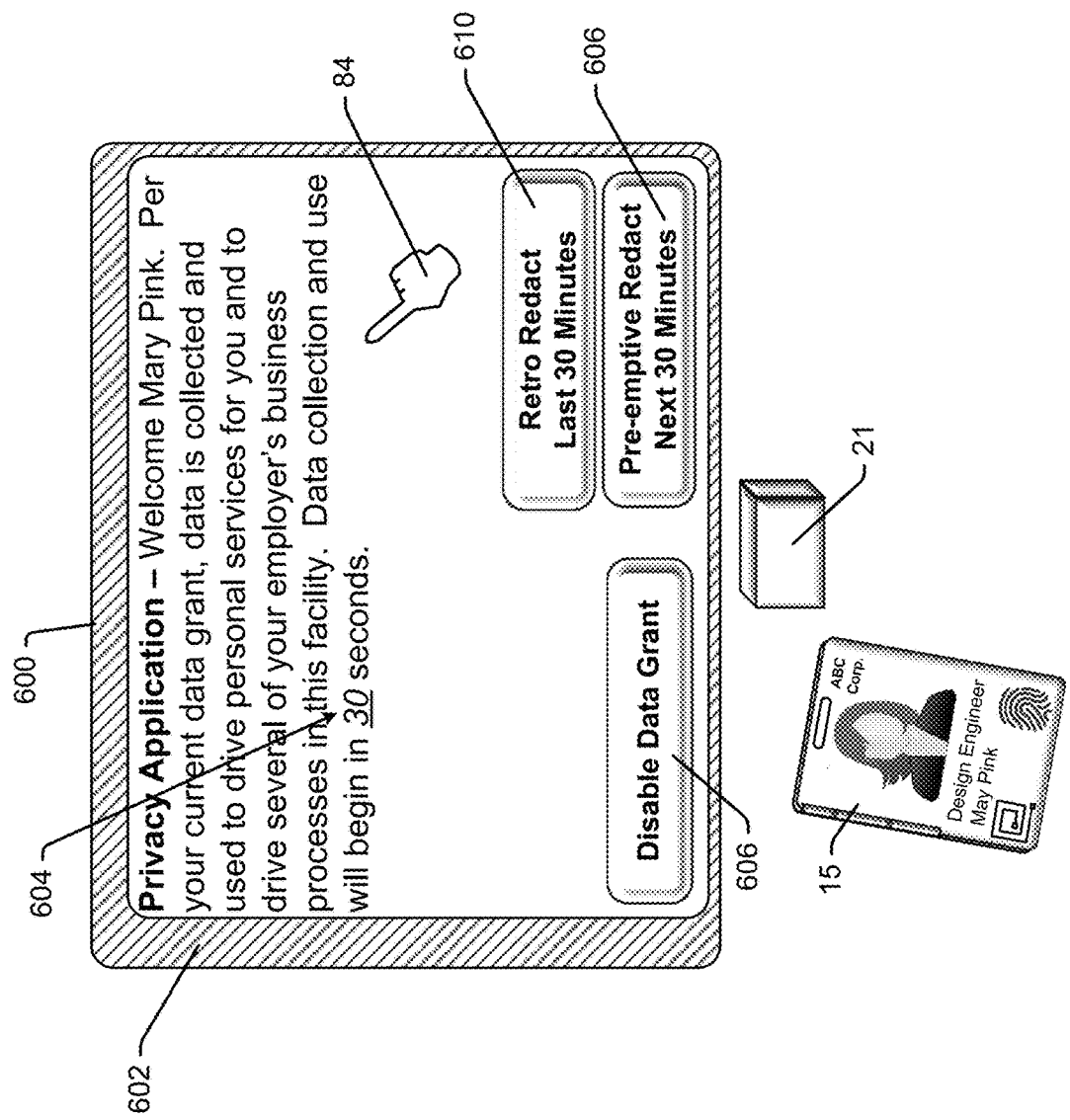
FIG. 37 shows an I/O display screen that may be provided near a tag reader device to provide data grant related information to an employee as well as, in at least some cases, tools for modifying an instantaneous data grant if desired.

In at least some cases there may be some initial signal to the employee just prior to activating data collection and use such as, for instance, flashing badge indicator 82c green three times to indicate data collection and use initiation. In other cases the initial signal that data collection and use is to commence may be presented a short period prior to starting collection and use. For instance, once an employee is identified, server 14 may indicate that data collection and use will commence in 30 seconds. This delay period prior to collecting data may enable the employee to disable collection or use if desired for some reason. In this regard, see, for instance, FIG. 37 where an exemplary badge reader is shown at 21 along with a display screen 600 that may be mounted adjacent the reader device 21 to operate as an I/O device for employees. Screen 600 is shown to include a frame indicator 602 that indicates a data collection and use state. The screenshot includes instructions about data collection and use and presents a warning that data collection and use will commence in 30 seconds at 604. Here, the timer value at 604 may count down for the employee.

In some cases, the badge indicator 82c may persistently indicate data collection and use state in a fashion similar to that described above with respect to the other indicators 82a, 82b, etc. In still other cases the data collection and use state may only be periodically indicated or may indicate each time the data collection and use state changes such as, for instance, if the employee moves from a facility space in which a collection grant exists to a space in which no collection grant exists.

Thus, as the employee travels to her workstation 24, server 14 collects and uses authorized data to drive authorized services. In some cases, it is contemplated that when the employee arrives at her workstation 24, the station sensors and other devices may automatically continue the data collection and use process per the employee's grants and the frame indicator 82 (see again FIG. 10) may be controlled to indicate the data collection and use state. As an alternative, whenever the data grant instantaneously associated with an employee changes for any reason, server 14 may be programmed to indicate the grant change. Thus, for instance, if the first employee has a different data grant at her workstation than in general areas of an employee's facility, as the first employee moves from a general area to the zone associated with her station, server 14 may present an indication via the station display 80 that a different data grant applies at that station.

In some cases the warning of a different grant or a grant change may be presented at the beginning of a short delay prior to the new grant being activated. In this regard, see, for instance, FIG. 16 where a grant change warning is presented at 260 including a countdown clock 261 that indicates when data collection and use per the workstation grant will commence. Here, frame indicator 82 is red (e.g., no data collected or used) until the countdown clock 261 expires. Once the countdown clock reaches 0, data collection and use per the employee's workstation grant starts. Prior to starting data collection and use, the employee can reassess her grant details per button 264 to access and change grant details if desired.

Once data collection at the employee's workstation 24 commences, the FIG. 17 screenshot may be provided where the data privacy application is generally run in the background and other application output may be provided within the space inside the indicator frame 82 on screen 80. Here, in addition to the indicator fame 82 being colored green (e.g., double diagonal hatch) to indicate current data collection and use, in at least some cases the data privacy application will have some presence on screen 80 to enable easy access to grant details and grant customization tools like those described above. In this regard, in FIG. 17, a simple "Data Privacy" button 252 is presented in the lower right hand corner which, if selected, may cause server 14 to present a screenshot similar to FIG. 15 where a full set of current grants for the employee is presented for viewing and modification. In other cases, when button 252 is selected, the employee's grants at the specific station or in a specific facility zone may be presented via display 80 so that the employee can consider the station or zone grants in context.

It has been recognized that in many cases, as employees consider data grants of various types, those employees may not be able to assess how different data consuming entities will use collected data in the abstract and that inability to assess intentions will lead to discomfort and ultimately substantially restricted data grants by employees. For this reason, in some embodiments, it is contemplated that during a commissioning procedure, an employee may be given access to various types of previously generated exemplary system conclusions and prescriptions during a commissioning procedure for each or at least a subset of possible services so that the employee can consider use intentions with more context which may ameliorate discomfort with intended use.

Figure 18:
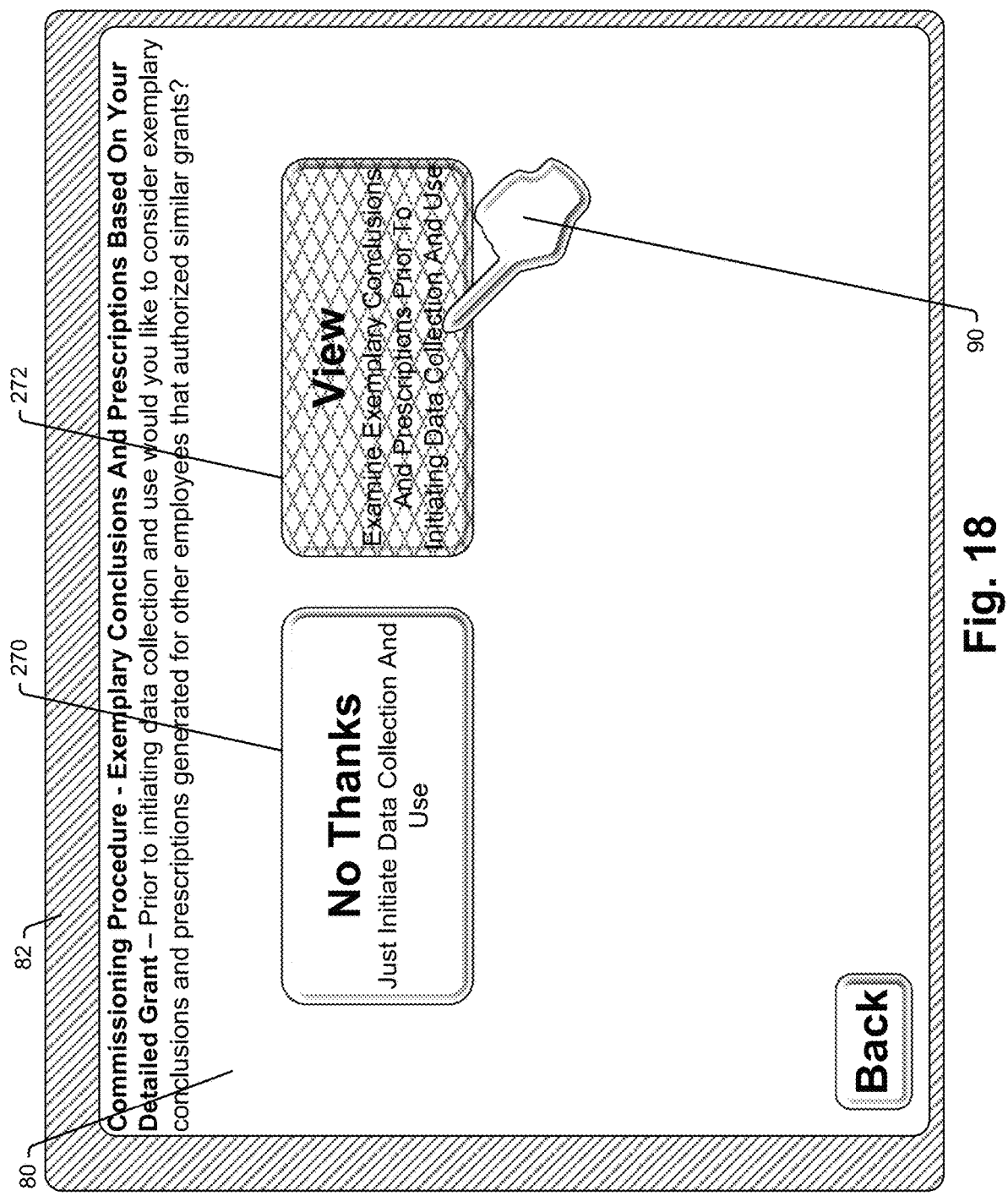
FIG. 18 is similar to FIG. 10, albeit showing a commissioning procedure screen shot at a different point in the commissioning process.

In this regard, in at least some cases, either while or after an employee makes grant selections during commissioning, the employee may have the option to view, based on the selections made, exemplary conclusions and prescriptions. For instance, in FIG. 15, during a commissioning procedure and after user grant selections have been saved, server 14 may present the FIG. 18 screenshot where an employee is presented the options to simply initiate data collection per the user's specified grants at 270 and to view exemplary conclusions and prescriptions at 272. Selection of initiation button 270 may cause server 14 to present the FIG. 16 screenshot. Selection of button 272 may lead to the FIG. 19 screenshot that includes a grant table 280 akin to the table shown in FIG. 15, albeit where each of the selectable table buttons is labelled with a Cs/Ps designation (e.g., conclusions/prescriptions) and is associated with and provides access to an exemplary conclusions and prescriptions table for the service type and data consuming entity type in an associated aligned row and column pairing.

In FIG. 19, selection of button 283 opens conclusions and prescriptions sub-window 282 including a conclusions column 284 and an associated prescriptions column 286 as well as a scrolling arrow tool 290 for accessing other conclusions and prescriptions. After viewing the exemplary conclusions and prescriptions, the employee can select an OK option to continue to commence data collection and use if the employee is comfortable with the conclusions and prescriptions. In the alternative, the employee may back out of the screen shot in FIG. 19 and back to the grant specifying tools to alter currently selected grants if desired.

In FIG. 19 and other embodiments where exemplary conclusions and prescriptions are presented to employees during commissioning, the exemplary conclusions and prescriptions may be based on a fake set of user data, based on real employee data for some other employee or based on an average data set for some plurality (e.g., 20) of employees. Where exemplary conclusions and prescriptions are presented based on some other employee, the conclusions and prescriptions would be anonymous in most cases and in some cases use of those conclusions and prescriptions would be after the other employee authorizes such use.

In some cases it is contemplated that, in addition to presenting conclusions and prescriptions associated with various services, employees may be able to rate conclusions and prescriptions and that rating information may be indicated to commissioning employees in some fashion to help the commissioning employees make more informed data grant decisions. For instance, conclusions that are generally well rated may be highlighted or otherwise distinguished in green while conclusions that are not well rated may be highlighted in red or otherwise visually distinguished. In FIG. 19, the first and second prescriptions in column 286 are indicated as green and red, respectively, indicating strong agreement and disagreement by other employees, respectively, with the generated prescriptions. Similar color coding or other visual distinguishing is contemplated for conclusions in column 284.

While not shown, in at least some cases it is contemplated that the exemplary conclusions and prescriptions may be presented to an employee earlier in the commissioning process so that the employee is more likely to seriously consider authorizing various grants based on comfort with the exemplary ultimate conclusions. In this regard, in most if not all cases, actual conclusions and prescriptions related to data driven services are less negative or less objectionable than employees may fear and therefore, presenting those results prior to grant selection may lead to greater data grants and therefore more robust and accurate conclusions and prescriptions and ultimately to better services.

It has been recognized that in many cases, employer, service provider and third party services need not be started immediately when an employee starts operating in an employer's facility. For instance, for an employer service that track monthly space use, if an employee starts working in a facility in January, space use during March is likely unaffected if the first employee's location information is not provided to the employer's space use tracking service during January. Many other services will not be dependent upon historically collected data and therefore employee operation in a facility for some time without data collection and use is tolerable. For this reason, in many cases it will be advantageous to run confidential test commissioning procedures for employees so that an employee can see real service conclusions and prescriptions related to the specific employee's activities. Thus, for example, in some cases, after an employee has specified data grants, the system may run a test procedure for the next 4 weeks to generate exemplary conclusions and prescriptions based on the employee's preferences and real data generated for the employee's activities in facilities. The system may then present personalized conclusions and prescriptions to the employee at the end of the test period and enable the employee to reconsider and modify grant details if desired.

Figure 20:
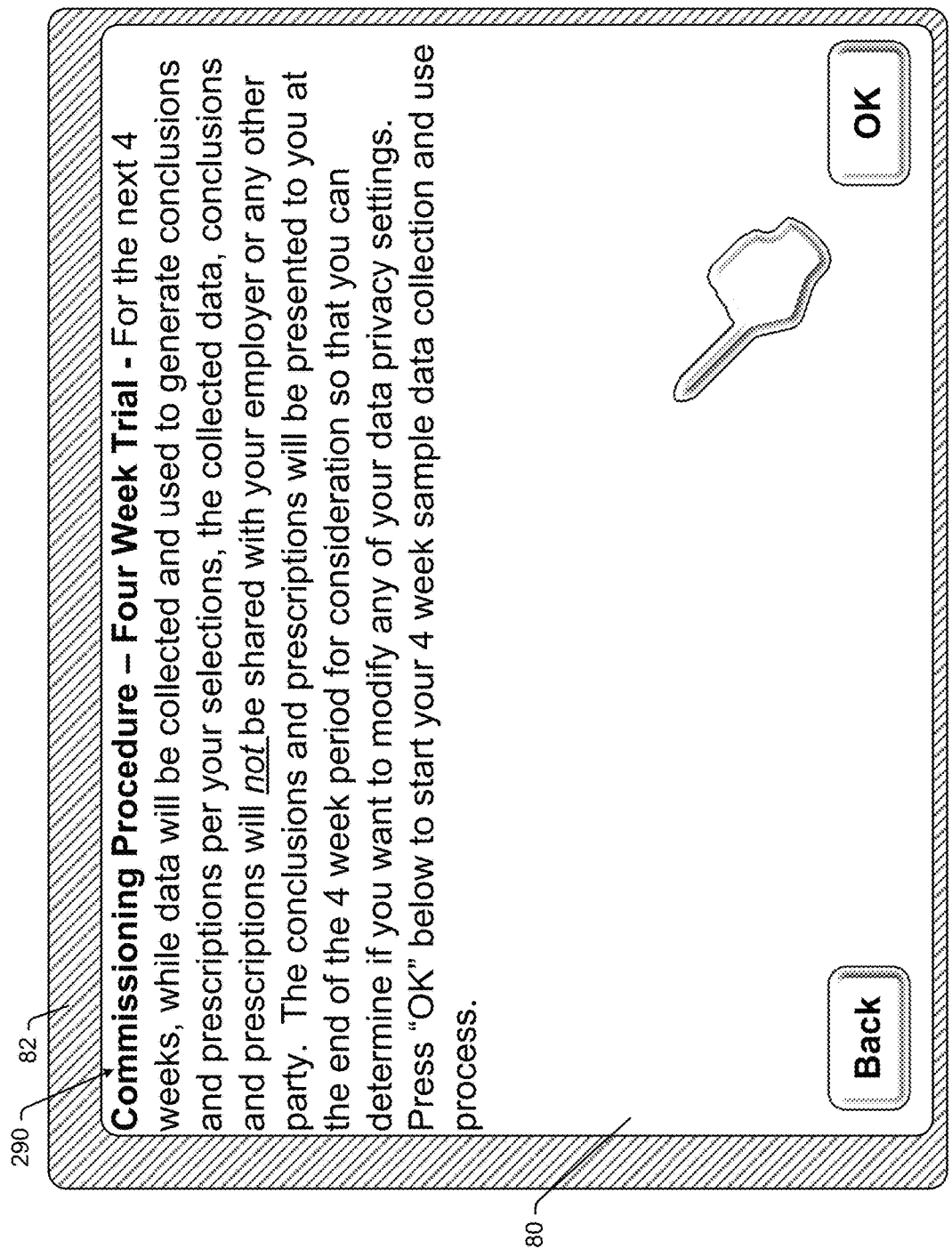
FIG. 20 is similar to FIG. 10, albeit showing a commissioning procedure screen shot at a different point in the commissioning process.

Consistent with the above, referring again to FIGS. 12 through 15, once an employee saves her grant details, server 14 may present a screenshot as in FIG. 20 indicating 290 that a commissioning procedure will start during which data use will be limited to supporting personal services without any use by other data consuming entities like the employer, service providers or third parties. Here, while collected data will not be provided to or used by any other party, the data is used to drive all services supported by the employee's data grant so that real data conclusions and prescriptions are generated. Thus, for instance, where the employee's data grant authorizes an employee health service as well as an employer health service, both the employee and employer health service applications are performed during the test period to generate conclusions and prescriptions based on real life data but those prescriptions and conclusions will only be available to support the employee health service and for viewing by the employee, not the employer. In FIG. 20, upon selection of the OK button, data collection and restricted use during the test period begins.

Figure 21:
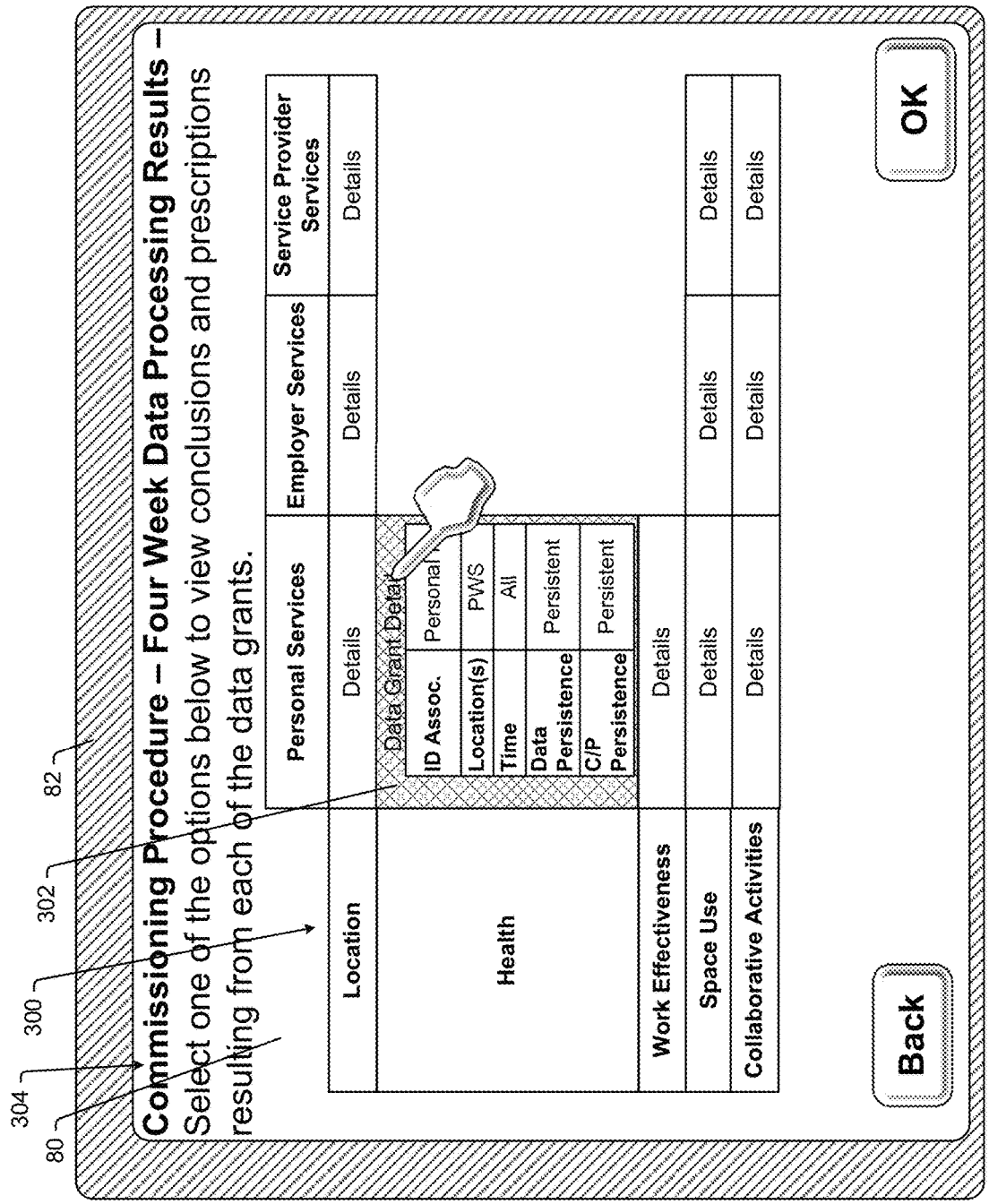
FIG. 21 is similar to FIG. 10, albeit showing a commissioning procedure screen shot at a different point in the commissioning process.
Figure 22:
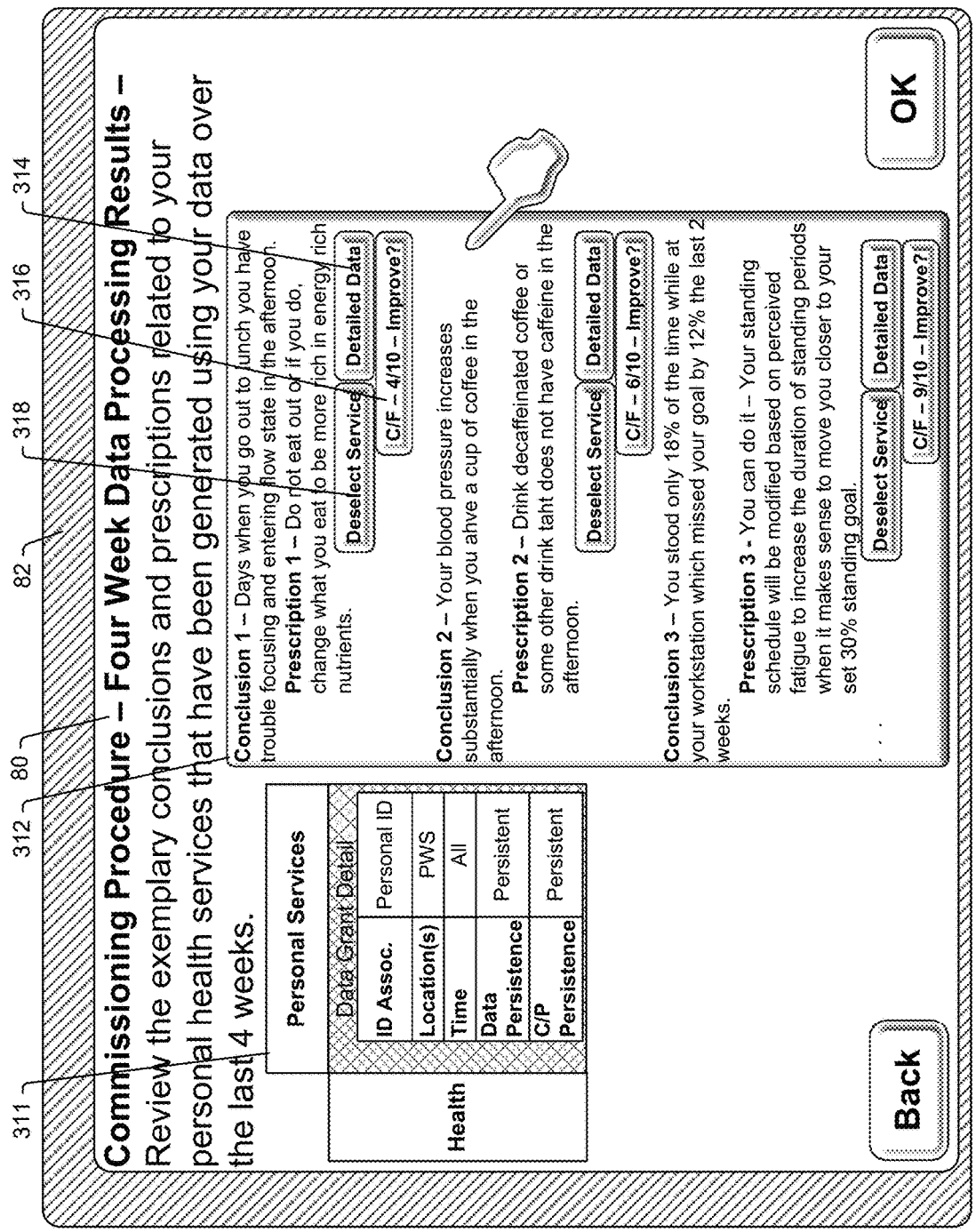
FIG. 22 is similar to FIG. 10, albeit showing a commissioning procedure screen shot at a different point in the commissioning process.

At the end of the test period, the system presents an option to the employee to review conclusions and prescriptions for all authorized services. In this regard, see the exemplary screenshot shown in FIG. 21 that includes a grant table at 300 including a separate grant details cell for each service type and entity paring, one exemplary details cell shown in detail at 302. Instructions 304 invite the employee to select one of the cells to view conclusions and prescriptions associated with the cell. As shown in FIG. 22, once a cell is selected, that cell persists in the next screen as shown at 311 and a sub-window opens up that includes conclusions and prescriptions based on real collected data over the prior test period for the specific user at 312. Each conclusion and prescription may include a "Detailed Data" button (e.g., 314) selectable to access the raw data or some permutation thereof on which the conclusion and prescription is based so that the employee has the ability to better understand the process used to generate results.

Referring still to FIG. 22, in at least some cases it is contemplated that server 14 may also be programmed to generate confidence factors for each or at least a subset of all generated conclusions and prescriptions based on the amount of data collected, the type of data collected, and data grant limitations on data collections and uses. For instance, if a first employee restricts collection of eating habit data to Monday through Wednesday, conclusions and prescriptions based thereon may have a relatively low confidence factor when compared to a second employee that has no restriction on collecting eating habit data.

As seen in FIG. 22, confidence factors for each conclusion and prescription may be presented as indicated at 316. In cases where confidence factors are presented, in some cases server 14 will be programmed to determine how data grants could be modified to increase the confidence factor value. For instance, in the above eating habit example, one way to increase the confidence factor for the first employee would be to eliminate the eating habit restriction. In FIG. 22, each confidence factor is shown as a selectable button 316 and it is contemplated that if the button is selected, advice on how to increase the confidence factor and, in some cases tools to do so would be accessible.

In at least some cases a test commissioning procedure, in addition to generating real data conclusions and prescriptions for services that are authorized by an employee's detailed data grants, may also generate confidential real data conclusions and prescriptions (e.g., results that are not released to the other data consuming entities) for all services that server 14 is capable of supporting or at least for an additional subset of services that server 14 is capable to supporting that are over and above the employee's grant so that the employee can consider conclusion and prescriptions for other services when finalizing her data grant at the end of the test period. Thus, for instance, where the first employee selected a Cat-2 grant (e.g., only supporting personal services), server 14 may nevertheless confidentially collect all data and run all services during the test period to generate all possible service conclusions and prescriptions and may present all of the conclusions and prescriptions to the employee for consideration at the end of the test period. Here, during the test procedure, all data collected and conclusions and prescriptions based thereon would remain confidential (e.g., never be released to the employer or any other party for consideration or storage).

In some embodiments it is even contemplated that a commissioning test may be performed during a test period and prior to any detailed employee grant process so that the employee has the ability to consider conclusions and prescriptions based on real collected data for that specific employee during the detailed grant specifying process. Thus, here, an employee may simply agree to a confidential commissioning process for the test period during an initial encounter with a data grant application at a workstation 24 or the like. After initial authorization for the confidential test process, all data is collected and used to drive all services during the test period, albeit without any access by other entities (e.g., the employer, service providers or third parties) to the data, conclusions or prescriptions or other results. Thereafter, server 14 may present conclusions and prescriptions as in FIG. 21 for consideration, albeit for all supportable services.

In some cases, instead of allowing an employee to make grant detail selections, it is contemplated that the system may enable an employee to deselect grants based on disagreeable conclusions, prescriptions or other results. To this end, see FIG. 22 where a "Deselect Service" button 318 is presented for each of the conclusions and prescriptions. Here, by selecting button 318, the employee indicates that she does not want the service that generated the associated conclusion and prescription to be authorized by her persistent data grant. In a case where all services are confidentially run during a test period to generate all possible conclusions and prescriptions, deselection of services based on rejection of disagreeable conclusions and prescriptions would be a powerful tool. In fact, by requiring de-selection as opposed to selection by employees, employees have more incentive to seriously consider detailed data grants.

In still other cases it is contemplated that employees may prefer to consider data grants in the context of desired personal services or palatable employer, service provider and/or third party services. For instance, instead of rejecting an employer having access to the first employee's location information in a vacuum, the first employee may prefer to consider a wayfinding service provided by the employer that is based on the employee's location information. In this regard, referring again to FIG. 10, in some cases, upon selection of option 174, server 14 may present the commissioning procedure screenshot in FIG. 23 where instructions 320 invite an employee to select data based personal services that the employee would like to implement and a list 324 of selectable buttons, one for each personal service.

Figure 23:
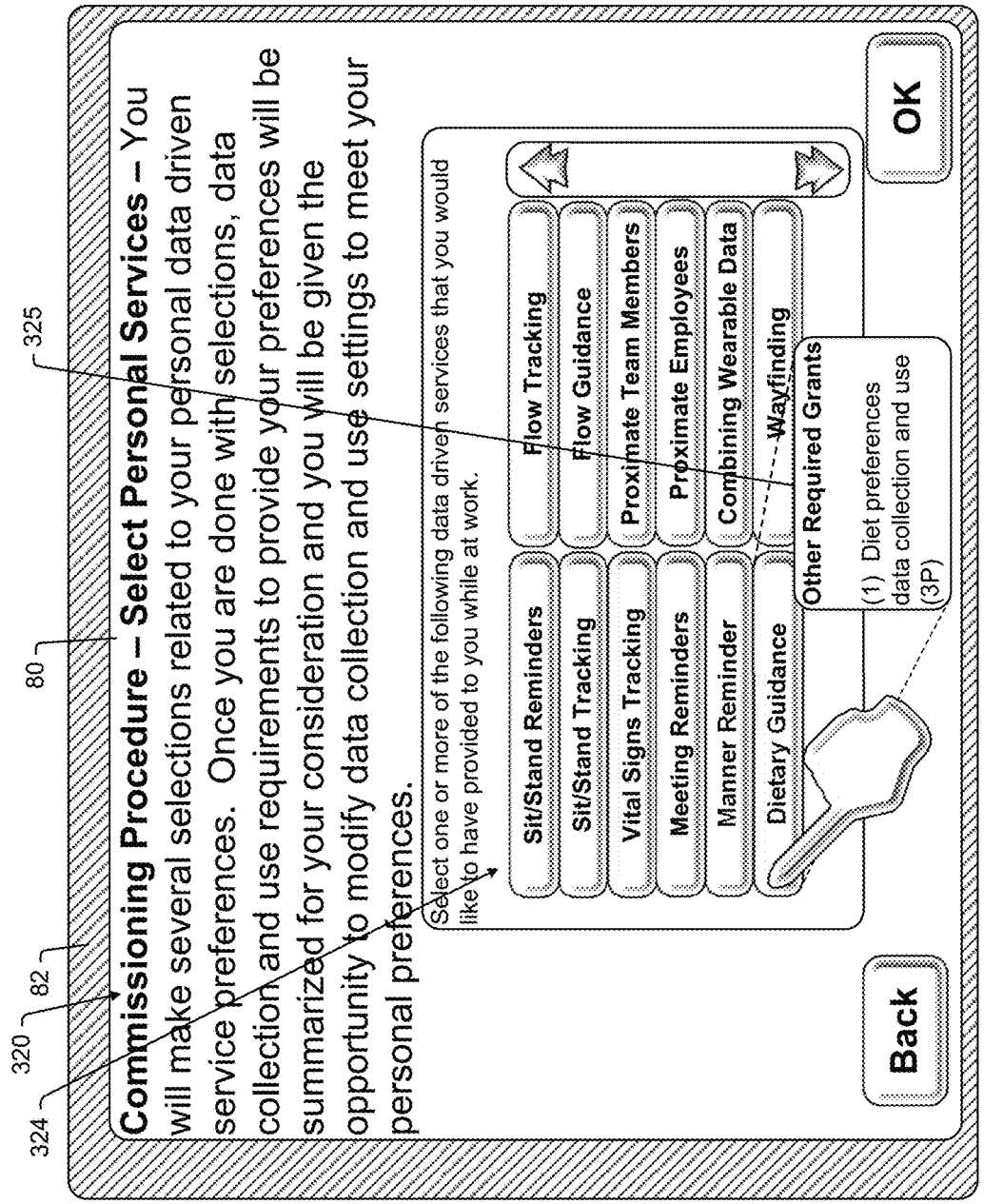
FIG. 23 is similar to FIG. 10, albeit showing a commissioning procedure screen shot at a different point in the commissioning process.
Figure 24:
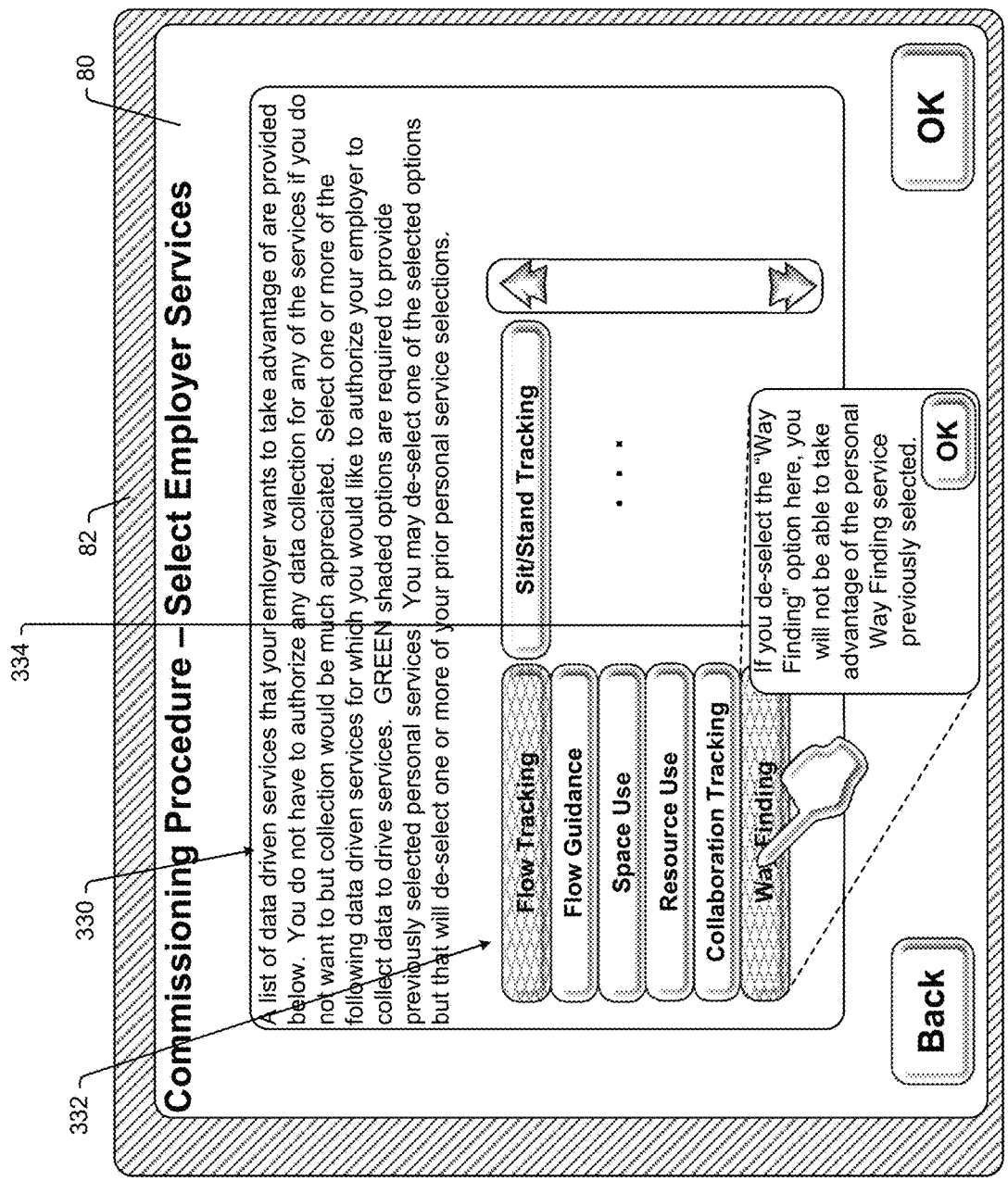
FIG. 24 is similar to FIG. 10, albeit showing a commissioning procedure screen shot at a different point in the commissioning process.

Once desired personal services are selected and the OK button is selected, server 14 presents employer services for consideration and selection as shown in FIG. 24. The screenshot in FIG. 24 includes instructions 330 and a list of employer services at 332. The instructions 330 indicate that some services in list 332 are already highlighted green to indicate that they are required by some of the services that were already selected via the personal service selection screen in FIG. 23. Green selected services in list 332 can be deselected but that may result in automatic deselection of one or more of the personal services previously selected. In at least some cases hovering over or otherwise selecting one of the green selected services may cause a sub-window to open as shown at 334 where the effect of deselection on prior personal use selections is indicated for employee consideration.

While not shown, screenshots akin to the screenshots in FIGS. 23 and 24 would be provided for service provides as well as third parties and, in some cases, a separate screenshot may be provided for each service provider and each third party as an employee may authorize some service provider and third party grants and not others.

In still other cases, referring again to FIG. 23, when a user hovers over or otherwise selects one of the personal services from list 324, a sub-window as at 325 may open up to indicate other services that are required or tied to the selected personal service that need to be authorized for other entities in order to have access to the selected personal service. For instance, a third party may provide or sponsor a personal dietary guidance service for employees but may require, in return, access to diet preference data for employees so that the third party can develop other services based on the diet preference data collected. Here, hovering over the "Dietary Guidance" button in FIG. 23 causes an "Other Required Grants" window 325 to open.

After an employee has specified desired and seemingly palatable personal, employer, service provider and third party services per screens 23 and 24 and others, server 14 may present a summary of data grants required to support the employee's selected services as shown in FIG. 25. Here, the detailed required grants are shown in table form at 350 where, as in the case of FIG. 15 above, service type and data consuming entity pairings each defines a cell and each cell has either a "Details" button, a "Desired/None" button, or no designation. Here, as above, each "Details" button is selectable to see details of each associated grant. Similarly while not shown, each Desired/None button is selectable to see details of grants that have not been authorized. In other cases the table 350 may automatically be expanded or may be expanded per a request by an employee so that all grant details can be observed at one time or via scrolling tools (not shown in FIG. 25).

It has further been recognized that there are a massive number of grant right combinations given the large number of data consuming entities (e.g., personal, employer, multiple service providers, multiple third parties, etc.), different service types and services within each type, and variable data collection, use and storage parameters. Given the massive number of possible grant combinations, in some cases it will be difficult and even objectionable to expect employees to make all data grant selections initially or during some reasonable length commissioning procedure. In many cases it is expected that if the grant commissioning process requires substantial time prior to implementing data driven services, many employees will simply take the easy way out and reject any meaningful type of grant to their employers, service providers and third parties. For this reason, in still other cases a commissioning procedure may be gradual or staged over several months or even a year to limit time or effort requirements at any one time. Hereinafter, unless indicated otherwise, a commissioning procedure that is performed piecemeal over an extended time period will be referred to as a "staged commissioning procedure".

In addition to spreading out time and effort requirements over a period to avoid employees having to dedicate a large chunk of time at once to data grant commissioning, there are other advantages to a staged commissioning procedure. First, by staging the grant specifying process, an employee is able to consider different grants contextually. For instance, a first service offer during a staged commissioning procedure may include a height adjustable table sit-stand service where the service is offered at a height adjustable workstation like station 24 in FIG. 2. In this case, the employee can consider the sit-stand service in the context in which it will be used as opposed to in the abstract in at least some cases. In addition, the employee may opt, in this case, to participate in a one day or more commissioning sub-procedure at station 24 where the user can experience the service including conclusions, prescriptions and value ascribed to the sit-stand service alone and can make adjustments on a service by service basis to customize a grant to her specific preferences. Thus, here, the employee would not be distracted by many services reporting conclusions and prescriptions at once and instead could experience each service in a vacuum to better understand the value of the service and the associated grant. If standing 35 minutes every hour is too much, an employee can adjust the standing guidance to be 20 minutes per hour. After the sub-procedure is complete, the employee may either activate the first service or cancel that service.

As another instance, a second service offer during a staged commissioning procedure may be to extend the sit-stand service in some natural way such as, for instance, offer the ability to automatically collect fitness information from an employee's wearable fitness tracker (e.g., a smart watch or the like) which could then be used to provide even better sit-stand guidance or other fitness related functions. In the alternative, the second service offering could be an offering related to extending the sit-stand service to other height adjustable workstations (e.g., any height adjustable hoteling station in any of the employee's facilities 12a, 12b, 1c, etc.) or to any height adjustable telepresence station 32 (see again FIG. 50) so that more effective tracking and guidance can be provided. In this example, if an employee rejects the first sit-stand service, the system would simply forego offering the follow-up related or extended service set.

A third service offer during a staged commissioning procedure may be to provide a wayfinding service that requires knowledge about an employee's current location and where she is headed. Here, while at her personal workstation, server 14 may offer the wayfinding service and provide a simple explanation of how the service works and the benefit to the employee. The explanation may also indicate the grant required to implement the service. For instance, in the case of wayfinding, the grant would include the ability to track employee location at least some times (e.g., when the employee is traveling to a different facility location) and knowledge about where the employee is located. In addition, in cases where a portable device is used as a wayfinding output device (e.g., on a map, as real time directions to turn, walk forward, etc.), the grant would include knowledge about the employee's portable device network address. Again, the employee could participate in a one or more day commissioning sub-procedure and then either cancel or activate the wayfinding service.

This staged commissioning procedure could continue until all available services and grants have been experienced and considered or until an employee disables staging of further services. In some cases, new services may only be offered during commissioning one at a time, the second being offered after the first is implemented, third immediately after the second is implemented, and so on. In other cases, next services may only be offered after some period (e.g., one week) following activation of a prior experienced service. In other cases, during a staged commissioning process, server 14 may present several options to the employee and the employee may have the ability to select which service is experienced first, second, third, and so on.

Second, by staging the grant specifying process, an employer, service provider or other entity may be able to tie services together in ways that reward employees for authorizing employer or other data grants. For instance, a wayfinding employee service may be logically tied to an employer's requirement to receive a location service grant from an employee. In other words, the employee can only have the wayfinding service if she agrees to a general location service grant for her employer. In some cases, an employer may be able to tie grants together in random ways as well. For instance, an employee may only be given access to a wayfinding service if she gives a fitness tracking and use data grant to her employer. Many other tied grants are contemplated.

Third, by staging the grant specifying process, it is contemplated that, over time, employees will become more familiar with and accepting of various data grant types which, ultimately, will yield even greater data grants for several reasons. First, if employees recognize substantial value from initially offered or experienced services, those employees will be more inclined to give up additional grants as they seek more value from other data driven services. Second, it is believed that employee-employer trust will build over time as employees come to realize that the data collection and services system and their employers and other data consuming entities are not using data, conclusions or prescriptions for nefarious reasons or to draw wrong conclusions about employees.

Figure 26:
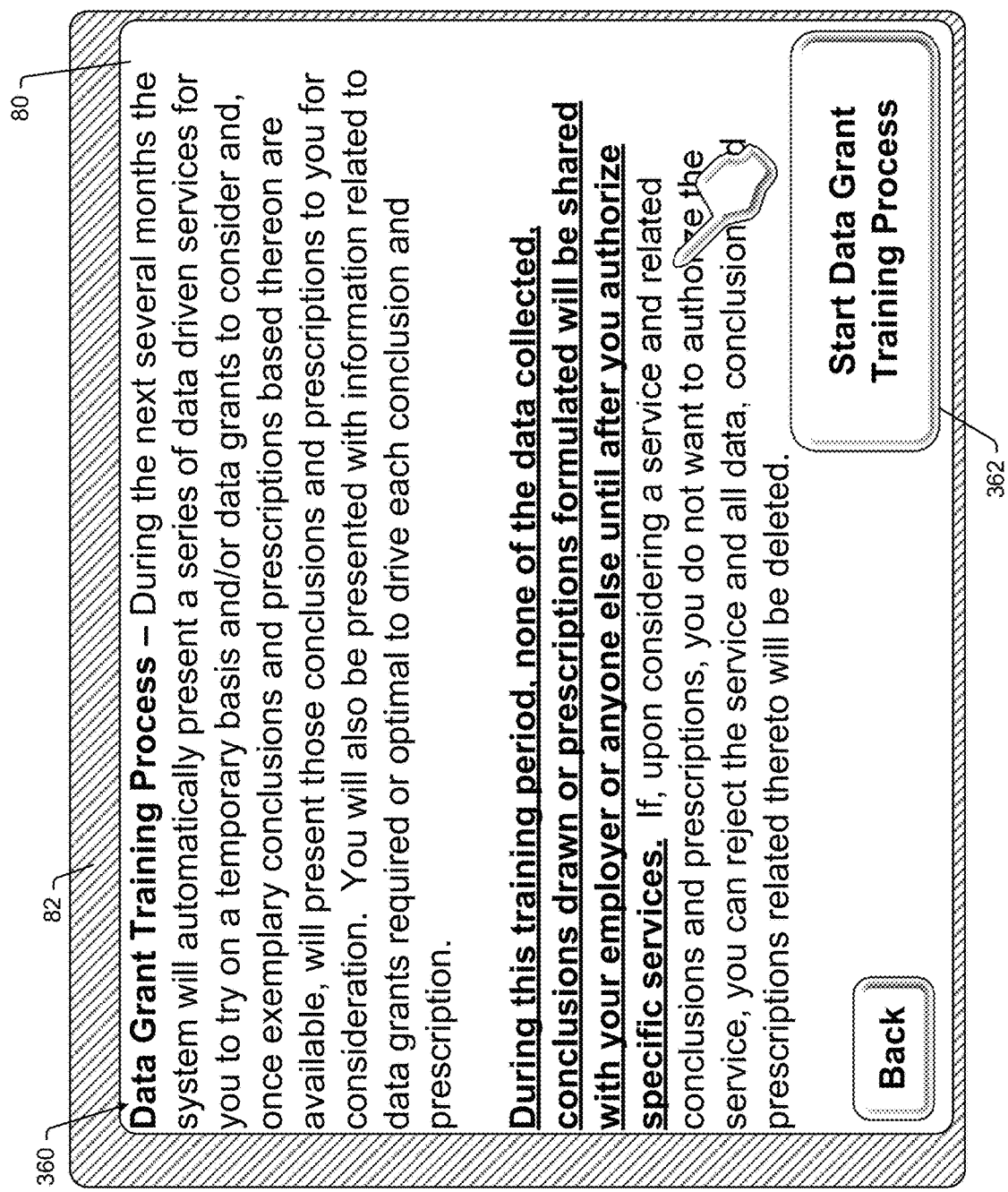
FIG. 26 shows a screenshot inviting an employee to participate in a confidential grant training process that is consistent with at least some aspects of the present disclosure.

Referring again to FIG. 10, the initial commissioning screenshot includes a "Staged Commissioning Process" button 178 which, when selected, may cause server 14 to provide the screenshot shown in FIG. 26 that includes instructions 360 as well as a "Start Staged Process" button 362. The instructions describe the staged commissioning process including a statement that no data during the commissioning process is used for any purpose other than to support employee services or to help the employee understand how the data, conclusions and prescriptions would be used and by whom once a service is activated. Here, if the employee selects button 362 to start the process, server 14 offers the first service in the set of staged commissioning process services.

Figure 27:
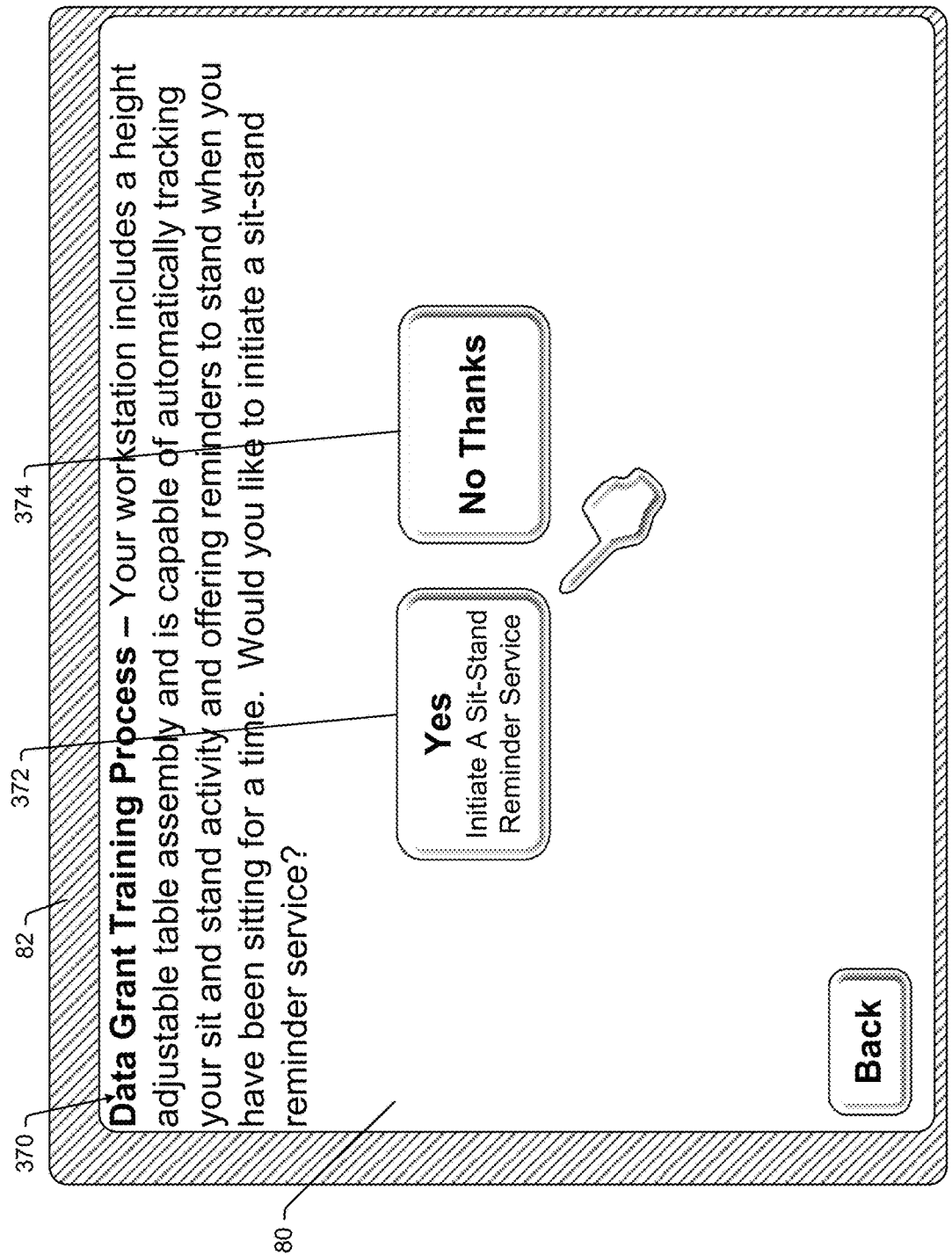
FIG. 27 shows a screenshot that may be presented to an employee inviting the employee to experience a data driven service in confidence and situationally.
Figure 28:
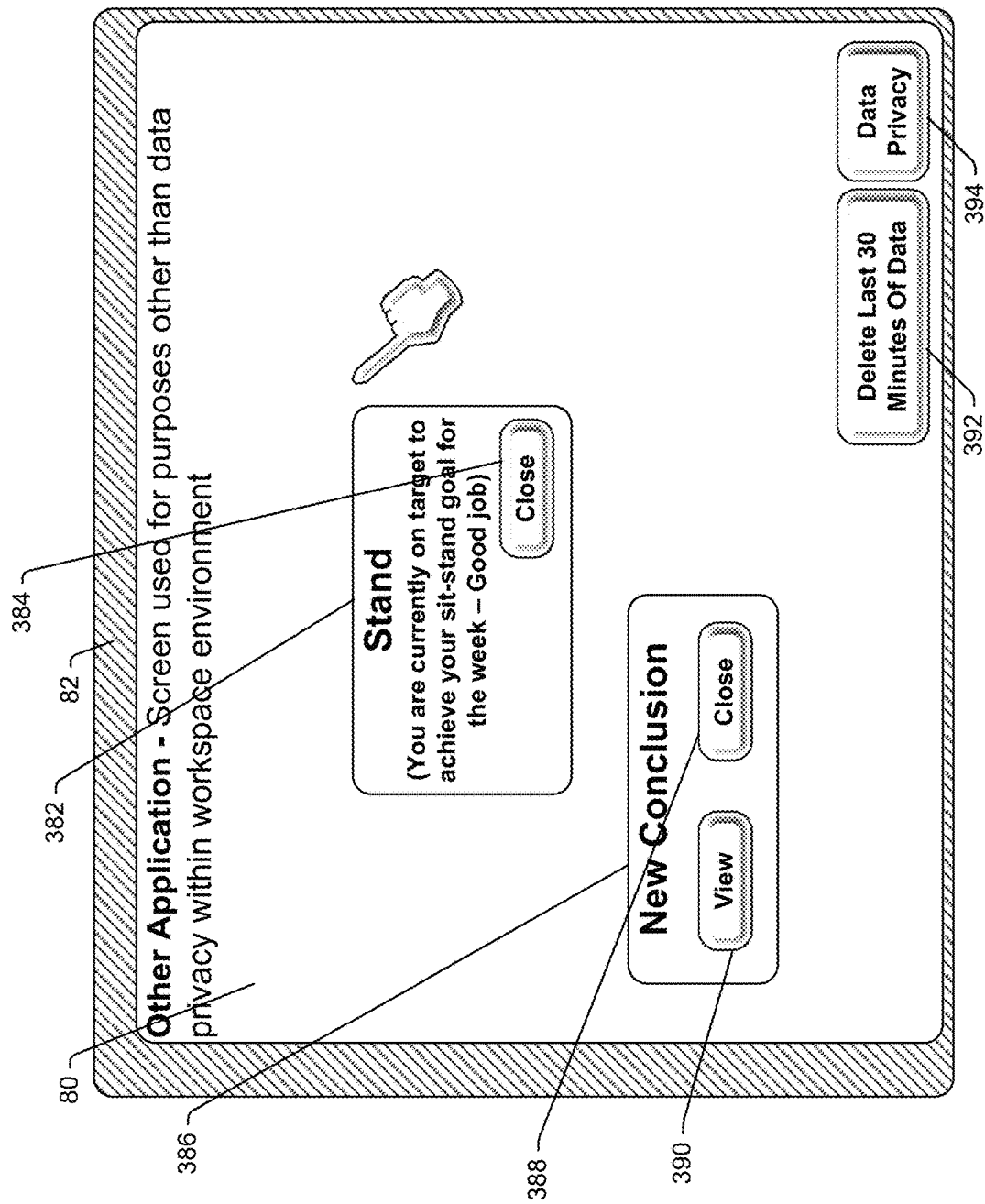
FIG. 28 shows a screen shot presenting instructions associated with a situational service.

See the exemplary screenshot shown in FIG. 27 including instructions 370 describing the sit-stand service and "Yes" and "No" buttons 372 and 374, respectively, for initiating a sit-stand commissioning sub-process and rejecting that process, respectively. If the employee starts the sit-stand sub-process, server 14 starts the sit-stand service which includes tracking various data while the employee uses her personal station, using the data to determine when to provide reminders to the employee to sit and to stand and that tracks and stores compliance data related to how well the employee complies with the guidance. In FIG. 28 an exemplary stand message is shown at 382 encouraging the employee to stand until guided to again sit. Here, the employee can either stand when instructed and that activity would be sensed and the message 382 would be automatically removed or the message may only be presented for a short duration (e.g., 30 seconds) after which it is removed, or the employee may simply select a "close" button 384 to close the reminder. Where the reminder is removed after a short period, if the employee did not stand as instructed, the system may automatically readjust the standing requirement for a future period and may present another reminder notice like 382 a short time later (e.g., 10 minutes) to try to get the employee to comply.

Figure 29:
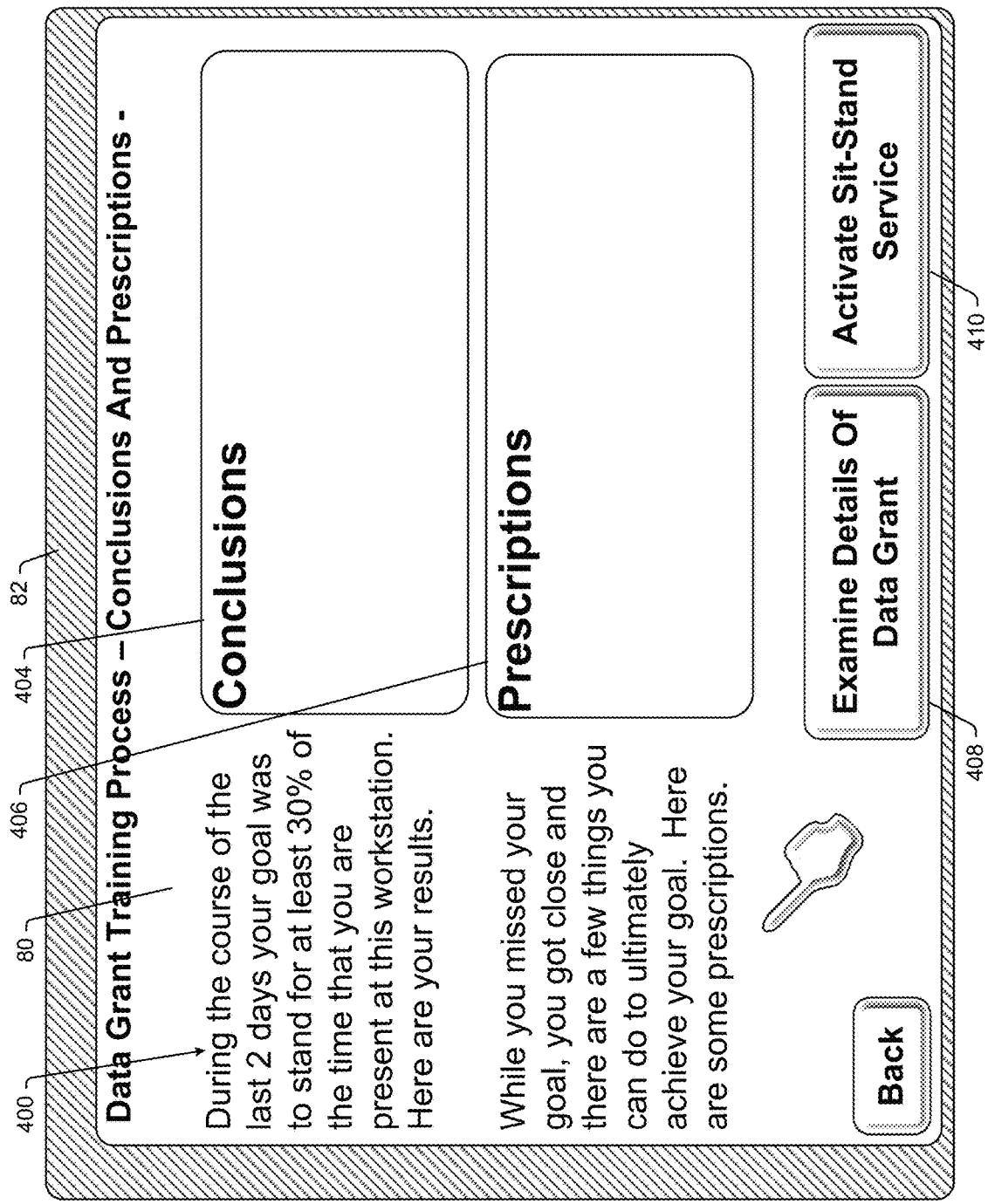
FIG. 29 is a screenshot showing exemplary conclusions and prescriptions to an employee for consideration during a confidential service experience.

Eventually, enough sit and stand and compliance data is generated to support a service conclusion and prescription. Once sufficient supporting data is collected, server 14 presents a new conclusion window as seen at 386 in FIG. 28 along with view and close buttons 390 and 388 that allow the employee to ignore the new conclusion/prescription or to view the new conclusion/prescription. If the employee opts to view the conclusion/prescription, a conclusion and prescription screen like the screenshot in FIG. 29 may be presented that includes an explanation at 400 and conclusion and prescription windows at 404 and 406, respectively, as well as buttons for accessing details of the related data grant and to activate the sit-stand service at 408 and 410, respectively. Here, the employee considers the conclusion and prescription and may authorize the associated grant. Once the sit-stand service is activated, any grant to the employer, a service provider or a third part that is tied to that service will be initiated and therefore supported by the system. In addition, as described above, server 14 may either immediately or after some delay or, at some contextually appropriate or optimal time, present a next service to the employee to experience and consider.

In at least some cases it is contemplated that an employee will always have the ability to access all individual data related to that specific employee as well as to all conclusions and prescriptions related to the specific employee. In addition, in at least some embodiments, each employee may also have the ability to access any other conclusions and prescriptions generated by any service for any entity where the conclusion or prescription is at least in part based on data associated with the specific employee. Thus, for instance, if an employer's space utilization service generates a first prescription that the employer should build out four additional 8 to 10 person conference spaces to meet perceived demands, the system may track all employees for which any data was collected that was relied upon to generate the first prescription and may offer the conclusion to that employee. As another instance, if a third party uses collected data to generate a conclusion that a 20% discount on coffee increases profits at the third parties local coffee shop by 30%, the system may again track all employees for which any data was collected and used to generate the conclusion and offer the conclusion to each employee. Here, the idea is that each employee has access to all data, conclusions and prescriptions that are based at least in part on her data and therefore can be better informed about how her data is being employed.

In at least some cases it is contemplated that when an employee accesses her data or any conclusions or prescriptions, tools may be provided that allow the employee to reject or accept conclusions and/or prescriptions. Here, if, for instance, an employee may reject a data driven conclusion that she does not work well with other employees on Friday afternoons. As another instance, the employee may confirm a conclusion that she can quickly enter and can sustain long flow states on Monday afternoons in general.

In some cases, when a conclusion or prescription is rejected, the conclusion or prescription may be deleted from the system so that no other entity like the employer has access to the rejected result. In other cases, a rejected conclusion or prescription may cause the service to be modified so that the same or a similar data set does not generate the same result for the specific employee. In still other cases, a rejected conclusion or prescription may simply be reflected in a confidence factor associated with the result.

In some embodiments, as part of a commissioning procedure, one or more services may generate conclusions and prescriptions related to an employee and, any time a new conclusion or prescription is generated that has not been previously considered or vetted by the employee, the new result may be offered to or presented to the employee for consideration. In this case, the employee may be able to confirm or accept the conclusion or prescription causing the conclusion or prescription to be released for consumption by other entities and may also automatically enable release of next instances or occurrences of the accepted conclusion or prescription when they occur in the future. Similarly, the employee may be able to reject the conclusion or prescription causing the conclusion or prescription to be deleted without release to other parties and may also automatically disable release of any next instances of the conclusion or prescription when they occur in the future. Once the new conclusion or prescription has been considered and either accepted or rejected by the employee, that conclusion may not be automatically offered to or presented to the employee in the future as the value or accuracy of the result and how it should be treated would have already been vetted by the employee.

F. Claw Back

While fully informed and employee controlled data grants should empower employers to ask for and employees to give better and more complete and unassailable data grants for various types of services, as described above, comfort with data access is often contextual and, in many cases, employees will not be able to comprehend contexts in which they may object to data access by at least some data consuming entities prior to an actual occurrence of an actual event. For instance, a first HR employee may have to discuss a sensitive topic with a second employee and may know, prior to the discussion, that neither employee will want a record of the discussion or even that the two employees met. Here and in other similar cases, it is contemplated that, irrespective of their specified data grants, at least one if not both of the first and second employee's may want to pre-emptively redact a portion of their data grant. Thus, for example, the first employee, recognizing that the conversation with the second employee is scheduled for one half hour, may want to pre-emptively cancel or pull back all of her data grants during the scheduled half hour period to make sure that no data whatsoever is collected by the sensors during the meeting.

As another example, when an employee is first identified via one of the ID reader devices 21 upon arriving at facility 12*a*, instead of having the system activate data collection and use immediately, the employee may want to postpone collection and tracking for 30 minutes while the employee gets settled.

In other cases a first employee may only recognize that she does not want data related to some activity that already occurred during a prior most recent period (e.g., a most recent hour period) to be stored and/or used to drive any service. Here, it would be advantageous if the first employee had some way to claw back or, in effect, redact collected data from system databases for the prior period. Unless indicated otherwise, hereinafter the feature that allows an employee to either pre-emptively cancel a data grant or retroactively redact collected data from databases will be referred to generally as redaction features and separately as a preemptive redaction feature and a retroactive redaction feature, respectively.

In at least some cases, redaction features may be specific to certain data types or services or based on one specific parameter value or a complex set of parameter values. For instance, in some cases, an employee may be able to invoke a location or space specific redaction feature. For example, an employee may pre-emptively redact all data grants at her personal workstation or only while the employee is located in a specific one of her employer's facilities. As another example, an employee may redact all data grants that authorize use of data to support health related services or focus related services of any type. In a more complex case, a redaction may relate to focus related employer services over the next hour only at an employee's workstation.

In at least some cases it is contemplated that simple redaction tools may be easily accessible or even persistently presented to an employee that allow selection of the most typical redaction choices. To this end, while complex redaction may be useful in some cases, in most cases it is expected that full pre-emptive or retroactive redaction of all data and uses will cover the Yeoman's share of redaction choices. For this reason, in at least some cases, quick redaction or grant disablement buttons like buttons 608 and 606 in FIG. 37 may be presented on display 600 when an employee uses her badge 15 to key into an employee's facility. Here, if tag readers 21 are located throughout the employee's facilities, any employee could quickly cause a read of her ID tag by any of the tag readers and could pre-emptively redact per button 606 or even retroactively redact per exemplary button 610. Similarly, pre-emptive and retroactive buttons 422 and 420, respectively, may be persistently presented at employee workstations 24 (see again FIG. 17) adjacent the "Data Privacy" button 252 for quick selection and redaction. Here, to pre-emptively redact all data for the next 30 minutes, an employee may select button 606 or button 422 and to retroactively redact 30 minutes of data the employee can select button 610 or button 420.

To specify a more detailed redaction definition, a "Detailed Redaction" button 424 is provided which, when selected as indicated in FIG. 17, causes a redaction specification sub-window 425 to open where a user is presented with location, time and service options for specifying a more detailed and limited optimal redaction request. One default option subset may be automatically highlighted as indicated at 428 and 432 which specifies redaction at the employee's current station for one hour for all data and services. The other location option is "In This Facility" at 430, the other time option is "Today" at 434 and other service limitations include "Health Related" and "Focus Related" at 436 and 438, respectively. After detailed redaction limitations are specified, the employee selects retro or pre-emptive options 440 or 442, respectively, to redact retroactively or pre-emptively.

In many cases much of the data required to drive employer, service provider, and third party services does not need to be instantaneous and, instead, those services are often driven by latent data that may be a few hours or even days old. For this reason, in at least some embodiments, all data required to drive employer, service provider and third party services that does not need to be instantaneous, will be stored in a temporary, secure and private database and not used to drive conclusions or prescriptions, until released from the database. Thus, here, retroactive redaction may include erasing all data specified by the redaction request that is stored in the temporary database.

In still other cases it is contemplated that server 14 will allow an employee to hold all collected data and/or generated conclusions and/or prescriptions for some period and to indicate the end of that period so that the employee can determine whether or not to release the stored information. To this end, see, for instance, FIG. 30 where another screenshot is presented that includes a "Data Hold" button 450 selectable to halt data release to either all non-personal services or to all services until instructed otherwise. While frame 82 is shown as green prior to selection of button 450 in FIG. 30, once button 450 is selected, frame 82 would change to yellow to indicate that data is being collected but not released to other entities.

Once button 450 is selected, in some cases, a periodic reminder sub-window 452 will be presented to indicate when data is ready to be released or that final instructions related to data have not been issued. Window 452 includes instructions 454 about the halted data and a blue (e.g., vertical and horizontal hatch) color coded frame indicator 456 indicating that the instructions are related to collected and ready to be released data. The window 452 further includes data disposition option buttons including a "Release" option 458, a "Hold For Now" option 460, a "Delete Data" option 462 and a "View Data" option 464. While not shown, more complex hold options akin to the redaction options described above are contemplated.

G. Additional Grants

While several applications and services already exist that can take advantage of various types of data grants, it is contemplated that as more and different types of sensors are installed throughout employer facilities and even outside those facilities and more and different types of data are collected, many more applications and services will be developed to support employees, employers, services providers and third parties. In many cases initial data grant authorizations will not cover new data types or new applications or services or, even if initial data grants technically cover future data types of data collection and data driven services, new data collection and new uses may be perceived as overreaching or even deceitful. For this reason, in at least some embodiments it is contemplated that an automated mechanism may be put in place for obtaining additional data grants for collecting new data types and/or for implementing new data driven applications and services.

In some cases, it is contemplated that after an employee authorizes various initial data grants to drive a set of services, additional services may be developed that can use the data already collected per the initial grants and without requiring any additional data collection rights. Here, in at least some cases, prior to activating new services based on existing data collection grants, server 14 may automatically seek a new data grant authorizing the new services. To this end, see the exemplary supplemental grant request window 470 in FIG. 31 that may be automatically presented to an employee when new personal services based on existing data collection grants are available.

Figure 31:
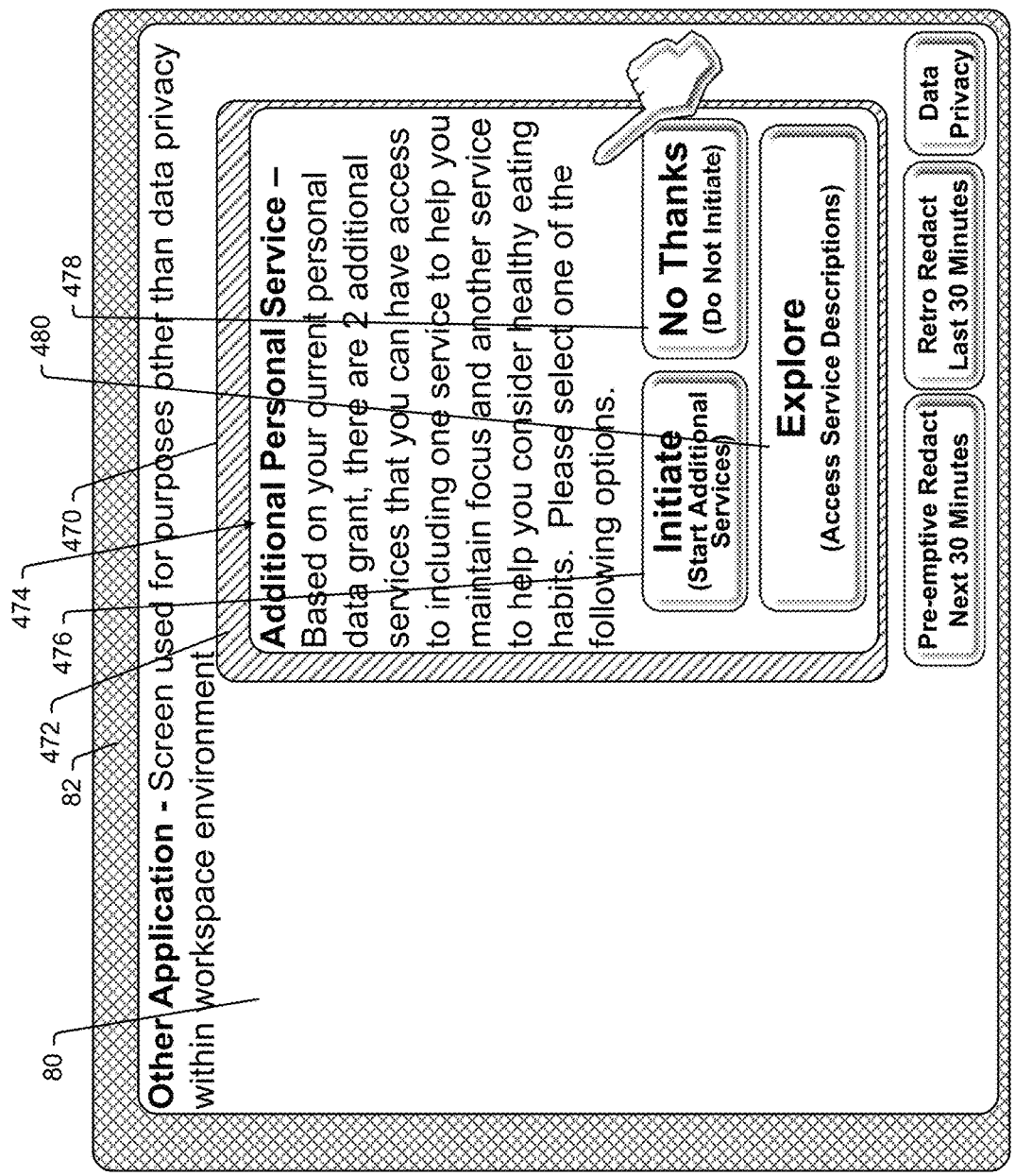
FIG. 31 is a screenshot showing an invitation to an employee to experience additional personal services.

The supplemental grant request includes instructions at 474 requesting authorization to activate the new services. In FIG. 31, the large frame indicator 82 is green indicating that the system is still collecting data and using the data for other prior authorized services. A frame indicator 472 that circumscribes the supplemental grant window is red indicating that currently the additional services are not active. The window also presents various options for responding to the supplemental grant request including an "Activate" option 476 selectable to activate the services, a "No Thanks" option 478 to reject the newly offered services, and an "Explore"

option 480 selectable to access additional information about the additional suggested services.

Figure 32:
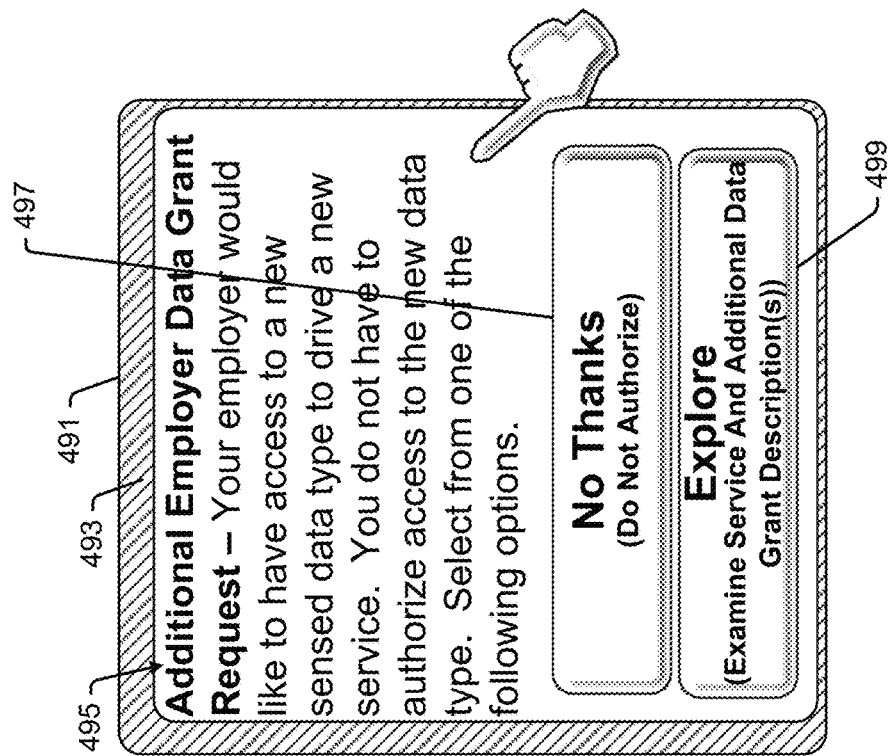
FIG. 32 shows another invitation to experience a service, albeit an employer service as oppose to a personal employee service.

While FIG. 31 shows an "Activate" option 476, in some cases, prior to any additional data grant for collection or use to drive a new service, the system may require an employee to explore the grant in at least some detail so that the employee is at least reasonably informed of how the grant extends beyond an existing grant. At least some forced or required exploration of an expanded grant may be particularly important in cases where the grant expands an employer's, a service provider's, or a third party's access to, or use of data. In this regard, see the supplemental data grant request window 491 in FIG. 32 that includes a grant request and instructions at 495 and response buttons including a "No Thanks" button at 497 to reject the supplemental grant and an "Explore" button 499 selectable to access additional information about the request.

Figure 33:
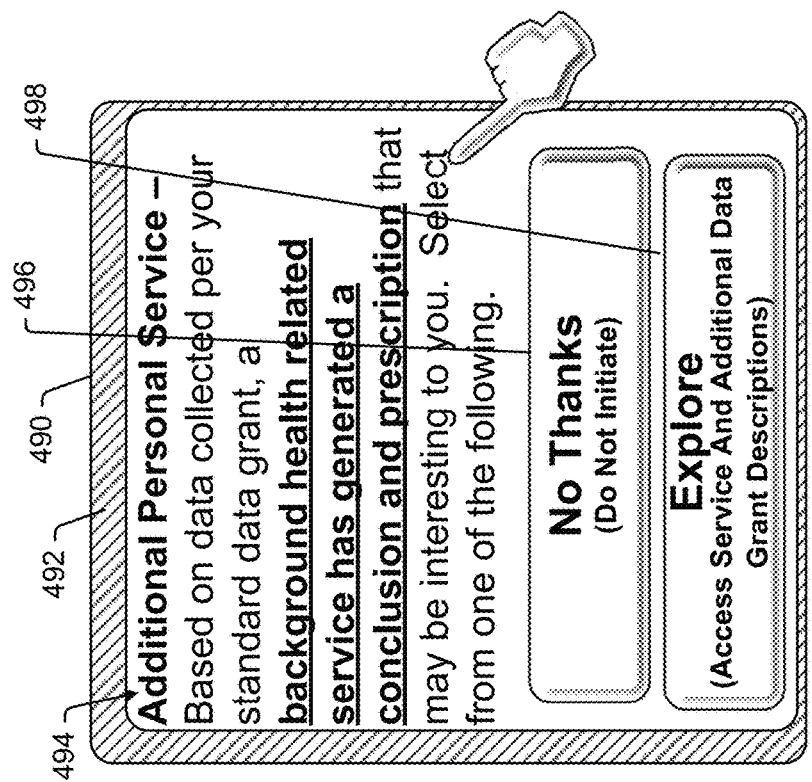
FIG. 33 shows yet another invitation to experience additional personal services.

In some cases it is contemplated that server 14 may run "background" services or applications on data collected per an existing data grant to generate conclusions and prescriptions based on non-active personal services or even other entity services and may automatically and subtlety offer at least some of the conclusions and/or prescriptions to the employee to entice the employee to activate new personal services. To this end, see the supplemental data grant request window 490 in FIG. 33 that includes a request and instructions at 494 as well as selectable response buttons including a "No Thanks" option 496 to reject the additional services and an "Explore" option 498 to access additional information about the suggested services. Again, because window 490 is related to services that have yet to be activated, the frame indicator at 492 is shown as red.

In addition to running background applications (e.g., unauthorized applications run confidentially (e.g., no release of data, conclusions or prescriptions)) using existing data collection grants, in at least some cases it is contemplated that the system may allow employees to authorize a complete data collection grant to drive background services and to present "interesting" conclusions and prescriptions to the employee whenever they occur. Here, the term "interesting" means some conclusion or prescription that is unusual or out of the ordinary and interesting conclusions and prescriptions may be negative or positive. For instance, if an employee is having unusual difficulty focusing or entering a flow state persistently in the afternoon, the system may automatically recognize that set of circumstances as an interesting conclusion and offer the conclusion and perhaps a prescription to the employee for consideration. Here, the idea is that the system may operate as a sort of "nosey personal assistant" that looks for unusual or unexpected circumstances and butts in to make employee's aware and to offer recommendations when appropriate. Again, here, all background services and results would be maintained confidential and never released to entities other than the employee until the employee selects an additional data grant authorizing such release or use.

Thus, for instance, where the system is capable of supporting 100 different personal services for an employee and the employee has only authorized 4 of those services, the system may automatically run the other 96 services in the background monitoring for interesting conditions which, when recognized, are presented to the employee for consideration. In some cases, when an employee considers an interesting condition, the employee may be enticed to issue an additional data grant to support one or more additional services. As in examples above, employer, service provider and/or third party services may be tied to additional personal services in order to obtain additional grants.

In the above example where the employee activates 4 out of 100 possible personal services, in some cases it is contemplated that the system may allow the employee to select a subset of background services to limit recommendations. For instance, of the 100 services, a first employee may select 15 to run as background services along with the fully activated 4 personal services and the remaining 81 personal services may be completely disabled.

H. Spatial Data Grant Zones

In at least some cases different affordance configurations and/or facility spaces may be imbued with different minimum or required data grant characteristics. For instance, while a minimal required data grant (e.g., Cat-1 in the present specification) may be associated with a personal workstation 24 (see again FIG. 2), a more substantial employer data grant (e.g., Cat-2) may be associated with a conference space like the one shown at 26 in FIGS. 1 and 6. In many cases the data grants may mirror reasonable employee expectations. For instance, an employee may reasonably expect greater data privacy at a personal workstation than within a conference room that is shared by other employees and more confidentiality in a conference room than in a common cafeteria space.

Figure 34:
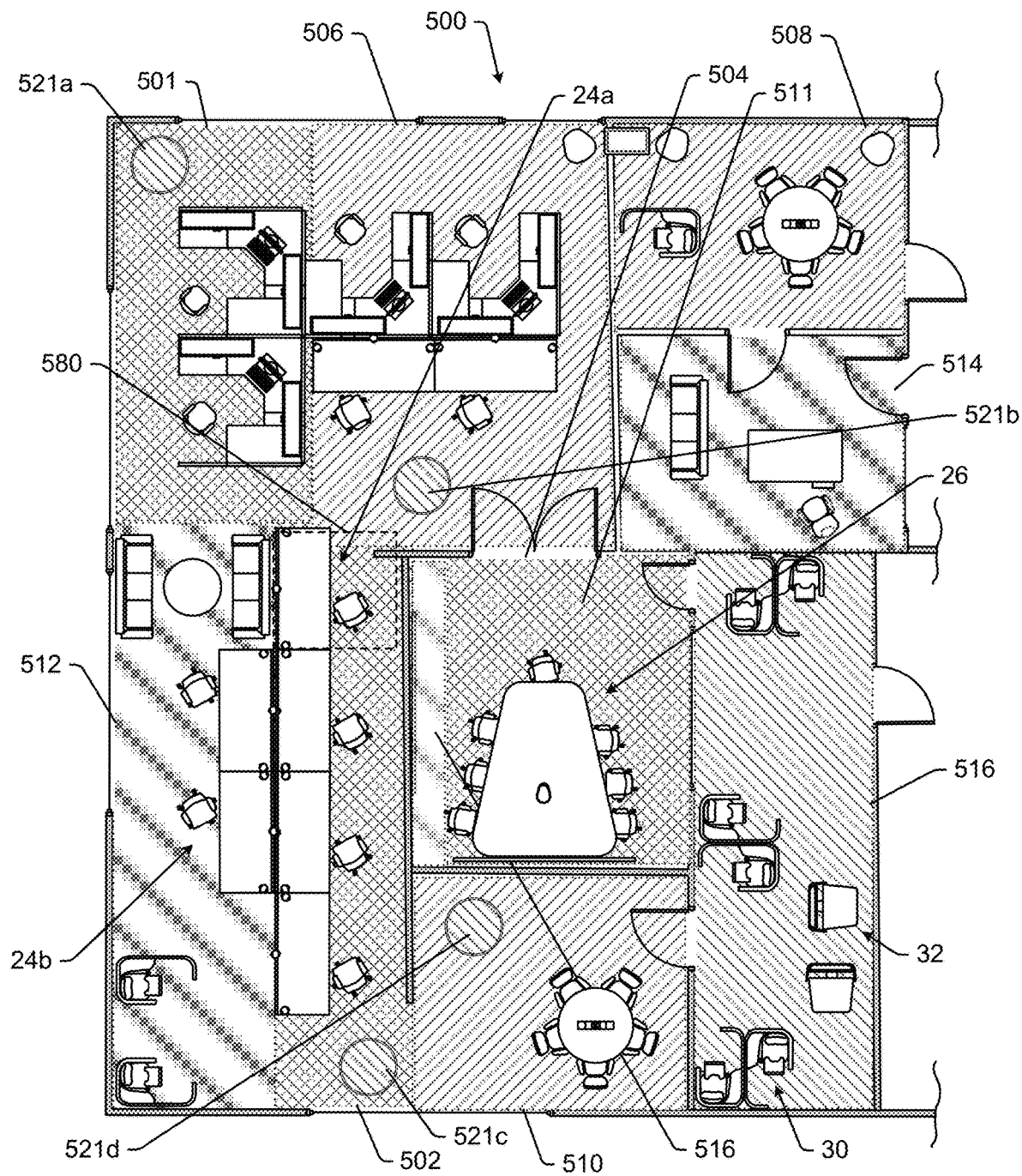
FIG. 34 is a plan view showing an exemplary employer facility where patterns in different zones indicate different data collection and use states or grants.

Referring to FIG. 34, an exemplary plan view of facility 12*a* from FIG. 1 is shown where different sections or facility zones have been color coded red (e.g., left down to right hatch), yellow (e.g., left up to right hatch) and green (e.g., double diagonal hatch) to indicate different minimum data grant requirements for those zones. Here, instead of indicating different data collection and use states (e.g., not collecting data, collecting data but not releasing, collecting data and releasing for use and that collected data is ready to be released, as described above), the red, green and yellow colors in FIG. 34 correspond to data grants with different levels of restrictions thereon. While three different minimum data grant requirements are shown in FIG. 34, four and more other gradations of minimum grant requirements are contemplated.

Here, unless indicated otherwise the minimum grant requirements corresponding to the red, yellow and green zones will be as follows. In all red zones 512, 514 and 516, all that is required is the Cat-1 data grant. In all yellow zones 506, 508 and 510, the minimum grant will require collection of all possible data types only during business hours (e.g., 8 AM to 5 PM) but the collected data will be limited to anonymous use by the employer and any service provider. In all green zones 501, 502 and 504, the minimum grant will require collection of all possible data types without any time restriction and complete and any use of employee IDed data by the employer with only anonymous use by a specific first service provider.

In the present example, if an employee has a less restrictive data grant than the grant associated with the zone currently occupied by the employee, the employee's grant will be used instead of the minimal grant associated with the zone to collect and drive services. Thus, for instance, if an employee is located at personal station 24*b* in FIG. 34 which is in a red zone and therefore only requires a Cat-1 grant, if the employee has authorized a Cat-3 grant at station 24*b*, the Cat-3 grant would control data collection and services for the employee while at station 24*b*. On the other hand, if the employee is at station 24*a* which is in a green zone 502 and the employee's data grant at station 24*a* is more restrictive than the minimum grant associated with the green zones, the employee would either have to accept the green grant, in at least some embodiments, or would have to move to a different station like station 24*b* where the minimal required grant is less than the employee's authorized grant.

Figure 35:
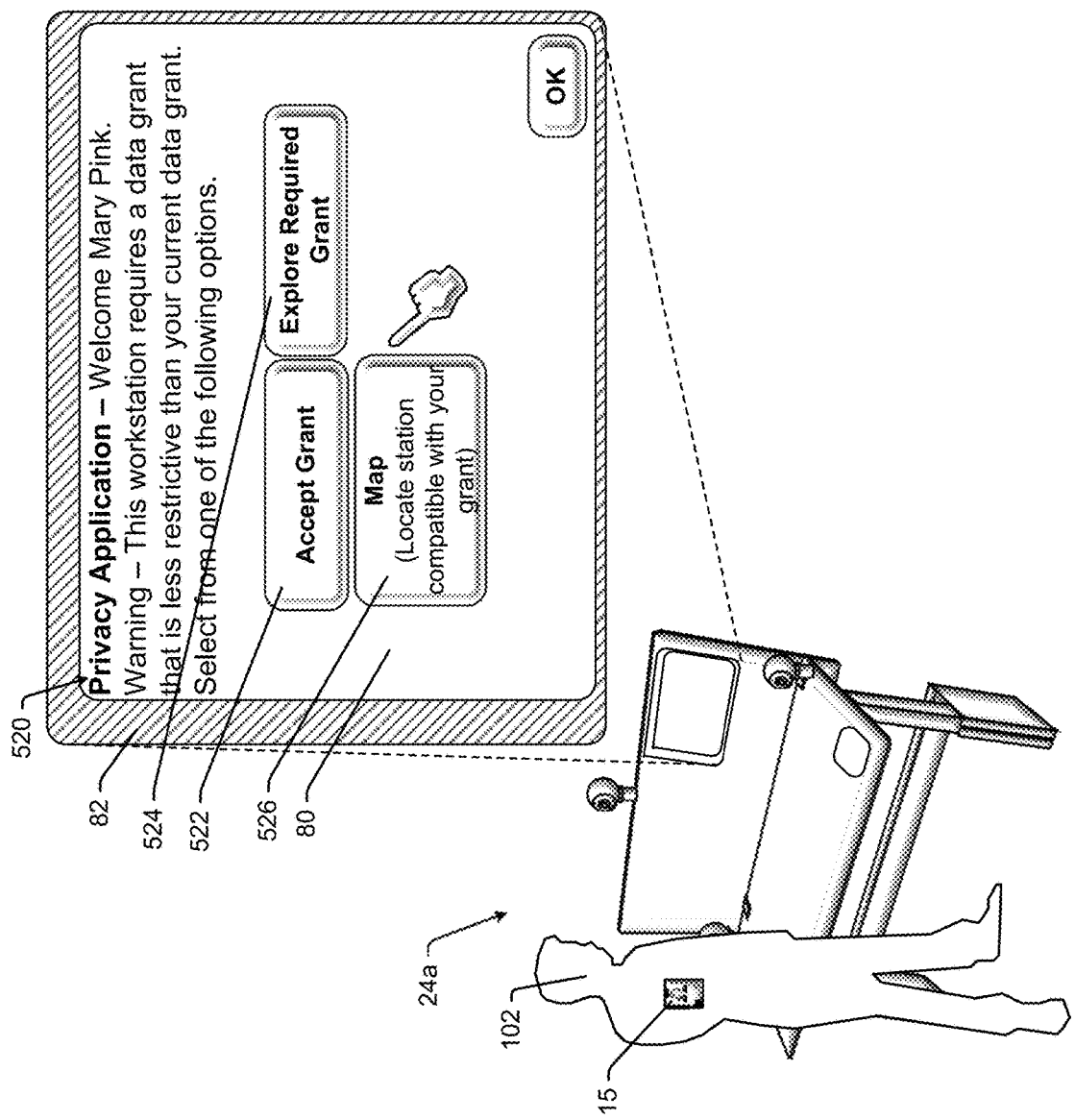
FIG. 35 is similar to FIG. 10, albeit showing a warning to an employee that her current data grant is incompatible with an adjacent workstation.
Figure 36:
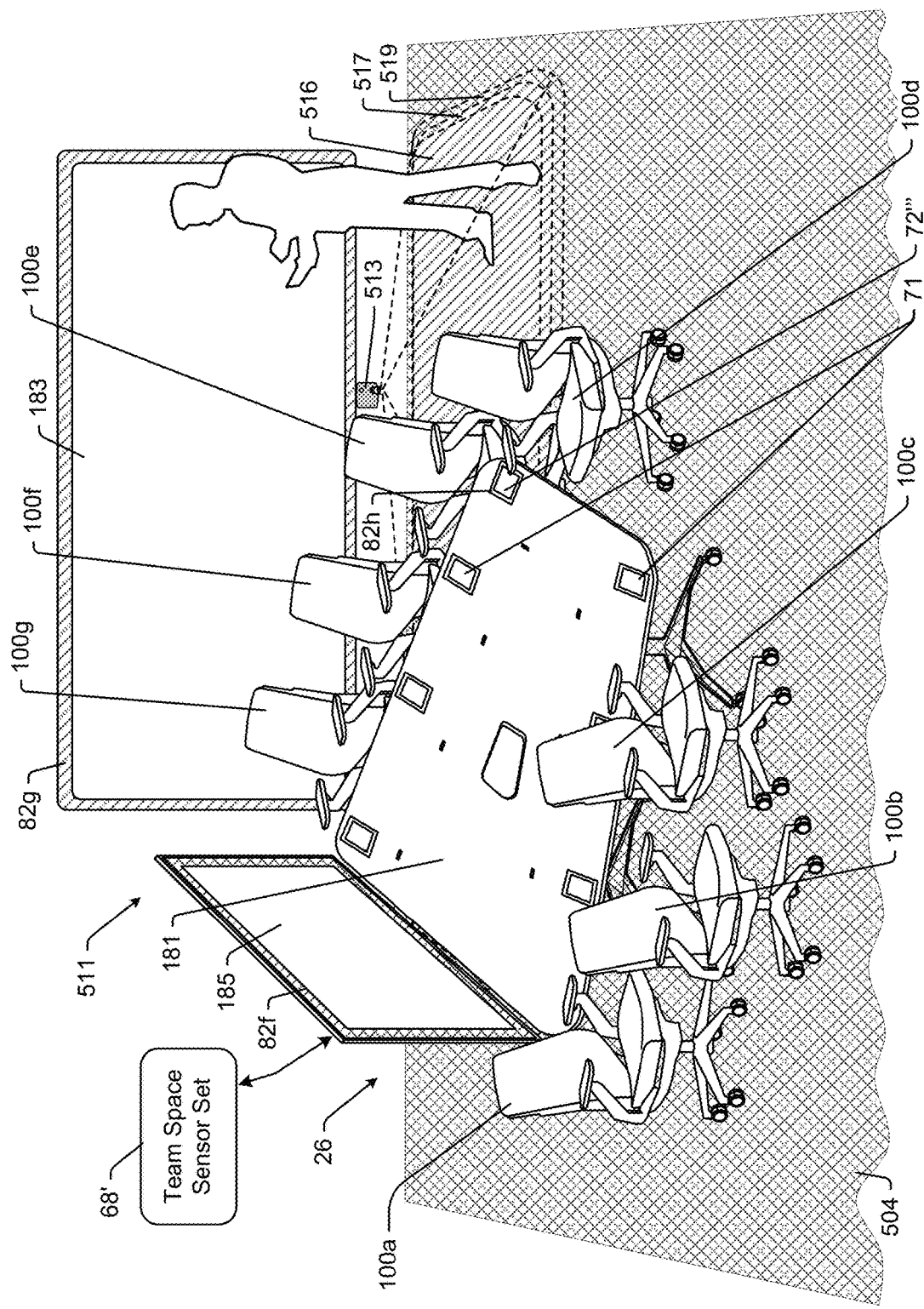
FIG. 36 is similar to FIG. 6, albeit including additional information indicating disparate grants or collection and use states within the conference space.

Referring to FIG. 35, station 24*a* is shown when an employee initially arrives at and is sensed at the station. In the illustrated case, server 14 (see again FIG. 1) uses badge 15 to identify the employee, accesses the employee's existing data grants, and compares the existing grants to the minimum required grant at station 24*a*. Recognizing that the employee's existing grant is more restrictive than the minimum required grant at station 24*a*, server 14 presents a warning via screen 80 including an indication that the station requires an additional grant at 520 and options for responding to the warning including an "Accept Grant" option 522, an "Explore Required Grant" option at 524 and a map option 526 selectable to obtain a map of the facility space that shows a different station that is imbued with a data grant that is consistent with the employee's existing grant. In FIG. 35, frame indicator 82 is shown as red to indicate that currently no data above the Cat-1 grant is being collected at the station. In the present example, a facility map may suggest the location of station 24*b* in FIG. 34 to the employee.

In at least some cases the minimum data grants associated with each affordance configuration may have a temporal limitation. For instance, in some cases a workstation may have a greater minimum data grant during work hours than at times outside those hours. Similarly, a workstation may be imbued with a Cat-1 grant on weekends but a Cat-3 grant on weekdays.

In some cases each affordance configuration may include some type of glanceable indicator that visually indicates a current minimum data grant or grant level to employees in its vicinity. The glanceable indicators may serve as guidance for employees looking for affordance configurations in an employer's facility to use. Here, employees would learn to look for stations, conference spaces or other configurations that are color coded to indicate minimum grant requirements that are consistent with their existing data grants. Thus, for instance, in FIG. 34, in some cases, all workstations in green zone 502 may have green frame indicators 82 when not associated with specific employees to indicate a high minimum data grant for those stations while all stations in zone 512 may have red frame indicators 82 when not associated with specific employees to indicate a low minimum data grant for those stations.

In at least some cases it is contemplated that different affordances within the same space may be imbued with different minimum data grants. For instance, see again to FIG. 6 where frame indicator 82*f* about first common large display screen 185 is shown green and may indicate a minimally restrictive data grant while frame indicator 82*g* about second common large screen 183 is red which may indicate a minimal data grant for data and activities associated with screen 183.

Similarly, in some cases different sub-areas within larger zones may be imbued with or associated with different data grants. For instance, in FIGS. 6 and 34, walls and doorways define a conference space or zone 511 in which table assembly 26 and large common screen 183 are located. Space/zone 511 is further subdivided into two separate sub-zones labelled 504 and 516 where there is no physical barrier between the two zones. As shown in FIGS. 6 and 34, zone 504 is colored green while zone 516 is colored red to indicate different minimum data grants within the two zones. While shown as different colors in FIG. 6, in some embodiments it may be that the zones have no distinguishing color or any type of distinguishing indicia and instead, it may simply be known that any space proximate or immediately adjacent a common display screen is imbued with the same data grant as the grant indicated by the frame indicator circumscribing the proximate display. For instance, in FIG. 6, because frame indicator 82*g* is red, it may be known that the space within 3 feet of display 183 would also be imbued with the red type data grant. Similarly, the space immediately about tabletop 181 may be imbued with the green type data grant associated with the green colored frame indicator 82*f*.

Referring still to FIG. 6, in at least some embodiments, no data other than the Cat-1 type data is collected or used in space 516. Thus, for instance, in at least some cases, any audio data generated by an employee speaking in space 516 would not be recorded or, if recorded, would be cancelled and deleted immediately once it is determined that the audio was received from within zone 516. Here, images from cameras and/or audio picked up from a plurality of microphone sensors in zone 511 may be useable to determine where voice signals emanate from in zone 511 and more specifically if voice signals are being received from in the smaller space 526 so that htos signals could be cancelled.

Similarly, in at least some cases, any video generated by cameras in space 511 may be automatically modified to erase representations of any employee's in space 516 and replace them with default background fill-in representing display 183 and the surrounding wall, albeit without any representation of the content presented on display 183 as display 183 is a Cat-1 display as described above. If an employee in space 516 moves to space 504, all audio and video of the employee may be captured in space 504, stored and used per the green type grant.

In other cases, some type of indicia may be presented on the floor, a ceiling, etc., in space 511 to visually distinguish zone 516 from zone 504 as well as to indicate the different data grants associated with each zone. For instance, in some cases green and red carpet may be located in zones 504 and 516, respectively, to indicate green and red type data grants, respectively. In still other cases a projector or laser light device 513 may be mounted below display 183 or at some other location to project an illuminated border or the like that defines area 516 to distinguish that area from zone 504. The illumination may be color coded to indicate the red type data grant associated with space 516. In still other cases projector 513 may project a double line border with the red color 517 circumscribing space 516 and the green color 519 circumscribing the red color so that an employee looking and the projected double line border can discern that the red type data grant exists in zone 516 and the green type grant exists outside zone 516 in zone 504.

Referring again to FIG. 34, in at least some cases minimal data grant zones may be located throughout an employer's facilities where employees can go to ensure that no more than the required minimal Cat-1 type data is collected. Thus, for instance, if two employees want to have a quick discussion off the record, the employees may simply move to one of the minimal grant zones in their general vicinity and, without any other actions, have a confidential discussion. In FIG. 34 exemplary round minimal grant zones are shown interspersed throughout the facility and are labelled 521*a* through 521*d*. Again, in at least some cases, the minimal grant zones would be clearly and glanceably visually distinguished from other areas in facility 12*a* by a ceiling mounted laser light or projector or, perhaps, by some type of indicia applied to the floor to distinguish zones.

I. Sensor State Indicators

Whether justified or not, many employees may simply be uncomfortable with the notion of any type of sensor sensing an activity or other parameter associated with the employee without the employee knowing that the parameter is being sensed. In at least some cases, this discomfort can be alleviated to some degree by simply indicating, when possible, either when sensors are active or when sensors are obtaining data of certain types. For instance, in the case of a camera, a light indicator may be provided on the camera that can be illuminated when data is being collected. To this end, see again FIG. 2 where a circular light device 530 is shown illuminated green to indicate that data (e.g., video) is currently being obtained via the camera device.

In some cases the sensor indicator may indicate data collection by illuminating green and that no data is currently being collected by illuminating red. Here, a yellow sensor indication may indicate that while data is being collected, the data is not being released for any services or at least is not being used to drive any services other than authorized personal services. In addition, a blue camera indication may indicate that data associated with the camera has been collected and is ready to be released for consumption pursuant to an employee's existing or current data grants.

In other cases, different colors or other visually distinguishing characteristics may be used to indicate some characteristic of the data grant associated with a sensor that is collecting data. For instance, in the case of camera 68*a* in FIG. 2, light device 530 may indicate red, yellow or green to indicate a maximum data grant restriction, an intermediately strong restriction and a minimum data grant restriction, respectively. In still other cases, two different indicators may be presented on the camera, one light or visual indicator to indicate the state of data collection (green, yellow and red to indicate collection and use, collection but not release and no collection, respectively), and a second light or visual indicator to indicate the type of data grant or relative grant restrictiveness associated with the collected data. In this regard, see that camera 68*a* in FIG. 2 has a second light type light device 532 about the first 530 where the second light device has a red color to indicate either collection status or data grant type.

While sensors like a camera are typically situated at locations where they can be visually observed by employees and therefore it makes sense to indicate sensor states via visual indicators on or spatially proximate those types of sensor devices, many other types of sensor devices are not easily viewable and, in fact, may not be viewable by employees from most vantage points. Where a sensor is not easily viewable, providing a visual indicator proximate the sensor makes no sense. Where a sensor is located such that it is difficult to see (e.g., under a workstation tabletop, integrated into a task chair (e.g., a weight or temperature or other biological parameter sensor)), the sensor will be referred to hereinafter as a "hidden sensor" unless indicated otherwise.

In at least some cases, hidden sensor state indicators may be provided at other locations that are within or near the field of view (FOV) of an employee "normally" situated at a workstation or at some other affordance configuration. Here, the term "normally" in the context of a workstation 24 means that the employee is standing or sitting and facing the space over the tabletop 64. In some cases, the hidden sensor indicators may be provided as separate icons integrated into one of the I/O devices or assemblies associated with an affordance configuration. For instance, see again FIG. 2 where motion, weight and temperature sensor indicators are shown integrated into input device 72 at 550, 552 and 554, respectively. Here, each hidden sensor indicator may include a light device located under sensor identifying indicia and the light device may be controllable to generate multicolor light to indicate different sensor states. Again, in some cases active and inactive sensors may be indicated by green and red light, respectively. In other cases yellow light may indicate data collection without immediate distribution.

In FIG. 2, indicators 550 and 554 are shown green to indicate that associated sensors are currently active while indicator 552 is red to indicate that the associated sensor is inactive or currently not sensing an employee's weight. While three sensor device indicators are shown at 550, 552 and 554, in other cases it is contemplated that many other indicators associated with other sensor types may be integrated into interface 72.

In still other cases, instead of indicating states of specific sensor devices or types, indicators integrated into interface 72 may indicate an activation state of different types of services or of specific services. For instance, see in FIG. 2 that three indicators 94, 96 and 98 indicate activation states related health, focus and compass (e.g., a wayfinding or other resource locating service) services. In FIG. 2, the health indicator is shown red and indicators 96 and 98 are shown green to indicate inactivity of the health services and that the focus and compass services are active, respectively. In this case, there may be many different sensors that sense many different parameters and conditions to drive one or several health services and indicator 94 would, in at least some cases, indicate any time one or more health services is active. Similarly, there may be many different sensors that sense many different parameters and conditions to drive one or several focus related services and indicator 96 would, in at least some cases, indicate any time one or more focus related services is active.

In other cases, instead of indicating activation states of specific sensors or service types, indicators integrated into interface 72 may indicate activation states of services associated with specific data consuming entities. For instance, in FIG. 2 "Personal" and "Employer" indicators are shown at 560 and 562, respectively, to indicate when personal services and employer services are active or inactive or other states (e.g. yellow to indicate data collection prior to distribution or use). In FIG. 2, indicators 560 and 562 are shown green and red to indicate active and inactive personal and employer services, respectively.

In FIG. 2, while several types of indicators are shown, in some cases only a small number of indicators may be provided to avoid employee confusion. For instance, in some cases the indicators may be limited to three along the top edge of interface 72. In some cases it is contemplated that an employee may be able to program each indicator to be associated with any sensor type, service type or data consuming entity, or with any other control or event related parameter so that a station can be customized for the specific employee.

Referring yet again to FIG. 2, in addition to indicating sensor, service or other states, each of the indicators (e.g., 94, 96, 98, etc.) integrated into interface 72 may also be operable as an input button to receive control commands from an employee. For instance, in FIG. 2 the focus indicator/button 96 may be selectable to activate and deactivate and perhaps select other states for the focus related services. In this case, for example, during normal operation and pursuant to an employee's data grants, three focus related personal services and one focus related employee service may generally be active and, in that case, focus indicator/button may be illuminated green. If, at some time and because of some situational circumstances, the employee prefers to turn off the focus services, the employee could simply select button 96 to turn off the focus services. In this case, when the services are turned off, indicator 96 would be colored red. As an alternative, a first selection of button 96 may change the focus button color to yellow indicating data collection without use and a second selection may then halt all data collection related to focus services at which point the indicator light would be changed to red. Here, to reactivate the focus services, the employee would simply select button 96 again until the button generates green light.

While described as including integrated mechanical or other type buttons, interface 72 may include a touch sensitive flat panel display screen where different indicator buttons can be presented at different times on the display. Here, an employee could dial up and down the indicator and control button complexity to her preferred settings and the system could automatically adopt to an employee's data grant selections and temporal changes to grants throughout the day. Thus, for instance, where an employee's grant authorizes a health service in the morning but not in the afternoon, a health service indicator and control button may be presented in the morning but not in the afternoon.

Referring still to FIG. 2, in some cases, any of the indicator or control button features described above with respect to interface 72 could be implemented using interface 80. Similarly, any of the indicator or control features could also be implemented via some other type of indicator or control device integrated into station assembly 24 or into chair 100 or any other affordance in the vicinity of station 24.

J. Disparate Employee Grants

When two or more employees are collocated (e.g., located within the same zone) and employees are associated with disparate instantaneous data grants, server 14 needs to be able to sort out appropriate data grants to employ. In at least some cases, server 14 may be programmed to operate differently when collocated employees have disparate instantaneous data grants, depending on whether or not specific services are individual or joint. Here, the term "individual" means that a service is based on data obtained from individual employees and the conclusions and prescriptions are individual in nature while the term "joint" means that a service is based on data obtained from at least two employees and the conclusions and prescriptions are joint in nature. For instance, a fitness related service that provides prescriptive guidance to an employee based on sensed data and a personal goal may be individual while a health tracking service that tracks overall health statistics of an employer's workforce based on sensed data may be joint. Another joint service may track employee activities in a conference space to generate conclusions about how well a team of employees collaborate where data related to all employees on the team is needed to generate quality conclusions and drive prescriptions.

Figure 39:
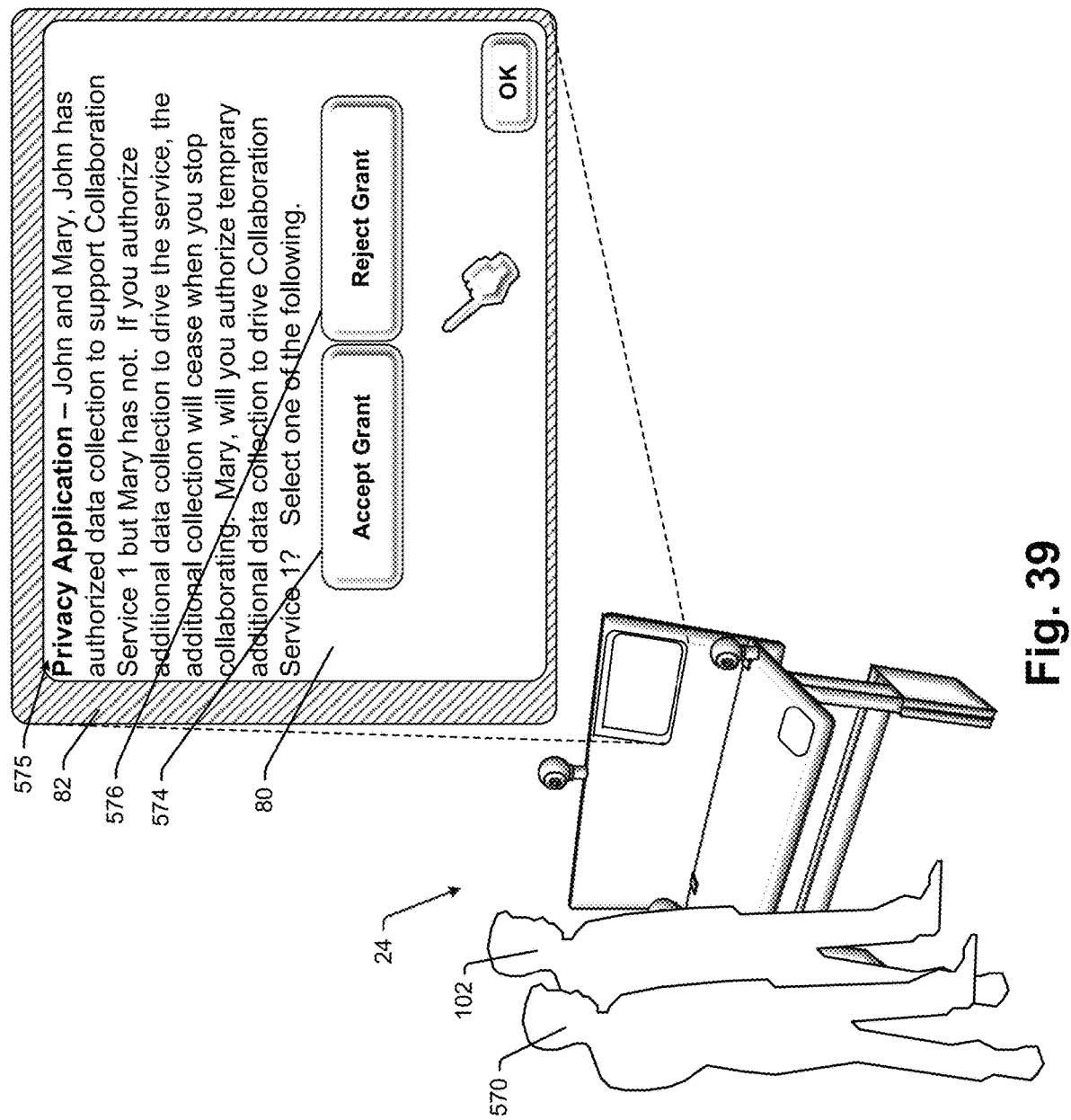
FIG. 39 is a screenshot that may be presented when two employees are collocated at a workstation where the employees are associated with disparate instantaneous data grants.

In the case of an individual service (e.g., a service that only requires individual employee data), server 14 may perform any of several processes when collocated employees have disparate instantaneous grants. For instance, in FIG. 39, if a first employee 102 is associated with station 24 and is currently operating under a Cat-5 data grant (e.g., a full data collection grant to support any service by any data consuming entity including the employer, service providers and third parties) when a second employee 570 arrives at station 24 and is currently operating under a Cat-1 data grant (e.g., minimal data collection and use required for basic services like security), where server 14 can use camera images or information collected by other sensor devices to accurately distinguish the first and second employees, server 14 may be programmed to collect Cat-5 and Cat-1 type data from the first and second employees pursuant to their respective data grants.

In other cases, when the second employee is identified at station 24 with the first employee and server 14 determines that the second employee's data grant is more restrictive than the first employee's instantaneous data grant, server 14 may be programmed to always revert to the more restrictive data grant at the station for both the first and second employees.

In any case, if server 14 is unable to confidently (e.g., with a confidence factor that exceeds some threshold level (e.g., 95% probability)) identify an employee in a zone and therefore cannot confidently identify the employee's instantaneous data grant, server 14 may revert to the most restrictive data grant available (e.g., the Cat-1 grant) to avoid collecting or using data that is inconsistent with the employee's instantaneous grant.

In still other cases, when the second employee arrives at station 24 after the first employee is associated with the station, server 14 may simply ignore the second employee and continue to associate the station data sensing and services with the first employee. In this case, server 14 may continue using cameras and other sensors to track the first employee at station 24 and may generate a confidence factor for the tracking results which indicates probability that the tracked first employee is the first employee. Here, if the first employee tracking confidence factor dips below a threshold level (e.g., 95% probability), server 14 may revert to a Cat-1 type operation until the employee identity can be more accurately substantiated through sensed data or some action by the first employee.

In the case of joint services (e.g., services requiring data associated with at least first and second employees, e.g., services that track employee collaboration, group projects, joint work product development, etc.), in at least some cases when collocated employees have disparate grants, server 14 may simply default to a most restrictive instantaneous grant associated with any of the collocated employees to avoid obtaining any unauthorized data or using any data to drive unauthorized services. Again, where server 14 cannot determine an instantaneous grant for at least one of the collocated employees with certainty that meets a threshold confidence factor, server 14 may simply revert to a Cat-1 grant.

In at least some joint service cases where collocated employees have disparate instantaneous data grants, server 14 may indicate the disparate grants to one or both of the employees and seek an optimal temporary supplemental grant from at least one of the employees. Thus, see for instance in FIG. 39 that server 14 presents a supplemental data grant request 575 and response option buttons including an "Accept Grant" button 574 and a "Reject Grant" button 576. Where the employee with the more restrictive data grant accepts the supplemental grant, server 14 starts operating per the supplemental grant.

In some cases, the supplemental grant may only persist in a current zone and while the employees remain collocated in the zone. For instance, assume first and second employees are collocated in a station zone 580 that includes statin 24a as shown in FIG. 34 when they accept a temporary supplemental data grant to support a collaboration service. In this case, if one of the first and second employees leaves zone 580 even instantaneously, the supplemental grant may be cancelled. In other cases when one of the employees leaves zone 580, a time out clock may start to time out a short period (e.g., 1 minute) and, if the employee returns to zone 580 prior to the time out clock period expiring, the supplemental grant may persist.

In other cases, after a supplemental data grant to support a collaboration service is authorized, the grant may persist as long as server 14 recognizes or discerns that the first and second employees continue to collaborate with a certainty beyond some threshold level. For instance, once the supplemental grant is authorizes at station 24*a* in FIG. 34, as long as the first and second employees remain proximate each other and communicate with each other in a way that is perceived by server 14 to be collaboration, even if the employees move from zone 580 into a conference room zone at 511, the supplemental grant may persist.

K. I/O Badge

In at least some embodiments it is contemplated that employees will move about routinely within an employer's facilities and, in many cases, it will be difficult to present I/O devices at many facility locations for indicating data grant or data collection and use states to specific employees or to receive grant control input from specific employees at those locations. For instance, if a first employee is located in a cafeteria with 200 other employees, providing 201 separate I/O devices or even a smaller set that can uniquely communicate with each of the 201 employees in the cafeteria would be difficult at best. One solution to the common area data grant I/O problem is to provide more complex ID badge devices to each employee.

Figure 38:
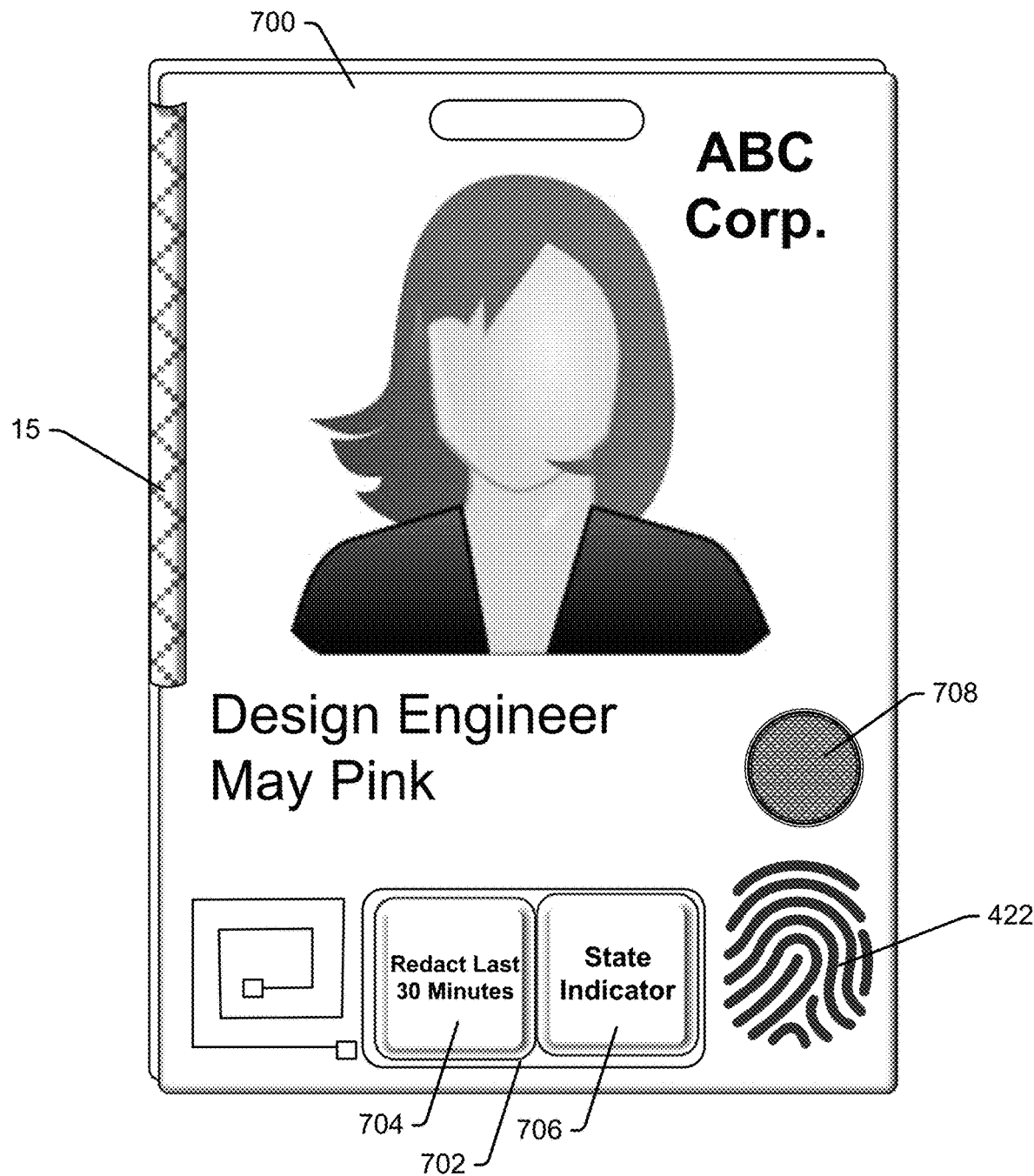
FIG. 38 is a plan view of an employee ID badge that is consistent with at least some aspects of the present disclosure.

Referring to FIG. 38, an exemplary I/O badge 700 is illustrated that includes, in addition to the other components described above with respect to badge 15, a simple I/O interface 702. Exemplary interface 702 includes two simple buttons including a retroactive redaction button 704 and a state indicator button 706. As in the case of the workstation interface described above, redaction button 704 may be selected to redact the last 30 minutes of data collected by server 14 that is related to the employee associated with the badge 700. Thus, for example, if the employee does not want a most recent 30 minute conversation or any other data related thereto to be persistently recorded or otherwise used to drive any services, the employee can simply select button 704 to delete all data related to that employee. In at least some cases button 704 will include an associated light device under the contact surface of the button and/or the badge 700 may include an audio device like a speaker 708 to generate a confirming signal when data has been redacted.

State indicator button 706 may also include a multi-color light device under the contact surface of the button that is controllable to indicate several different data collection and use states. For instance, consistent with the above description of collection and use states, button 706 may be illuminated red when no data in addition to the Cat-1 data related to the employee is being collected, yellow when data is being collected but not distributed to drive any services or, in some cases, to drive non-employee services, green to indicate that data associated with the employee is being collected and used to drive services (e.g., drive services consistent with the employee's instantaneous data grant) and blue when collected data is ready to be released to drive services.

While indicator 706 may simply indicate instantaneous data collection and use state in some cases, in other cases button 706 will be selectable to change data collection and use state. For instance, where indicator 706 is currently green (e.g., data is being collected and is driving services), the employee may select button 706 once to deactivate employee related data collection and use causing button 706 to turn red. A second button 706 selection may cause the button to turn yellow and may cause server 14 to continue completely confidential data collection, only releasing the collected data upon some affirmative command from the employee to do so at a later time.

In at least some cases buttons 704 and 706 may not be illuminated most off the time to conserve battery power. Thus, for instance, with the light devices associated with buttons 704 and 706 off initially, a first tap on interface 702 may cause the light devices in buttons 704 and 706 to wake up and illuminate to indicate a current state. For instance, button 704 may wake up and present green light inviting selection while button 706 would light up with the color associated with a current data collection and use state. In at least some embodiments, as an employee moves about in a facility, any time the data collection and use state changes (e.g., the employee moves from one zone to another where the use state is different between the two zones), state indicator 706 and/or speaker 708 may generate a warning signal of some type to indicate the state change. Here, button 706 may pulse light on and off for 20 seconds indicating the color of the new collection and use state in the new zone.

While only two buttons 704 and 706 are shown in FIG. 38, it should be appreciated that other grant and state indicating and control buttons are contemplated and therefore badge 700 should not be limited to including only two buttons or to the types of buttons provided. Thus, for instance, another button may be related to health services for indicating when data to support those services is being collected and/or used and to control turning those services and data collection related thereto on and off. Another button may indicate and be useable to control the states of employer services, third party services, etc.

In many cases an employee or a set of employees that operate as a group will not want to be too granular on data grant rights and instead will prefer a set of predefined and simplified options. For example, in a simple case, a project group including six employees may, at times, prefer unfettered data collection, recording and use of team session data and at other times, may prefer no data collection or use and there may be no interest in fine tuning some intermediate group data grant based on specific instantaneous circumstances. In this case, options for unfettered data collection and use and no data collection and use may be presented to one, all, a first arriving, etc., meeting attendee in a space. In other cases the pre-canned grant right options may include three, four or more options with some associated with intermediate type grant restrictions.

Referring again to FIG. 40, an exemplary configuration 850 includes an I/O interface (e.g., one labelled 814) at each of several user stations 802*a* through 802*f* about the edge of a tabletop assembly 800. Exemplary interface 814 includes a touch sensitive high definition emissive surface on which many different types of user selectable virtual control buttons can be presented. To support a privacy and data grant system, in at least some embodiments an instantaneous data grant options field 820 is presented that includes, in the illustrated example, three options including an "Unfettered" option, a "Partial" option and a "None" option 826, 828 and 830, respectively. Here, to allow unfettered collection of data in the conference space associated with configuration 850, a session attendee selects the unfettered option 826. To turn off all sensors in the conference space, an attendee selects none option 830. To select a predefined intermediately restricted data grant, an attendee selects the partial option 828. In at least some embodiments it is contemplated that employees will already have a sense of the grants associated with the unfettered and the partial options and therefore no explanation will be required. In other cases it is envisioned that interface 814 may present some option allowing an attendee to view grants associated with each of options 826 and 828. None option 830 may be associated with the minimal data grant described above.

In some cases the data grant options 820 may be presented persistently and the selected grant option may be visually distinguished from the other options in some manner (e.g., via a different color light device). In this case, an attendee may change the instantaneous data grant for a session by selecting one of the unselected options. In other cases, the grant option tools 820 may only be presented at the beginning of a session and, once selected by any attendee, may be set for the session unless some other tool (e.g., a pre-emptive or retroactive redaction tool) is used to change the grant. In some cases, the first attendee to arrive in a conference space may be presented with the data grant options and may be required to select one of the options for other session affordances provided in the space to be enabled (e.g., electronic whiteboards, common emissive surface display screens, projectors, other I/O devices, etc.

In some cases the user station interfaces may also present a redaction options tool for pre-emptively disabling data collection and use or for erasing previously collected data, conclusions, prescriptions, etc. either on a group basis or on a personal basis. The exemplary FIG. 40 interface 814 includes a redaction tool set at 822 that includes separate redaction options for personal data 823 and group data 824. The personal data redaction options include a pre-emptive 30 minute option and a retrospective 30 minute option 832 and 834, respectively and the group data redaction options include a pre-emptive 30 minute option and a retrospective 30 minute option 836 and 838, respectively. Here, if a user redacts personal data in a group setting, any data in addition to the data authorized by the minimal required data grant related to that user during the redaction period is effectively erased from all records. Similarly, redaction of group data will erase all group data collected during an erase period. In some cases it is contemplated that several or at least two attendees may have to select redaction options to redact group data to require consensus among at least two group members. Many other redaction options are contemplated such as redacting an entire session data set, redacting specific data such as data presented on a specific common display screen in a conference space, etc.

In at least some cases it is contemplated that instantaneous data grants may be controlled by employees in other ways. To this end, it has been recognized that in at least some cases employees operating in an enterprise space may be in circumstances where access to a touch type or mechanical user interfaces for controlling data grants is simply not possible. In other cases it may be that a system designer simply wants users to be able to control data grants without physically contacting a stationary interface for some reason. For example, in some cases it may be useful if any employee in an enterprise space can control her data grant or a relevant group data grant from any location within an enterprise space. In at least these cases it is contemplated that other user interface types may be supported in enterprise space where a user does not actually need to touch the interface to communicate commands.

In some embodiments a user may be able to annunciate grant control words or phrases to dial the restrictiveness of instantaneous data grants up and down and to control data redaction options. For example, referring again to FIG. 40, in some cases it is contemplated that microphones 860 throughout an enterprise space may persistently track user voice signals searching for specific known command words for controlling data grants. In at least some cases, the system may include a set of microphones 860 and perhaps other sensor devices like one or more area cameras 810 where sensed voice and other data is useable to discern the location of a specific person in space that utters grant control commands. For example, where there are five people located in a conference space, microphone signal triangulation may be combined with images from one or more conference space cameras 810 to discern which of the five persons in the space utters a data grant command. Here, if the command relates to a personal data grant, the command may be used by the system to initiate a personal data grant restriction or loosening. On the other hand, if the command relates to a group data grant, the command may be used by the system to initiate a group data grant restriction or loosening.

Thus, in at least some embodiments the system server may implement a process whereby the server receives microphone signals from within each of several different enterprise spaces, uses the received signals to identify data grant commands and when a command is identified, uses voice signals associated with the data grant command to triangulate the command to a specific location and hence person within the space. Once the person that uttered a command is located, the system server may associate the person's identity from some other system with the command and then apply the command to a data grant associated with the identified person. In the alternative, the system may use camera images to identify the employee that made the gesture via face recognition, a movement signature (e.g., walking characteristics, posture characteristics, etc.) that uniquely identify a specific employee, etc. In these cases a separate commissioning procedure may be needed to associated employee biometrics with specific employee identities as well known in the biometric sensing arts.

In still other cases it is contemplated that hand, arm or other gestures may be used to generate data grant commands. To this end, see yet again FIG. 40 where a user 870 is shown holding his arms and hands up in the air generally within the field of view of camera 810. Here, the arms and hands up gesture itself may be sufficient to generate a data grant disable command. Many other stationary and dynamic gestures are contemplated for controlling many aspects of an instantaneous data grant.

In cases where non-touch data grant commands are generated by an employee, in at least some cases some type of visual, audio or haptic feedback may be provided to confirm that a command has been received and implemented. For instance, in FIG. 40, when employee 870 holds his hands up to disable a current data grant, a confirmation notice (e.g., "The system has stopped collecting data related to Mary Pink") may be presented via one of the emissive surfaces 880 or 890 in the user's space as shown at 817 and 816, respectively.

In other cases data grant command feedback may be provided acoustically. For instance, a speaker 900 may generate some audible confirmation signal (e.g., a beep, a ding, a quack, etc.) when a data grant has been controlled in some fashion. As another instance, area speakers 900 may be controlled to generate voice signals indicating grant modifications and specifying for whom those modifications apply individually or via group names.

As one other instance, in at least some cases at least some speakers in an enterprise space may include directional speakers that are able to direct sound along narrow paths toward persons in the space so that audio messages can be provided to specific persons in the space as opposed to generally broadcast. To this end, several companies have developed ultrasonic directional speakers capable of transmitting sound to specific locations within space. For instance, once such speaker is the Sennheiser Audiobeam from Sennheiser Electronic GmbH & Co. Instead of generating ordinary audible sound waves with a single moving electromagnetic coil and cone, ultrasonic directional speakers generate ultrasound (high-frequency sound waves) that is too high pitched for our ears to hear using an array of electrical devices called piezoelectric transducers. The transducers are simply crystals, such as quartz, that vibrate back and forth tens of thousands of times a second when you feed electric currents through them, producing very high frequencies of sound. Ultrasound is used because its higher-frequency waves have a correspondingly shorter wavelength and diffract (spread out) less as they travel, which means they stay together in a beam for longer than ordinary sound waves. Also, having an array of many, small transducers makes sound diffract less than it would do from a single, large transducer. The ultrasound travels out from a directional speaker in a narrowly focused column, like a flashlight beam. When the ultrasound waves hit something, they turn back into ordinary sound you can hear.

In the contemplated system, cameras or other sensing devices in a space again detect locations of persons in that space and the system server determines the identities of those space occupants. In addition, the cameras or other sensing devices capture data useable by the server to identify data grant control gestures and, when a gesture is identified, the server carries out the command associated with the gesture for the specific person that made the gesture. Moreover, to confirm that the command has been processed, the server generates a directional audio message via the directional speakers 900 which is transmitted along a narrow beam toward the head of the person that made the gesture. Here, the volume of the directional audio message can be low so that the confirming message is perceived as a sort of quiet whisper by the person receiving the message. To this end, see the exemplary directional beams shown at 902 in FIG. 40.

In at least some embodiments it is contemplated that some zones or enterprise spaces will be clearly dubbed non-private or unfettered data grant zones so that anyone working or occupying that zone will have a clear understanding that all possible collectable data will be obtained in that zone and used to drive any service implemented by the system. Thus, for instance, in many cases conference spaces or common areas like a cafeteria where employees already have a lowered expectation of privacy may be marked non-private areas where an employee has no ability to personally restrict data collection and use. Here, non-private areas may be marked with signage, by decorating in a visually distinguished manner (e.g., a different color flooring material, different color walls, etc.), or may be audibly called out in some fashion (e.g., an ultrasonic directional speaker generated audio message, a beep on a badge, etc.) as a person enters that space.

While the above disclosure is described in the context of an enterprise or employer office space or facility, in at least some embodiments it is contemplated that the data grant system will have implications beyond space controlled by an employer as many employees spend much of their time working in non-employer spaces such as home offices, at customer sites, in common areas such as a coffee house or a library, etc. In many cases, despite being located outside an employer's facilities, employee data will still be collectable via portable sensor devices and computing devices that the employee carries along with her. For instance, wearable (e.g., watch, bade, ring, etc.) sensing devices may collect data and report that data back to the system server either in real time or in batch at some later time when an employee is located proximate a system affordance like a personal workstation, conference space, or some of the configuration that includes near field wireless communication capabilities. As another instance, an employee's laptop or other computing device will often include a built in bezel based camera or other sensor devices (e.g., a sensor in a keyboard or the like) which may remotely capture images or other data related to the employee which can then be provided to the system server. Here, all data collection and use from portable user device based sensors may be subjected to authorized data grants.

In still other cases when an employee is remote from employer facilities, employee data may still be collected via sensing devices installed in other environments that the employee occupies from time to time. For instance, in some cases it is contemplated that an employer may provide home based workstations for at least some of its employees and in that case a complete host of sensing devices akin to those described above with respect to FIGS. 2 and 3 may be provided at an employee's home workstation where the station is linked via the internet or some other communication network to a remote system server. Similarly, where an employee temporarily works at a customer site, the employee may temporarily use a sensored workstation at that site and her data may be collected and transmitted back to the system server to be used as described above. In each of these cases any of the data grant control options described above may be implemented.

In some cases it is contemplated that user worn or otherwise carried devices may generate at least some data that, while not sufficient to drive a specific service, may generate at least a subset of required data to drive a service and that data may be combined with other data from enterprise installed sensor devices or other installed devices (e.g., at a user's personal home workstation) to drive a service. In some cases where data to drive an authorized service is missing for some reason such as a user not wearing a sensing wearable device, the system may present a notice or warning to a user indicating that some data is missing.

While user interfaces are described above in the context of interfaces generally integrated into enterprise space affordances or badges, in other embodiments it is contemplated that similar interfaces may be provided via portable user computer devices. While there are advantages associated with interfaces integrated into or coupled directly to space affordances (e.g., a workstation, a conference table, etc.), portable user devices like a laptop, a smart phone, a tablet type computing device, etc., also present viable interface options which would operate in a manner similar to that described above for specifying data grants, changing data grants, providing indications of instantaneous data grants and changes to those grants based on location, time, or any other parameters.

While the redaction concept described above is generally described as one in which a person can redact data related to a relatively short period of immediately preceding time, in other embodiments it is contemplated that an employee may have access to tools that enable the employee to redact data corresponding to any prior period and any duration of period. For instance, while data is being collected during a first period of space occupancy by a first employee, the first employee may be preoccupied with some activity such that she simply does not contemplate data collection and use or instantaneous grant rights. Here, the first employee may only contemplate grant rights some time (e.g., several days) after some type of objectionable data collection and should be able to go back in time to collected data during the first period to redact the first period data without having to delete all data associated with that employee. In this case, the system may allow the employee to access all collected data and even conclusions and prescriptions based on that data during the first period to assess whether or not that data should be deleted.

In still other cases it is contemplated that retroactive redaction periods may be longer (e.g., for an entire day) and may even cover all data collected prior to a time for a specific employee (e.g., all data prior to a current time). In any case where data is retroactively redacted, at least some data which has been rendered anonymous or which has been combined with other data for other employees such that it cannot be unscrambled from the resulting data may still persist within the overall system.

In still other cases other forms of data redaction are contemplated. For instance, in some cases redaction may simply mean that a user's identity is removed from previously collected data or is not associated with data collected during some period (e.g., 30 minutes) of future data collection. In this case an anonymous form of collected employee data may still be maintained.

In some embodiments it is contemplated that a system may learn a user's data grant preferences over time and may automatically adapt to grant changes or may suggest changes to an employee's data grant based on prior employee interaction with the system. For instance, if a first employee retroactively redacts all data related to meetings with a specific second employee after every meeting with that second employee for some threshold number of meetings (e.g., 4), the system may automatically cease data collection for the first employee every time the first employee has a meeting with the second employee. In the alternative, once a threshold number of consistent or at least semi-consistent data grant modifications given a specific set of circumstances occurs, the system may automatically query an associated employee for authorization to modify the employee's data grant whenever the specific circumstance set occurs in the future. As another alternative, a notice of grant modification may be presented to an employee and the modification may be automatically implemented unless the employee objects or rejects the modification within some time period. Many other automatic grant modifications or queries to modify grants are contemplated.

In at least some cases automatic grant modifications based on a preference learning process may be restricted to modifications which increase the restrictiveness of an employee's data grant as opposed to ones which allow additional data collection and use. Where a grant modification increases data collection and use rights authorization via a notice and affirmative acceptance may be required whereas modifications that further restrict collection and data use may be implemented after a simple notice without rejection.

In at least some embodiments at least a portion of the data grant database may be integrated into or linked to and associated with an active directory or some type of lightweight directory access protocol (LDAP) so that employee data grants are provided in that type of data construct and accessible via other system applications independent of the privacy control system described above. In addition, the privacy system described here may be linked to other application programs to obtain other employee information and to control access to any of that information in a wholly integrated fashion. For instance, employee scheduling software that may expose user locations, schedule activities, etc., may be controlled by the user's overall data grant in an integrated fashion as opposed to independently where the privacy system described herein controls access to the employee's schedule information. As another instance, any other information tracked and maintained by any other system software or application program that relates to a specific employee may be controlled by the privacy system so that employee data grants are unified throughout an entire enterprise.

Figure 41:
FIG. 41 is a screen shot similar to the screen shot shown in FIG. 21, albeit for accessing conclusions, prescriptions and data associated with any prior period during which data is obtained for a specific employee.

In at least some of the commissioning systems described above, an employee is provided with a view of collected data, conclusions and prescriptions associated with at least some commissioning period of time. For example, see FIG. 22 where data processing results including conclusions and prescriptions for a four week commissioning procedure are presented and where an employee has the ability to drill down deeper into detailed data used to drive the conclusions and prescriptions. In at least some cases it is contemplated that the system server may provide tools that allow any employee to access any data set, conclusions and prescriptions associated with the employee or with groups of employees that the employee belongs to over any range of time for which data has been collected and used. To this end, see FIG. 41 where a screen shot 920 akin to the view shown in FIG. 21 is illustrated to enable employee access to any associated data. Screen shot 920 includes instructions 922 for accessing data, conclusions and prescriptions, a date field 926 for specifying a period over which data, conclusions and prescriptions should be accessed and a data sub-set selection tool 924 akin to the tool shown in FIG. 21 for specifying a sub-set of information sought by an employee. Here, once a date range is entered and after an employee selects a sub-set of information to access and submits those selections, the system server would generate a data access tool similar to that shown in FIG. 22 where the employee can see conclusions and prescriptions are well as drill down into the supporting data for those conclusions and prescriptions. As in the FIG. 22 screen shot, here, the system may also present confidence factors for each of the conclusions and prescriptions as well as offer advice on how the confidence factor values can be increased by authorizing less restrictive data grants.

In still other cases it is contemplated that tools like the data, conclusions and prescriptions access tools described above may be available for accessing data, conclusions and prescriptions for groups of employees or even for an entire set of employees that work for a specific employer. Here, a group of employees may include a set of employees that work together on a project, a set of employees that work in a specific department (e.g., engineering, accounting, finance, etc.) of a company, a set of employees that have the same job title, a set of employees that work a specific shift, a set of employees having some other common characteristic like age, skill set, perspective (e.g., anthropologist, etc.), etc. In these cases the data, conclusions and prescriptions access tools may require other user input to specify a specific group.

In some of the systems described above it is contemplated that the system server may run behind the scenes personal services that have not been authorized by an employee and where the conclusions and prescriptions are maintained completely confidential to identify conclusion and prescriptions that may be of particular interest to a specific employee and that the system may then offer those conclusions and prescriptions to the employee for consideration and as a way to suggest the value of a less restrictive data grant. In at least some cases it is contemplated that behind the scenes and unauthorized services may similarly be performed for employers to generate anonymous conclusions and prescriptions to present to the employer for consideration. Thus, for instance, where an employer has not implemented a focus tracking service to track employee focus characteristics but where employee authorized data collection could support a focus tracking service, the system server may run the focus tracking service behind the scenes on anonymous user collected data to generate conclusions and prescriptions and, either all conclusions and prescriptions could be presented to the employer or, whenever, a particularly odd or interesting conclusions or prescription is generated (e.g., one that is different than optimal or ideal or within some threshold of optimal), those could be presented to the employer. Here, if the conclusions and prescriptions generated by the behind the scenes service are interesting to the employer, the system could provide an ability for the employer to seek authorization for an additional data grant from employees to drive the focus tracking service.

In at least some embodiments where an employee or a system administrator reviews conclusions and prescriptions associated with any of an employee, a group of employees or an entire entity workforce, the employee or administrator may review the conclusions and prescriptions and the data used to generate those conclusions and prescriptions and may simply not agree with one or more conclusions and prescriptions. In these cases, it is contemplated that an employee may be able to reject a conclusion or prescription and that the act of rejecting the conclusion or prescription may cause the system server to automatically adjust or, in effect, to learn and change over time. For instance, if a first employee rejects a first conclusion, the rejection may be used to automatically change an algorithm used to generate the conclusion for at least the first employee so that the same conclusion is not generated when a similar set of data associated with the first employee is obtained at a subsequent time.

In still other cases where there are only a handful of conclusions or prescriptions that may be generated by an algorithm, when an employee rejects a conclusion or prescription, the system may automatically present the full set of possible conclusions or prescriptions to the employee and allow the employee to select a different one of the options. Here, the system may change the underlying algorithm as a function of the user's selected option so that the algorithm becomes smarter over time about the specific employee and what is being sensed.

In still other cases persistent algorithm changes based on employee perspective may only tee up possible changes for a system administrator to consider and, only after the independent administrator affirms a change, may the change be made. In some cases an algorithm change may only be made if a threshold number of employees rejects a conclusion or prescription in favor of some other common conclusion or prescription. Thus, for instance if ten employees reject a conclusion or prescription in favor of another, the system may automatically change to present the favored conclusion or prescription instead of the rejected one.

While the invention may be susceptible to various modifications and alternative forms, specific embodiments have been shown by way of example in the drawings and have been described in detail herein. However, it should be understood that the invention is not intended to be limited to the particular forms disclosed. For example, while dedicated I/O that is integrated into affordance configurations is optimal in many cases, portable personal devices like smart phones, tablets, laptops, wearable devices (e.g., badges, glasses, wrist devices, etc.) are also contemplated in at least some embodiments.

In at least some cases it is contemplated that certain employees may, in effect, crate a "cone of silence" about themselves at any or at least a subset of locations within an employer's facilities. For instance, in the above examples, where an employee opts for the Cat-1 minimal data grant, in some cases, wherever that employee is located, no data greater than the minimum Cat-1 grant would be collected or used for any service. In some cases there may be a minimum required grant is specific facility zones that is incompatible with the Cat-1 grant and, in those cases, the employee with the Cat-1 grant would either have to accept the less restrictive grant or not operate in the zone having the less restrictive minimum grant. Here, the less restrictive grant likely would be linked to some specific employer or service provider goal and would be calculated, based on the circumstances, to be reasonable or minimally objectionable. For instance, an employer may invest heavily in optimized conference spaces and may want the ability to track all activities and all data in each of those spaces in order to develop new ideas on spurring collaboration, innovation, etc. In this case, the goals are group related and therefore the conclusions and prescriptions would not be individual and likely would be less objectionable by individual employees.

In at least some embodiments it is contemplated that all data collected and all conclusions and prescriptions based on the collected data for an individual may be maintained confidential until that employee performs some affirmative activity to release that data. Thus, for instance, all data, conclusions and prescriptions based on a first employee's data may be maintained confidential and the employee may be asked to release that information at the end of each work day, each week, etc. Here, the first employee may be authorized to delete all of the information at the end of the period or may be able to select specific data, conclusions or prescriptions to delete. Where any data is deleted, the system may automatically adjust confidence factors in the other data, conclusions and prescriptions.

In some cases algorithms associated with services may be robust when based on data from less than all employees in a facility or base on less than all data associated with at least a sub-set of employees. For instance, in some cases an algorithm may prove to be accurate when data is obtained from at least 40% of all employees such that conclusions and prescriptions simply do not get more accurate as more data of the same types is obtained from more employees. In this case, in at least some embodiments, server 14 may be programmed to stop seeking data grants from employees for data types where more data simply does not increase the value of the results. Thus, in the above example, once 40% of employees grant access and use to the data for the algorithm, server 14 may not ask for the grant from other employees or the server may stop asking at 60% employee authorization.

Where server 14 can determine that more data of some type is not required to increase accuracy or correctness of service results, in at least some cases, the server 14 may limit the data used to generate results to a minimum amount even if a substantially larger amount of data is collected and available. In this way, the possibility of objection to data use by specific employees is minimized as data from fewer employees is relied upon.

Thus, the invention is to cover all modifications, equivalents, and alternatives falling within the spirit and scope of the invention as defined by the following appended claims. To apprise the public of the scope of this invention, the following claims are made:

What is claimed is:

1. A method of controlling data collection and use, the method for use with at least a first sensor located within an employer facility designed to sense at least a first parameter associated with at least a first employee and an interface device, the method comprising the steps of:
continuously receiving data values from the at least first sensor;
presenting a data hold option via the interface selectable to store the received data values in a temporary private database that is inaccessible by at least one application program, and upon selection of the data hold option by the first employee:
tracking time since the selection of the data hold option and storing the received data values in the temporary private database;
presenting at least a first redaction option via the interface selectable to render at least a first data subset of the received data values stored in the temporary database permanently inaccessible to the at least one application program;
upon selection of the first redaction option by the first employee, rendering the at least first data subset of the received data values stored in the temporary private database permanently inaccessible to the at least one application program; and
upon the tracked time since the selection of the data hold option reaching a threshold period without selection of the first redaction option by the first employee, releasing the stored data values for use by the at least first application program.

2. The method of claim 1 wherein the at least a first application program includes employer application programs and wherein the method further includes the steps of, prior to the threshold time for stored data values, providing the stored data values to at least a second application program, the second application program providing a service to an employee of the employer.

3. The method of claim 1 wherein the step of storing the received data values in a temporary private database includes storing the values in a database that is inaccessible by any employer application program other than required employer application programs.

4. The method of claim 3 wherein the step of storing the received data values in a temporary private database includes storing the values in a database that is inaccessible by any service provider application programs or third party application programs.

5. The method of claim 1 wherein the step of presenting at least a first redaction option via the interface includes presenting at least a first redaction option to delete one of a specific type of data, data related to a specific application type and data related to a specific consumer of collected data.

6. The method of claim 5 wherein the step of presenting at least a first redaction option via the interface includes presenting a plurality of redaction options, each redaction option related to at least one of a specific type of data, data related to a specific application type and data related to a specific consumer of collected data.

7. The method of claim 1 wherein the step of presenting at least a first redaction option includes presenting an option to redact stored data values for a prior first period duration and wherein, upon selection of the first redaction option, data values collected within the first period duration are deleted from the temporary database.

8. The method of claim 7 wherein the step of presenting at least a first redaction option includes presenting at least a second option to redact stored data values for a prior second period duration and wherein, upon selection of the second redaction option, data values collected within the second period are deleted from the temporary database.

9. The method of claim 1 wherein the step of presenting at least a first redaction option via the interface includes presenting at least a first redaction option on a wearable employee badge.

10. The method of claim 1 further including the steps of, upon selection of the at least a first redaction option, presenting an indication via the interface that the first data subset has been rendered inaccessible by the at least a first application program.

11. The method of claim 1 wherein the step of releasing the stored data values includes periodically releasing the data values in batch at staged intervals.

12. The method of claim 1 wherein the interface device includes a touch sensitive display screen integrated into a workstation and wherein the at least a first redaction option includes a first selectable virtual button.

13. The method of claim 12 wherein, upon selection of the first virtual button, the appearance of the first virtual button is modified to indicate selection of that button.

14. The method of claim 1 wherein the interface device is integrated into an affordance within the employer's facility, the method further including the step of, when an employee selects the at least a first redaction option, identifying the employee that selected the first redaction option, the step of rendering the at least a first data subset stored in the temporary database permanently inaccessible including rendering the at least a first data subset stored in the temporary database that is associated with the identified employee permanently inaccessible.

15. The method of claim 14 wherein the interface device is integrated into an affordance that is located in a public space within the employer's facility.

16. A method of controlling data collection and use, the method for use with at least a first sensor located within an employer facility designed to sense at least a first parameter associated with at least a first employee and an interface device, the method comprising the steps of:
integrating an interface device into a facility affordance wherein the interface device includes at least an employee selectable redaction option selectable to redact at least a portion of a data rights grant, the data rights grant defining at least one of a data collection, data storage, and data use rule driving a data collection program, and to render at least a first application program inoperable for a first time period;
continuously receiving data values from the at least first sensor;
presenting a data hold option via the interface selectable to store the received data values in a temporary private database that is inaccessible by the at least first application program, and upon selection of the data hold option by the first employee:
tracking time since the selection of the data hold option and storing the received data values in the temporary private database;
upon selection of the first redaction option by the first employee; rendering the at least first data subset of the received data values stored in the temporary private database inaccessible to the at least one application program; and upon the tracked time since the selection of the data hold option reaching a threshold period without selection of the first redaction option by the first employee, releasing the stored received data values for use by the at least first application program.

17. The method of claim 16 wherein the step of rendering the at least a first application program inoperable includes ceasing to receive the data values from the at least a first sensor.

18. A system for controlling data collection and use, the system for use with at least a first sensor device for sensing at least a first characteristic associated with an employee, the system comprising:

a temporary private database that is inaccessible by at least one application program;

an interface that presents a a data hold option, and a data redaction option; and a processor linked to the temporary private database and to the interface for receiving data hold and redaction commands and linked to the at least first sensor device, the processor programmed to:

receive data values from the at least one sensor;

monitor the interface for a command for the data hold option to store the received data values in the temporary private database;

upon receipt of a command for the data hold option from the employee, track time since selection of the data hold option by the employee;

monitor the interface for a command for the redaction option;

upon receipt of a command for the redaction option from the employee, render at least a first data subset of the received data values stored in the temporary database permanently inaccessible to the at least one application program; and upon the tracked time since the selection of the data hold option reaching a threshold period without selection of the redaction option by the employee, releasing the stored data values for use by the at least first application program.

19. The system of claim 18, wherein the at least first application program includes employer application programs and wherein the method further includes the steps of, prior to the threshold time for stored data values, providing the stored data values to at least a second application program, the second application program providing a service to an employee of the employer.

20. The system of claim 18, wherein the temporary private database is inaccessible by any employer application program other than required employer application programs.

21. The system of claim 18, wherein the temporary private database is inaccessible by any service provider application programs or third party application programs.

* * * * *

UNITED STATES PATENT AND TRADEMARK OFFICE
CERTIFICATE OF CORRECTION

PATENT NO. : 10,963,586 B1  
APPLICATION NO. : 15/840698  
DATED : March 30, 2021  
INVENTOR(S) : Darrin Sculley et al.

Page 1 of 1

It is certified that error appears in the above-identified patent and that said Letters Patent is hereby corrected as shown below:

In the Specification

Column 36, Line 1, "reassess" should be --reaccess--.

In the Claims

Column 67, Line 20, Claim 18, "presents a a data" should be --presents a data--.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*